US006968295B1

(12) United States Patent
Carr

(10) Patent No.: US 6,968,295 B1
(45) Date of Patent: Nov. 22, 2005

(54) METHOD OF AND SYSTEM FOR AUDITING THE ENERGY-USAGE OF A FACILITY

(75) Inventor: Harold Scott Carr, Covina, CA (US)

(73) Assignee: Ingersoll-Rand Company, IR Retail Solutions Division, Bridgeton, MO (US)

( * ) Notice: Subject to any disclaimer, the term of this patent is extended or adjusted under 35 U.S.C. 154(b) by 6 days.

(21) Appl. No.: 10/335,249

(22) Filed: Dec. 31, 2002

(51) Int. Cl.[7] .......................... G06F 15/00; G06F 11/00; G01R 15/00
(52) U.S. Cl. ....................... 702/188; 700/286; 702/57; 702/130; 709/224
(58) Field of Search ....................... 702/57, 61, 62, 702/130, 188; 700/286, 291, 295; 705/10, 35, 37; 62/126, 127, 129; 340/584; 709/224

(56) References Cited

U.S. PATENT DOCUMENTS

| | | | | |
|---|---|---|---|---|
| 5,717,609 | A | * | 2/1998 | Packa et al. ................ 702/130 |
| 6,553,418 | B1 | * | 4/2003 | Collins et al. .............. 709/224 |
| 6,633,823 | B2 | * | 10/2003 | Bartone et al. ............... 702/57 |
| 2001/0020219 | A1 | | 9/2001 | Kishlock et al. ............. 702/61 |
| 2002/0000092 | A1 | | 1/2002 | Sharood et al. .............. 62/127 |
| 2002/0161545 | A1 | | 10/2002 | Starling et al. ............. 702/130 |
| 2002/0163436 | A1 | | 11/2002 | Singh et al. ................ 340/584 |
| 2002/0178047 | A1 | | 11/2002 | Or et al. ..................... 705/10 |
| 2002/0189267 | A1 | | 12/2002 | Singh et al. ................. 62/126 |
| 2002/0193970 | A1 | | 12/2002 | Singh et al. ................ 702/188 |
| 2003/0005710 | A1 | | 1/2003 | Singh et al. ................. 62/129 |
| 2003/0171851 | A1 | * | 9/2003 | Brickfield et al. .......... 700/286 |

OTHER PUBLICATIONS

Emerson Retail Services, Presentation Prepared for Taylor Industries and HyVee, 40 p.
Emerson Climate Technologies, E–Commissioning Presentation for Tesco, 24 p.

* cited by examiner

*Primary Examiner*—John Barlow
*Assistant Examiner*—John Le
(74) *Attorney, Agent, or Firm*—Michael Best & Friedrich LLP

(57) ABSTRACT

A method of and system for auditing the energy-usage by a facility, where the facility includes an energy-using system having an operating parameter with a value. One embodiment of the method includes acquiring an initial value of the operating parameter, acquiring initial data of the energy-using system with the operating parameter set at the initial value, acquiring values relating to a weather parameter for the facility, and creating a baseline model of the energy-usage by the facility with the initial energy-using system data and the weather data. Some embodiments of the method can further include determining an initial rate of energy-usage by the facility based upon the baseline energy model, changing the initial value of the operating parameter, determining a modified rate of energy-usage by the facility, and calculating a savings in energy costs from changing the initial value of the operating parameter.

102 Claims, 51 Drawing Sheets

Store Survey Form   115

Customer: _____  Date: _____

116 Store Name: _____
↳ Address: _____  Phone # : _____
City, State: _____

Survey Date  Start 118  Finish 120  Controller type: _____
Date: _____  Monitoring Phone #: _____
Time: _____

People in Charge

| | Name | Title |
|---|---|---|
| Manager/Director 1 | | |
| 122 Manager/Director 2 | | |
| ↳ Manager/Director 3 | | |
| Manager/Director 4 | | |

124
↳ Time and Attendance

Type of System: _____
Location: _____

Hours of Operation

128

| | Sunday | Monday | Tuesday | Wednesday | Thursday | Friday | Saturday |
|---|---|---|---|---|---|---|---|
| Sales | | | | | | | |
| Storage | | | | | | | |
| Stocking | | | | | | | |
| Bakery | | | | | | | |
| Deli | | | | | | | |
| Floral | | | | | | | |
| Bank | | | | | | | |
| Meat | | | | | | | |
| Office | | | | | | | |
| Pharmacy | | | | | | | |
| Produce | | | | | | | |
| Seafood | | | | | | | |
| Video | | | | | | | |
| Building Lts. OS | | | | | | | |
| Canopy Lts. OS | | | | | | | |
| Signs Lts. OS | | | | | | | |
| Other | | | | | | | |

Fig. 3

Store Survey Form 130

Store Name: _____ Date: _____

Lights Outside 140

| | Parking | Building | Security | Canopy | Dock | Other |
|---|---|---|---|---|---|---|
| On | | | | | | |
| Off | | | | | | |

132 # of Electric Meters: _____
134 Amperage of Main: _____
136 # of Gas Meters: _____
138 # of Water Meters: _____

142

| | Type | Fixture Quantity | Total Wattage | Electronic Ballast | Magnetic Ballast | Photo Cell | Time Schedule | Notes: |
|---|---|---|---|---|---|---|---|---|
| Building | | | | | | | | |
| Canopy | | | | | | | | |
| Dock | | | | | | | | |
| Parking Lot | | | | | | | | |
| Security | | | | | | | | |
| Sign Building | | | | | | | | |
| Sign Pylon | | | | | | | | |
| Other: | | | | | | | | |

Customers/Employees Occupancy 144

Parking Lot _____ spaces
Main Sales Area _____ Peak hours busy
Total number employees working at peak hours _____

Doors 146

| | Standing Open |
|---|---|
| Machine Room | |
| AHU Room | |
| Electric Room | |

Doors 148

| | # of doors | Auto Powered | Slow to close | Stuck Open | Broken | Type: swing, air, slide, roll up, revolving |
|---|---|---|---|---|---|---|
| Front | | | | | | |
| Left Side | | | | | | |
| Right Side | | | | | | |
| Dock 1 | | | | | | |
| Dock 2 | | | | | | |
| Dock 3 | | | | | | |

Comments: _____

Fig. 4

Store Survey Form

Store Name: _____    Date: _____

Building Envelope

Roof:    Group ( See Ashrae Handbook, Fundamentals, Chapter 28, table 14)    150

_____ Ashrae Group Number

Height: _____ ft.

156 → Color:    Light - Medium - Dark    — 152

— 154

Define Zones and describe walls/partitions within the Zone.    Note: Be aware that each zone is considered to have its own HVAC system. Don't Forget Pharmacy, Video, etc.. If backroom is not cooled, Treat Unit Htr's as Appliances.

* Color: Light, Medium, Dark
* Facing: N, NW, W, SW, S, SE, E, NE
* Construction Type: Brick w/block, Metal w/insul. Thickness, Partition. If partition insert % open area.

Zone 1    Group (See ASHRAE Handbook Fundamentals, Ch. 28, Table 19)    ASHRAE Group Number:

158  160    162    164    166  168  170  172

| Walls | Length | Color | Direction Facing | Construction type | % open area | Window Area | U-Value | Shading |
|---|---|---|---|---|---|---|---|---|
| Front | | | | | | | | |
| Rear | | | | | | | | |
| Left | | | | | | | | |
| Right | | | | | | | | |

Zone 2    Group ( See ASHRAE Handbook Fundamentals, Ch. 28, Table 19)    ASHRAE Group Number:

| Walls | Length | Color | Direction Facing | Construction type | % open area | Window Area | U-Value | Shading |
|---|---|---|---|---|---|---|---|---|
| Front | | | | | | | | |
| Rear | | | | | | | | |
| Left | | | | | | | | |
| Right | | | | | | | | |

Zone 3    Group ( See ASHRAE Handbook Fundamentals, Ch. 28, Table 19)    ASHRAE Group Number:

| Walls | Length | Color | Direction Facing | Construction type | % open area | Window Area | U-Value | Shading |
|---|---|---|---|---|---|---|---|---|
| Front | | | | | | | | |
| Rear | | | | | | | | |
| Left | | | | | | | | |
| Right | | | | | | | | |

Fig. 5

Store Survey Form

Store Name: _____  Date: _____

ASHRAE Group Number: __180__

Zone 4  Group ( See ASHRAE Handbook Fundamentals, Ch. 28, Table 19)

| Walls | Length | Color | Direction Facing | Construction type | % open area | Window Area | U-Value | Shading |
|---|---|---|---|---|---|---|---|---|
| Front | | | | | | | | |
| Rear | | | | | | | | |
| Left | | | | | | | | |
| Right | | | | | | | | |

Bank _____ 181 ____sqft  Vestibule 184 _____ ____sqft

Office _____ 182 ____sqft  Video _____ ____sqft 186

Office _____ ____sqft  Warehouse _____ ____sqft

Office _____ ____sqft  Other _____ ____sqft 188

Equipment/Appliances Outside: 190  192  194  196  198  200  202  204

| Description | Make | Model | Serial # | Gas Rating | Volts | Amps | Phase |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

Fig. 6

Store Survey Form

Store Name: _____    Date: _____

Lighting Interior

| | Type | A/C Zone /208 /210 | Fixtures Quantity /212 | Total Watts /214 | Use /206 | Type of Ballast /215 | Photo Cell /216 | Time Schedule /218 /220 | Occupancy Sensors /222 |
|---|---|---|---|---|---|---|---|---|---|
| Main Sales Floor | | 1 | | | | | | | |
| Main Sales Floor | | 2 | | | | | | | |
| Main Sales Floor | | 3 | | | | | | | |
| Main Sales Floor | | 4 | | | | | | | |
| Perimeter | | 1 | | | | | | | |
| Perimeter | | 2 | | | | | | | |
| Perimeter | | 3 | | | | | | | |
| Perimeter | | 4 | | | | | | | |
| Other | | 1 | | | | | | | |
| Other | | 2 | | | | | | | |
| Other | | 3 | | | | | | | |
| Other | | 4 | | | | | | | |

Are there Skylights? _____    How many? _____    SQFT _____

224

\* *Departmental Equipment and service environments. Note opportunities to turn off lights, equipment, hoods during off hours. Are there any timer devices doing this now? Note hours of operation, ie: cooking, baking, processing to determine equipment usage.*

Equipment/Appliances Inside

| Zone /226 | Department /228 | Description /230 | Make /232 | Model /234 | Serial # /236 | Gas Rating /238 | Volts /240 | Amps /242 | Phase /244 |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |

Fig. 7

Store Survey Form

Store Name: _____ Date: _____

Refrigerated Cases  252  254  256  258  260  262  264  266  250  268  270  272

| Sys ID | Make | Model | Serial # | F/Drs size | Type | Box Dr Switch | Defrost St.Tm | Lgt | Qty | Type | V | A | Ph | Fans V | A | An swt V | A | Lights V | A |
|---|---|---|---|---|---|---|---|---|---|---|---|---|---|---|---|---|---|---|---|
| | | | | | | | | | | | | | | | | | | | |
| | | | | | | | | | | | | | | | | | | | |
| | | | | | | | | | | | | | | | | | | | |

Fig. 8

Store Survey Form

Store Name: _____  Date: _____

Supermarket Rack (Provide a brief description)  _280_   _293_  _294_   _296_

Compressors  _282_ _284_ _286_ _288_  _290_ _292_   _297_ _298_

| Compressors | | | | Open Drive Motor | | | | Head | | Var Sp Drive | |
|---|---|---|---|---|---|---|---|---|---|---|---|
| ID # | Make | Model # | Serial # | HP | RPM | FLA | Unloader(s) | Fan | CCH | VSD | Bpas |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

Racks  _300_ _302_ _304_  _306_   _308_  _310_  _312_  _314_

| ID# | Make | Model | Serial # | Suction Press. | Discharge Type | Refrigerant Type | Voltage |
|---|---|---|---|---|---|---|---|
| | | | | | | | |
| | | | | | | | |
| | | | | | | | |
| | | | | | | | |

Fig. 9

Store Survey Form

Store Name: _____   Date: _____ 341

Conventional Units   320       328    330   332  334 336 338  342
                 322  324  326                              340

| Compressors | | | | Condenser | | Air / Water | | No. of | Head | | Var Sp Drive | |
|---|---|---|---|---|---|---|---|---|---|---|---|---|
| ID # | Make | Model # | Serial # | Capacity | GPM | # Fan | Hp | unldrs | Fan | CCH | VSD | Bpas |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

Fig. 10

Store Survey Form

Store Name: _____  Date: _____

Condenser Type  _350_

Rack: _____ /352 /354  /356  /358  /360
Air / Evp / Fluid   Volts: _____   Phase: _____   Hz: _____   Control Cir. Volts: _____
Make: _____   Model#: _____ /369   Serial#: _____
Number of Fans: _____   HP: _____
362  Fan Motors:  (368  Hi HP: _____  364 Hi Amps: _____   Lo HP: _____ (366  Lo Amps: _____
Pump Motor: _____   HP: _____   Amps: _____
374  Sump Heater: _____   kW: _____  370                                  ↖ 372
Fan VSD Make/Model: _____                    Pump Motor VSD Make/Model: _____
376  Split Condenser:  Y / N    Number of Tubes: _____
Rack:  (382  378                 384                380

Air / Evp / Fluid   Volts: _____   Phase: _____   Hz: _____   Control Cir. Volts: _____
Make: _____   Model#: _____   Serial#: _____
Number of Fans: _____   HP: _____
Fan Motors:   Hi HP: _____   Hi Amps: _____   Lo HP: _____   Lo Amps: _____
Pump Motor:   HP: _____   Amps: _____
Sump Heater:   kW: _____
Fan VSD Make/Model: _____         Pump Motor VSD Make/Model: _____
Split Condenser:  Y / N    Number of Tubes: _____

Rack: _____

Air / Evp / Fluid   Volts: _____   Phase: _____   Hz: _____   Control Cir. Volts: _____
Make: _____   Model#: _____   Serial#: _____
Number of Fans: _____   HP: _____
Fan Motors:   Hi HP: _____   Hi Amps: _____   Lo HP: _____   Lo Amps: _____
Pump Motor:   HP: _____   Amps: _____
Sump Heater:   kW: _____
Fan VSD Make/Model: _____         Pump Motor VSD Make/Model: _____
Split Condenser:  Y / N    Number of Tubes: _____

Rack: _____

Air / Evp / Fluid   Volts: _____   Phase: _____   Hz: _____   Control Cir. Volts: _____
Make: _____   Model#: _____   Serial#: _____
Number of Fans: _____   HP: _____
Fan Motors:   Hi HP: _____   Hi Amps: _____   Lo HP: _____   Lo Amps: _____
Pump Motor:   HP: _____   Amps: _____
Sump Heater:   kW: _____
Fan VSD Make/Model: _____         Pump Motor VSD Make/Model: _____
Split Condenser:  Y / N    Number of Tubes: _____

Fig. 11

Store Survey Form

Store Name: _____  Date: _____

Accessory List  390

| | Rack | Rack | Rack | Rack | Rack |
|---|---|---|---|---|---|

392 Number of Compressors
394 Heat Reclaim/Zone AC Unit
     Hot Water Reclaim
396 H20 Bypass
398 Split Suction
400 Load Shifting
402 Flooding Valve
404
406 Receiver
     Size
     Flow Thru
     Surge
     Critically Charged
     Subcooler
408 Mech
     Ambient
     Flooded
     Hot Gas bypass with Desuperheater
410 Driveway/walkway heater
     Electric
412 Glycol
     Liquid Pump
414 Oil Coolers
     Type
416 Liquid Pressure Hold Back Valves

418

| | Make | Model | Serial # | Size KW | Fuel Type | Load Shift | Emergency | Volts | Amps | Phase |
|---|---|---|---|---|---|---|---|---|---|---|
| Generator | | | | | | | | | | |
| 420 Air Compressor | | | | | | | | | | |
| 422 H2O Heaters | | | | | | | | | | |
| Ventilation Intake | | | | | | | | | | |
| 424 Ventilation Exhaust | | | | | | | | | | |

Store Survey Form

Store Name: _____   Date: _____

HVAC  _432_   _434_   _430_

| Built-Up | |
|---|---|
| Package Unit | |
| Split System | |

Brief Description of the HVAC System and Area Served   ie. Main AHU in AHU room, Main Sales Zone

_____

_____

| Unit | | | | | Blower Motor | | | | VSD | |
|---|---|---|---|---|---|---|---|---|---|---|
| ID# | Make | Model# | Serial# | Economizer | Speed | CFM | HP | Volts | FLA | VSD | Bpas |
| | | | | Y/N | Main / Hi | | | | | Y/N | Y/N |
| | | | | | Lo | | | | | Y/N | Y/N |

_440_  _442_  _436_   _444_  _446_   _438_

Note: Cooling Type = DX, Water   Heating Type = Reclaim, Gas, Electric, Heat Pump, Water

| Cooling | | Capacity | Heating | | Rating |
|---|---|---|---|---|---|
| Stages | Type | Tons | Stages | Type | MBH / kW |
| 1 | | | 1 | | |
| 2 | | | 2 | | |
| 3 | | | 3 | | |
| 4 | | | 4 | | |
| 5 | | | 5 | | |
| 6 | | | 6 | | |

Dual/Single Path _____

CFM Infiltration: _____

Is the heating down stream of the cooling coil  [Y/N]   Humidity Control [Y/N]   Note: If yes What Type? _____
ie. DX with ReHeat, Desicant, etc.

| Humidity Control Unit | | | | |
|---|---|---|---|---|
| ID# | Type | Make | Model# | Serial# |
| | | | | |

_448_

Compressor(s)  _450_   _452_   _464_

Refrigerant Type: _456_   Volts: _458_   _460_   _462_   _466_

_454_

| Compressor or Condensing Unit | | | Open Drive Motor | | | Compressor | | Var Sp Drive | |
|---|---|---|---|---|---|---|---|---|---|
| Make | Model# | Serial# | HP | RPM | FLA | Unldr | CC htr. | VSD | Bpas |
| 1 | | | | | | | | | |
| 2 | | | | | | | | | |
| 3 | | | | | | | | | |
| 4 | | | | | | | | | |

Fig. 13

Store Survey Form

Store Name: _____  Date: _____

Exhaust Fans  472  470  478
                  474  476

| Location | Make | Model# | Serial# | CFM | Volts | Phase | Amps | Notes: |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

Supply Fans for Hood Systems

| Location | Make | Model# | Serial# | CFM | Volts | Phase | Amps | Notes: |
|---|---|---|---|---|---|---|---|---|
| 1 | | | | | | | | |
| 2 | | | | | | | | |
| 3 | | | | | | | | |
| 4 | | | | | | | | |

482

Unit Heaters  480

| Location | Make | Model# | Serial# | Gas/Elec | MBH/kW | Notes: |
|---|---|---|---|---|---|---|
| 1 | | | | | | |
| 2 | | | | | | |
| 3 | | | | | | |
| 4 | | | | | | |

Evaporative Coolers  484  486  488  490

| Location | Make | Model# | Serial# | CFM | Volts | Phase | Amps | Notes: |
|---|---|---|---|---|---|---|---|---|
| 1 | | | | | | | | |
| 2 | | | | | | | | |
| 3 | | | | | | | | |
| 4 | | | | | | | | |

Other

| Location | Make | Model# | Serial# | CFM | Volts | Phase | Amps | Notes: |
|---|---|---|---|---|---|---|---|---|
| 1 | | | | | | | | |
| 2 | | | | | | | | |
| 3 | | | | | | | | |
| 4 | | | | | | | | |

Customer: _____
Store Name: _____
Location: _____ } 540
State: _____
Store Phone Number: _____
Controller Type: _____
Store Communications Phone Number: _____

Monitoring Phone # and Contact to set up Communications: _____ } 542
⎣ 545

Service Company responsible for the store: _____ ⎤ 556
                                                              ⎥
Retail Solutions Zone Energy Analyst: _____        ⎬ 555
Energy Auditing Technicians Company: _____         ⎥
            Names: _____                            ⎦
            Phone Number: _____ ⎤ 560
                                          ⎦ 565

Date and Time audit started: _____
Date and Time audit finished: _____

Fig. 16

| Store Name | Address | City | State | Contact at Store | Contact Phone No. | Controller Type | Modem # | Equipment Legend Available | Mechanical Plans Available | Schedule of Survey | Schedule of Audit | Surveyor | Audit Team |
|---|---|---|---|---|---|---|---|---|---|---|---|---|---|
| | | | | | | | | | | | | | |

Customer: _____
Key Contact: _____ Phone: _____
RS Energy Analyst: _____ Phone: _____
RS Survey Contact: _____ Phone: _____

*Auditing Notes Section*

| Reference | Notes |
|---|---|

Maintenance Exception Report

| System | Problem | Corrective Action |
|---|---|---|
| | | |

Fig. 19

Daily Calibrating

How To: Using a black metal disc, insert into an ice slushy water bath. After one minute, shoot the metal disc with the infrared temperature gun and dial 32 degrees farenheit

Calibrating Thermometer
Ice Tested        [ Y / N ]

Thermocouple Calibration
Ice Tested        Y / N

New Batteries
Required weekly

How To: Using the calibrated infrared temperature gun, shoot the temperature of a refrigerant cylinder. The spot that is shot should be painted with flat black paint. Using this temperature find the corresponding pressure from the p-t chart. Hook up the gauges to the tank and compare the gauge pressure with the tank pressure, adjust gauges accordingly.

Calibrating Gauges #1

| | |
|---|---|
| Gauge Zeroed | Y / N |
| Tank Temp | |
| Tank Pressure | |
| Gauge Pressure | |
| Reset Gauge | Y / N |

Calibrating Gauges #2

| | |
|---|---|
| Gauge Zeroed | Y / N |
| Tank Temp | |
| Tank Pressure | |
| Gauge Pressure | |
| Reset Gauge | Y / N |

Circuit Info.:

| Circuit # | Description of cases | Disch Air Temp | | Product Temp | Probe Case Temp | Offset | | Evapor. Press | EPR setting (PSI) | | Pressure Drop | Suction Temp | | Suction Temp @ Epr After |
|---|---|---|---|---|---|---|---|---|---|---|---|---|---|---|
| | | Initial | After | | | Initial | After | | Initial | After | | Initial | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

Rack _____  Suction Group _____

\* Pressure drop to be taken a min. of 1 hr after defrost. This will provide a lineset pressure drop.
Only record pressure drop if it directly affects the rack suction.
\*\* Discharge air and product temperatures to be taken with the infrared gun by shooting several times at different angles.

Fig. 21

Defrost Info. — 732

Rack 734 — Suction Group 736

| Circuit # 738 | Description of cases 740 | Def. Voltage 742 | | | Def. Amps 744 | | | Balanced Def. Schedule 746 | | Verify KG/HG Operation 748 | | Manual Defrost Schedule 750 (If not in computer) | | | | Force Defrost Y/N 752 | Case Temp Rise? 754 |
|---|---|---|---|---|---|---|---|---|---|---|---|---|---|---|---|---|---|
| | | AB | BC | CA | L1 | L2 | L3 | Y | N New | Y | N | St. Tm | Freq | Duration | Term | | |
| 1 | | | | | | | | | | | | | | | | | |
| 2 | | | | | | | | | | | | | | | | | |
| 3 | | | | | | | | | | | | | | | | | |
| 4 | | | | | | | | | | | | | | | | | |
| 5 | | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | | | | | | | | | | | | | | | | | |
| 10 | | | | | | | | | | | | | | | | | |
| 11 | | | | | | | | | | | | | | | | | |
| 12 | | | | | | | | | | | | | | | | | |
| 13 | | | | | | | | | | | | | | | | | |
| 14 | | | | | | | | | | | | | | | | | |
| 15 | | | | | | | | | | | | | | | | | |
| 16 | | | | | | | | | | | | | | | | | |
| 17 | | | | | | | | | | | | | | | | | |
| 18 | | | | | | | | | | | | | | | | | |
| 19 | | | | | | | | | | | | | | | | | |
| 20 | | | | | | | | | | | | | | | | | |

Fig. 22

Rack / Condenser / Controller Calibrating 762

Rack: _____ Suction Group: _____

| Acceptable Offsets | | |
|---|---|---|
| Suction | Disch | |
| 3% | 3% | |

| Acceptable Offsets | |
|---|---|
| Temperature | 2 degrees |

764 {
- Suction Pressure Group #1
- Suction Pressure Group #2
- Suction Pressure Group #3
- Discharge Pressure — 766
- Drop Leg — 768

- Suction Temp — 770
- Discharge Temp — 772
- Drop Leg Temp — 774
- Liquid Header Temp — 776
- Subcooler inlet — 778
- Subcooler outlet — 780
- Ambient air — 782
- Sump Temps — 784
- Other
- Other Receiver Level 794 → Ht. Reclaim off
Ht. Reclaim on
Hot Gas off
Hot Gas on Columns: Transducer Reading | Gauge Reading | Offset Was | Offset Now Thermocouple Reading 788 | Sensor Reading 790 | Offset Was | Offset Now 792
786

Controller Reading | Mechanical Reading | Offset Was | Offset Now

Fig. 23

Rack Info.

Rack _____ Suction Group _____ Ref. Type _____ Oil Type _____  805
Manufacturer _____
Model # _____ Serial # _____ Date Built _____  840

Suction transducer setpoint ____ 810
Floating suction pressure ____ 812
Holdback Valve ? ____ 814  816
Receiver Pressurization Valve ? ____ 818
Liquid Pressure Regulator ? ____ 820
Discharge Differential Valve ? ____ 822
Liquid Differential Valve ? ____ 824
Subcooler ? ____ 826

828 Design | 830 Setting Now | 832 Setting After | 834 Pressure Drop

Stage 1
Stage 2

Machine Room Ventilation
Fans Operating _____
Louvers Operating _____
Controls Functioning _____
Temperature Setpt. _____

Receiver Type: _____
Surge/Flow Thru _____

Oil Reservoir  842
Level:
Color:   L   M   D
Fans: _____
Heaters: _____

High Side
| | Inlet | Outlet | Pressure Drop |
|---|---|---|---|
| Liquid Drier | | | |
| Oil Separator | | | |
| Discharge to Drain | | | |
| Heat Reclaim Valve | | | |

836 →

Low Side
| | | |
|---|---|---|
| Suction Filter | Comp. # 1 | Inlet  Outlet |
| Suction Filter | Comp. # 2 | Inlet  Outlet |
| Suction Filter | Comp. # 3 | Inlet  Outlet |
| Suction Filter | Comp. # 4 | Inlet  Outlet |
| Suction Filter | Comp. # 5 | Inlet  Outlet |
| Suction Filter | Comp. # 6 | Inlet  Outlet |

845 →

→ Heat Reclaim  838

| | | | | |
|---|---|---|---|---|
| Air | Y / N | Working? | Y / N | Reclaim Holdback Valve   Y / N |
| Water | Y / N | Working? | Y / N | H2O Differential Valve   Y / N |

* If discharge pressure is too high, locate cause and note.
* If suction pressure drop is too high, note filter change required.

Before  After
[   |   ]

Setpoint psig _____
Setpoint psig _____

Fig. 24

Compressor Info. _____ Rack: _____ Suction Group _____ Actual Rack Voltage: _____

Note: Must Maintain Operating Suction Pressure while taking Compressor readings.

Control Scheme _____  Setpoint was _____  Setpoint Now _____

852
854
856 858 860 862

| Comp.# | Model # | Serial # | Low Pressure Control | | High Pressure Control | | Oil Failure | Demand |
|---|---|---|---|---|---|---|---|---|
| | | | Before | After | Before | After | Operates | Cooling |
| #1 | | | | | | | | |
| #2 | | | | | | | | |
| #3 | | | | | | | | |
| #4 | | | | | | | | |
| #5 | | | | | | | | |

864 866 868 870 872 874 876 878 880

| Comp.# | Suction | | Discharge | | Loaded Amps | | | Unloaded Amp | | | Oil Level | | Voltage | | | Vacuum Test | |
|---|---|---|---|---|---|---|---|---|---|---|---|---|---|---|---|---|---|
| | Temp | Press | Temp | Press | L1 | L2 | L3 | L1 | L2 | L3 | Good | High | Low | AB | BC | CA | Good | Bad |
| 1 | | | | | | | | | | | | | | | | | | |
| 1u | | | | | | | | | | | | | | | | | | |
| 1u | | | | | | | | | | | | | | | | | | |
| 2 | | | | | | | | | | | | | | | | | | |
| 3 | | | | | | | | | | | | | | | | | | |

Note: Shut rack down and tighten all connections throughout system. Compressor box, Breakers, Contactors, etc. Look for heated connections.

Comments: _____

* Do not perform vacuum tests to scroll compressors.
* Visually inspect scrolls to determine abuse; overheating, etc.
* Do not pull transducers into a vacuum

Fig. 25

Air-Cooled Condenser Information: ← 902

Rack: _____ Suction Group: _____ Split Circuited: _____ (# of tubes) _____
Make: _____ Model#: _____ 906 Serial#: _____
      904

908

| Fans | Alignment | | Rotation | | Control Setpoints | |
|------|-----------|-------|----------|-------|-------------------|-------|
|      | Before | After | Before | After | Before | After |
| #1 | | | | | | |
| #2 | | | | | | |
| #3 | | | | | | |
| #4 | | | | | | |
| #5 | | | | | | |
| #6 | | | | | | |

900

Is Condenser Slab Clean?    Y    N

Comments _____
_____
_____
_____

Evaporative Condenser Information:

Discrete Spray — 910
Fan Motor Rotation — 912
Pump Motor Rotation — 914
VSD Operating — 916
Float Operating property — 918
Bleed Valve Working — 920
H2O Treatment Working — 922
Is Water within ph Levels — 924

926 → Method of control
     → Pressure _____
928 → EMS control _____
     T.D. _____
930 → Wet Bulb _____
932 → Sump Temp. _____
934 → Damper Ctrl _____
936

- Check for Non-condensables.   Take a sample of refrigerant from condenser and measure pressure based on ambient temperature.
Are non-condensables present? _____

938

| Control Setpoints | | |
|-------------------|--------|-------|
|                   | Before | After |
| Low Fan | | |
| High Fan | | |
| Pump | | |

Fig. 26

Controller Verification

Rack: _____  Suction Group: _____

950

Using the downloaded configuration schedule from the controller, verify that each output assignment functions as expected. Force each output into an energized state to confirm that the desired action occurs.

952  954  956

| Comp | Force Compressor | | Head Fan Operates | | VSD | |
|---|---|---|---|---|---|---|
| | Pass | Fail | Pass | Fail | Pass | Fail |
| #1 | | | | | | |
| #2 | | | | | | |
| #3 | | | | | | |
| #4 | | | | | | |
| #5 | | | | | | |
| #6 | | | | | | |

958

| Air Cooled Cond | Forced Fans | |
|---|---|---|
| | Pass | Fail |
| #1 | | |
| #2 | | |
| #3 | | |
| #4 | | |
| #5 | | |
| #6 | | |
| Split Valve | | |

968  966  974

| Misc. | Forced | |
|---|---|---|
| | Pass | Fail |
| Heat Reclaim | | |
| H2O Reclaim | | |
| Exhaust Fans | | |
| Unit Heaters | | |

970  960

| Evap Cond | Forced On | |
|---|---|---|
| | Pass | Fail |
| Low | | |
| High | | |
| Pump | | |

962

| HVAC | Force Fans/ Compressors | |
|---|---|---|
| | Pass | Fail |
| Stage 1 | | |
| Stage 2 | | |
| Fan 1 | | |

964

| Pump Station | Forced On | |
|---|---|---|
| | Pass | Fail |
| #1 | | |
| #2 | | |

HVAC Setpoints

Ambient Temperature   Dry Bulb ___986___   Wet Bulb ___990___   Store Temperature   Dry Bulb ___994___   Wet Bulb ___992___
                                                                Zone 1
                                                                Zone 2

HVAC ___984___

| | |
|---|---|
| Built-Up | |
| Package Unit | |
| Split System | |

___995___

Brief Description of the HVAC System and Area Served   ie. Main AHU in AHU room, Main Sales Zone

___996___

___997___  ___998___  Unit ___1000___  ___1002___  Blower Motor ___1004___  ___1006___  ___1008___  ___1010___  ___1012___

| ID# | Make | Model# | Serial# | Speed | HP | Amp Draw | | | Actual Voltage | | | VSD | | Economizer |
|---|---|---|---|---|---|---|---|---|---|---|---|---|---|---|
| | | | | | | L1 | L2 | L3 | AB | BC | CA | Working | Bpas | Y   N |
| | | | | Main/Hi | | | | | | | | | | |
| | | | | Lo | | | | | | | | | | |

Filter           Evaporator        Heat coil         Make-up Air Unit     Make-up Air         Type of Air Filter    Size of Filter    Qty of Filters
Pressure drop    Pressure Drop     Pressure Drop     capacity             opening size
___1014___       ___1016___        ___1018___        ___1020___           ___1022___          ___1024___            ___1026___        ___1028___

Note:   Cooling Type = DX, Water     Heating Type = Reclaim, Gas, Electric, Heat Pump, Water    ___1032___  ___1034___

| Cooling | | Heating | | Temperature | Night Setback |
|---|---|---|---|---|---|
| Stages | Type | Stages | Type | Setpoint | Settings |
| 1 | | 1 | | | |
| 2 | | 2 | | | |
| 3 | | 3 | | | |
| 4 | | 4 | | | |
| 5 | | 5 | | | |
| 6 | | 6 | | | |

___1030___

Is the heating down stream of the cooling coil   [Y/N]

Calibrate HVAC Sensors ___1040___  ___1036___  ___1038___

| Type | Reading | Before/After | Offset |
|---|---|---|---|
| Humidity | | | |
| Dew Pt. | | | |
| Temp. | | | |

Humidity Control
Note: If yes What Type? [Y/N] — 1064
ie. DX with ReHeat, Desiccant, etc. — 1066

| Humidity Control Unit | | | Setpoints | |
|---|---|---|---|---|
| Stages | Type | Model # | Serial # | Before | After |
| 1 | | | | | |
| 2 | | | | | |

986

Compressor(s)

| Comp # | Model # | Serial # | Suction Temp | Discharge Temp | LP Settings Before | LP Settings After | HP Settings Before | HP Settings After | Amp Draw L1 | L2 | L3 | Voltage AB | BC | CA | Oil Levels L | M | H |
|---|---|---|---|---|---|---|---|---|---|---|---|---|---|---|---|---|---|
| #1 | | | | | | | | | | | | | | | | | |
| #2 | | | | | | | | | | | | | | | | | |
| #3 | | | | | | | | | | | | | | | | | |
| #4 | | | | | | | | | | | | | | | | | |

1042  1044  1046  1050  1052  1054  1056

Condenser    Note: If Evap Condenser list with Refrigeration Condensers
Make: _____  Model#: _____ 1060    Serial#: _____ 1062

| Fans | Alignment Before | After | Rotation Before | After | Control Setpoints Before | After |
|---|---|---|---|---|---|---|
| | | | | | | |
| | | | | | | |
| | | | | | | |
| | | | | | | |

1058

Is Condenser Slab Clean?    Y    N

Comments _____

Comments: _____

Fig. 28b

Lighting Verification

Run all lighting by cycling controller relays to confirm operation. If a faulty condition is found please note below.

List Lighting Schedules: _1074_

| Schedule | EMS Control | Test _1076_ | Photocells _1078_ | Daylight Sensors _1080_ | Test | On/Off Switch _1072_ |
|---|---|---|---|---|---|---|
| Parking | | | | | | |
| Interior Sales Lighting | | | | | | |
| Interior Perimeter Lighting | | | | | | |
| Exterior Perimeter Lighting | | | | | | |
| Other: | | | | | | |

Fig. 29

Anti-Sweat Heater Control 1084

| Circuit # | Description of cases | Amp Draw or Wattage per door | Anti-sweat htrs. Controlled? | No. of Doors | Setpoints Initial | Setpoints After | Calibrate Sensor Initial | Calibrate Sensor After | All Heaters Working? | Are Any Doors/ Frames Sweating |
|---|---|---|---|---|---|---|---|---|---|---|
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |

1086 1088 1090 1092 1094 Rack 1096 1098 Suction Group 1100 1102

High Side Setpoints

Air Cooled Condensers
Pressure Control
Low Temp - stage 1          80 degF
Low Temp - stage 2          +10#
Low Temp - stage 3          +10#
VSD                         80 degF
Med Temp - stage 1          80 degF
Med Temp - stage 2          +10#
Med Temp - stage 3          +10#
VSD                         80 degF

Ambient Temp Control
Low Temp - stage 1          55.0
Low Temp - stage 2          +5 F
Low Temp - stage 3          +5 F
VSD                         55.0
Med Temp - stage 1          55.0
Med Temp - stage 2          +5 F
Med Temp - stage 3          +5 F
VSD                         55.0

TD Control (amb. + t.d.)
Low Temp                    10 deg
differential                +2 deg
Fail safe                   100 deg
Med Temp                    15 deg
differential                +2
Fail safe                   100 deg

Evaporative Condensers
Sump Temp Control
Cond Setpoint               70 deg
Low Speed Fan               60 deg
High Speed Fan              70 deg
VSD                         70 deg Pressure Control
Cond Setpoint               70 deg
Low Speed Fan               60 deg
High Speed Fan              70 deg
VSD                         70 deg Wet Bulb TD Control

Pressure Control Valves
Low Temp Flooding Valve             5# Below first fan stage
Low Temp Rcvr Press Reg             10# below flooding valve
Med Temp Flooding Valve             5# Below first fan stage
Med Temp Rcvr Press Reg             10# below flooding valve
Defrost Diff Valve                  20# + h'
Heat reclaim Holdback valve         80 deg
H2O bypass valve                    10#
Subcooler controller
    EPR:                            35 degree suction
    T-Stat, Solenoid:               50 deg. Liquid.

14

HVAC Setpoints

Humidity Control

| | |
|---|---|
| Stage 1 | 52% rh |
| Stage 2 | 54% rh |
| Stage 3 | 56% rh |

Temperature Control

| | |
|---|---|
| Stage 1 | 72.0 |
| Stage 2 | 74.0 |
| Stage 3 | 76.0 |

Heating

| | |
|---|---|
| Heat Reclaim | 68.0 |
| Back up heat stage 1 | 65.0 |
| Stage 2 | 63.0 |
| Night Set back temp. | 55.0 |

Do whatever customer wants to do based on e-valuation form.

Fig. 32

```
Simulation Output Report                                              2005
Simulation Run on _____

******************* Outdoor Conditions *******************

Month   Outdoor DB (F)       Outdoor WB (F)       Otdr Hum (gr/lb)
        Min   Avg   Max      Min   Avg   Max      Min   Avg   Max
Jan     15.8  39.3  68.0     14.9  34.8  60.2     7.1   24.2  69.8
Feb     10.4  41.5  73.4     7.3   36.6  63.2     3.3   27.0  84.9
Mar     23.0  48.9  75.2     22.4  42.7  62.1     6.5   32.8  69.8
Apr     35.6  60.0  87.8     30.8  52.1  67.4     15.9  47.6  90.6
May     41.0  68.7  93.2     37.9  61.3  74.3     24.3  71.0  109.6
Jun     60.8  73.6  89.6     53.6  65.1  74.3     46.6  79.9  109.6
Jul     55.4  75.9  95.0     53.3  68.5  76.5     46.6  93.7  124.2
Aug     57.2  75.3  95.0     55.1  67.4  76.5     53.4  88.9  116.7
Sep     53.6  71.3  91.4     46.4  63.7  74.9     35.2  77.3  116.7
Oct     35.6  59.5  82.4     34.1  53.4  71.3     17.4  53.6  109.6
Nov     14.0  49.1  73.4     12.7  43.7  59.5     5.9   36.4  69.8
Dec     17.6  42.4  69.8     16.2  38.1  63.3     8.5   29.0  79.6

YR      10.4  58.8  95.0     7.3   52.3  76.5     3.3   55.1  124.2

******************* Space Conditions *******************

Month   Zone 1 DB (F)        Zone 1 RH (%)
        Min   Avg   Max      Min   Avg   Max
Jan     70.0  73.4  75.0     16.7  23.2  39.0
Feb     70.0  73.4  75.0     16.8  23.2  33.9
Mar     70.0  74.4  75.0     18.8  25.2  32.1
Apr     72.9  74.8  75.0     23.2  29.0  36.4
May     73.8  75.0  75.0     29.3  34.8  39.2
Jun     74.9  75.0  75.0     31.7  36.6  39.3
Jul     74.8  75.0  75.0     33.0  38.8  42.5
Aug     75.0  75.0  75.0     34.5  38.3  41.4
Sep     74.7  75.0  75.0     32.3  36.1  40.8
Oct     73.2  74.8  75.0     25.4  31.3  38.9
Nov     70.0  74.3  75.0     16.8  26.1  32.6
Dec     70.2  73.9  75.0     18.4  24.6  30.6

```
****************** Operating Costs ******************
Month    Energy    Demand    Gas      Total
         ($)       ($)       ($)      ($)
Jan      5755.0    1200.1    0.0      6955.1
Feb      5236.4    1249.3    0.0      6485.7
Mar      5987.0    1274.1    0.0      7261.1
Apr      6037.1    1339.2    0.0      7376.3
May      6704.9    1452.5    0.0      8157.3
Jun      6700.9    1417.5    0.0      8118.4
Jul      7079.1    1526.1    0.0      8605.1
Aug      7098.1    1475.3    0.0      8573.5
Sep      6591.7    1428.3    0.0      8020.0
Oct      6345.5    1364.3    0.0      7709.8
Nov      5804.9    1268.4    0.0      7073.3
Dec      5610.1    1245.1    0.0      6855.1

YR       74950.7   16240.1   0.0      91190.8

Utility Rates:
  Average Annual Energy Cost ($/kWh):   0.060
  Average Annual Gas Cost ($/therm):    0.000

*************** Off-Peak, Shoulder, & On-Peak **************
Month    Off-Peak   Shoulder   On-Peak
         (MWh)      (MWh)      (MWh)
Jan      41.5       42.7       32.7
Feb      37.3       38.9       30.0
Mar      40.4       43.8       36.3
Apr      44.0       45.8       33.1
May      44.2       50.0       40.6
Jun      44.2       50.0       40.5
Jul      50.1       53.8       39.7
Aug      46.3       52.8       43.5
Sep      45.3       49.5       38.4
Oct      43.8       46.9       37.4
Nov      39.7       42.5       34.9
Dec      40.5       41.7       31.7

YR       517.4      558.4      438.9

Month    Off-Peak   Shoulder   On-Peak
         (kW)       (kW)       (kW)
Jan      194.4      190.1      184.6
Feb      189.5      197.4      192.2
Mar      190.1      201.7      196.0
Apr      221.3      215.8      206.0
May      231.7      228.0      223.5
Jun      225.5      225.8      218.1
Jul      236.0      238.5      234.8
Aug      234.9      231.2      227.0
Sep      225.1      224.0      219.7
Oct      219.0      215.7      209.9
Nov      191.9      192.1      195.1
Dec      187.4      190.4      191.5
YR       236.0      238.5      234.8
```

```
****************** Store Power ******************
```

| Month | Refrig (MWh) | HVAC Cmp (MWh) | Fans (MWh) | Heat&Blr (MWh) | Lite&Eqp (MWh) | Loop Pmp (MWh) | Cool Twr (MWh) | Total (MWh) |
|---|---|---|---|---|---|---|---|---|
| Jan | 45.3 | 1.5 | 10.0 | 0.1 | 60.0 | 0.0 | 0.0 | 116.9 |
| Feb | 41.0 | 1.9 | 9.1 | 0.0 | 54.2 | 0.0 | 0.0 | 106.2 |
| Mar | 46.4 | 4.1 | 10.0 | 0.0 | 60.0 | 0.0 | 0.0 | 120.6 |
| Apr | 47.2 | 7.9 | 9.7 | 0.0 | 58.1 | 0.0 | 0.0 | 122.9 |
| May | 52.3 | 12.5 | 10.0 | 0.0 | 60.0 | 0.0 | 0.0 | 134.8 |
| Jun | 52.3 | 14.7 | 9.7 | 0.0 | 58.1 | 0.0 | 0.0 | 134.8 |
| Jul | 56.4 | 17.2 | 10.0 | 0.0 | 60.0 | 0.0 | 0.0 | 143.7 |
| Aug | 55.7 | 16.8 | 10.0 | 0.0 | 60.0 | 0.0 | 0.0 | 142.5 |
| Sep | 51.8 | 13.7 | 9.7 | 0.0 | 58.1 | 0.0 | 0.0 | 133.2 |
| Oct | 49.7 | 8.5 | 10.0 | 0.0 | 60.0 | 0.0 | 0.0 | 128.2 |
| Nov | 45.3 | 4.0 | 9.7 | 0.0 | 58.1 | 0.0 | 0.0 | 117.1 |
| Dec | 44.4 | 1.8 | 9.7 | 0.0 | 58.1 | 0.0 | 0.0 | 114.0 |
| YR | 587.8 | 104.6 | 117.9 | 0.1 | 704.3 | 0.0 | 0.0 | 1514.7 |

| Month | Refrig (kW) | HVAC Cmp (kW) | Fans (kW) | Heat&Blr (kW) | Lite&Eqp (kW) | Loop Pmp (kW) | Cool Twr (kW) | Total (kW) |
|---|---|---|---|---|---|---|---|---|
| Jan | 80.0 | 22.4 | 13.5 | 11.8 | 100.0 | 0.0 | 0.0 | 194.4 |
| Feb | 79.0 | 25.4 | 13.5 | 0.4 | 100.0 | 0.0 | 0.0 | 197.4 |
| Mar | 78.0 | 29.5 | 13.5 | 0.0 | 100.0 | 0.0 | 0.0 | 201.7 |
| Apr | 85.3 | 37.5 | 13.5 | 0.0 | 100.0 | 0.0 | 0.0 | 221.3 |
| May | 89.7 | 46.9 | 13.5 | 0.0 | 100.0 | 0.0 | 0.0 | 231.7 |
| Jun | 88.9 | 43.9 | 13.5 | 0.0 | 100.0 | 0.0 | 0.0 | 225.8 |
| Jul | 95.5 | 50.7 | 13.5 | 0.0 | 100.0 | 0.0 | 0.0 | 238.5 |
| Aug | 93.5 | 48.4 | 13.5 | 0.0 | 100.0 | 0.0 | 0.0 | 234.9 |
| Sep | 90.7 | 46.0 | 13.5 | 0.0 | 100.0 | 0.0 | 0.0 | 225.1 |
| Oct | 87.3 | 40.2 | 13.5 | 0.0 | 100.0 | 0.0 | 0.0 | 219.0 |
| Nov | 76.5 | 28.3 | 13.5 | 0.0 | 100.0 | 0.0 | 0.0 | 195.1 |
| Dec | 74.7 | 26.0 | 13.5 | 0.0 | 100.0 | 0.0 | 0.0 | 191.5 |
| YR | 95.5 | 50.7 | 13.5 | 11.8 | 100.0 | 0.0 | 0.0 | 238.5 |

Fig. 36

****************** Gas Use ******************

| Month | Appliance (therms) | Loop Blr (therms) | Total (therms) |
|---|---|---|---|
| Jan | 0.0 | 0.0 | 0.0 |
| Feb | 0.0 | 0.0 | 0.0 |
| Mar | 0.0 | 0.0 | 0.0 |
| Apr | 0.0 | 0.0 | 0.0 |
| May | 0.0 | 0.0 | 0.0 |
| Jun | 0.0 | 0.0 | 0.0 |
| Jul | 0.0 | 0.0 | 0.0 |
| Aug | 0.0 | 0.0 | 0.0 |
| Sep | 0.0 | 0.0 | 0.0 |
| Oct | 0.0 | 0.0 | 0.0 |
| Nov | 0.0 | 0.0 | 0.0 |
| Dec | 0.0 | 0.0 | 0.0 |
| YR | 0.0 | 0.0 | 0.0 |

| Month | Appliance (MBtuh) | Loop Blr (MBtuh) | Total (MBtuh) |
|---|---|---|---|
| Jan | 0.0 | 0.0 | 0.0 |
| Feb | 0.0 | 0.0 | 0.0 |
| Mar | 0.0 | 0.0 | 0.0 |
| Apr | 0.0 | 0.0 | 0.0 |
| May | 0.0 | 0.0 | 0.0 |
| Jun | 0.0 | 0.0 | 0.0 |
| Jul | 0.0 | 0.0 | 0.0 |
| Aug | 0.0 | 0.0 | 0.0 |
| Sep | 0.0 | 0.0 | 0.0 |
| Oct | 0.0 | 0.0 | 0.0 |
| Nov | 0.0 | 0.0 | 0.0 |
| Dec | 0.0 | 0.0 | 0.0 |
| YR | 0.0 | 0.0 | 0.0 |

************ HVAC Gas Use ************

| Month | Zone 1 (therms) |
|-------|-----------------|
| Jan | 0.0 |
| Feb | 0.0 |
| Mar | 0.0 |
| Apr | 0.0 |
| May | 0.0 |
| Jun | 0.0 |
| Jul | 0.0 |
| Aug | 0.0 |
| Sep | 0.0 |
| Oct | 0.0 |
| Nov | 0.0 |
| Dec | 0.0 |
| YR  | 0.0 |

| Month | Zone 1 (MBtuh) |
|-------|----------------|
| Jan | 0.0 |
| Feb | 0.0 |
| Mar | 0.0 |
| Apr | 0.0 |
| May | 0.0 |
| Jun | 0.0 |
| Jul | 0.0 |
| Aug | 0.0 |
| Sep | 0.0 |
| Oct | 0.0 |
| Nov | 0.0 |
| Dec | 0.0 |
| YR  | 0.0 |

************ Total Refrigeration System ************

| Month | Cases (MWh) | Wlk Clr (MWh) | Comprsr (MWh) | Condsr (MWh) | Subclrs (MWh) | Tot Ref (MWh) |
|-------|-------------|---------------|---------------|--------------|---------------|---------------|
| Jan | 20.3 | 0.0 | 23.5 | 1.5 | 0.0 | 45.3 |
| Feb | 18.3 | 0.0 | 21.2 | 1.5 | 0.0 | 41.0 |
| Mar | 20.4 | 0.0 | 24.1 | 1.9 | 0.0 | 46.4 |
| Apr | 20.1 | 0.0 | 24.3 | 2.8 | 0.0 | 47.2 |
| May | 21.4 | 0.0 | 26.9 | 4.0 | 0.0 | 52.3 |
| Jun | 21.0 | 0.0 | 26.8 | 4.6 | 0.0 | 52.3 |
| Jul | 22.4 | 0.0 | 29.0 | 5.1 | 0.0 | 56.4 |
| Aug | 22.1 | 0.0 | 28.6 | 5.0 | 0.0 | 55.7 |
| Sep | 20.9 | 0.0 | 26.5 | 4.3 | 0.0 | 51.8 |
| Oct | 21.0 | 0.0 | 25.7 | 2.9 | 0.0 | 49.7 |
| Nov | 19.9 | 0.0 | 23.5 | 1.9 | 0.0 | 45.3 |
| Dec | 19.7 | 0.0 | 23.1 | 1.6 | 0.0 | 44.4 |
| YR  | 247.5 | 0.0 | 303.3 | 37.0 | 0.0 | 587.8 |

2025

| Month | Cases (kW) | Wlk Clr (kW) | Comprsr (kW) | Condsr (kW) | Subclrs (kW) | Tot Ref (kW) |
|---|---|---|---|---|---|---|
| Jan | 37.7 | 0.0 | 40.2 | 5.1 | 0.0 | 80.0 |
| Feb | 36.1 | 0.0 | 39.7 | 6.1 | 0.0 | 79.0 |
| Mar | 35.5 | 0.0 | 38.8 | 6.5 | 0.0 | 78.0 |
| Apr | 37.1 | 0.0 | 42.4 | 7.1 | 0.0 | 85.3 |
| May | 38.9 | 0.0 | 46.1 | 7.5 | 0.0 | 89.7 |
| Jun | 39.0 | 0.0 | 46.0 | 7.5 | 0.0 | 88.9 |
| Jul | 41.3 | 0.0 | 50.5 | 7.5 | 0.0 | 95.5 |
| Aug | 40.3 | 0.0 | 47.9 | 7.5 | 0.0 | 93.5 |
| Sep | 40.1 | 0.0 | 45.7 | 7.5 | 0.0 | 90.7 |
| Oct | 38.7 | 0.0 | 44.3 | 7.4 | 0.0 | 87.3 |
| Nov | 35.7 | 0.0 | 39.0 | 6.2 | 0.0 | 76.5 |
| Dec | 34.9 | 0.0 | 38.2 | 5.6 | 0.0 | 74.7 |
| YR | 41.3 | 0.0 | 50.5 | 7.5 | 0.0 | 95.5 |

************ All Display Cases ************

| Month | Lights (kWh) | Fans (kWh) | Defrost (kWh) | AS Htrs (kWh) | Tot Cas (kWh) |
|---|---|---|---|---|---|
| Jan | 7566.5 | 7479.5 | 2074.4 | 3147.1 | 20267.5 |
| Feb | 6834.2 | 6756.5 | 1858.3 | 2842.6 | 18291.6 |
| Mar | 7566.5 | 7474.0 | 2247.3 | 3147.1 | 20434.9 |
| Apr | 7322.4 | 7221.4 | 2516.2 | 3046.4 | 20106.3 |
| May | 7566.5 | 7443.3 | 3146.6 | 3246.4 | 21402.8 |
| Jun | 7322.4 | 7197.6 | 3207.4 | 3228.0 | 20955.3 |
| Jul | 7566.5 | 7430.9 | 3515.1 | 3850.3 | 22362.8 |
| Aug | 7566.5 | 7432.3 | 3468.1 | 3659.3 | 22126.1 |
| Sep | 7322.4 | 7199.2 | 3163.0 | 3247.4 | 20932.0 |
| Oct | 7566.5 | 7454.1 | 2828.8 | 3199.6 | 21049.0 |
| Nov | 7322.4 | 7229.8 | 2267.4 | 3045.6 | 19865.2 |
| Dec | 7322.4 | 7234.1 | 2133.8 | 3045.6 | 19735.9 |
| YR | 88845.1 | 87552.7 | 32426.4 | 38705.4 | 247529.5 |

↖ 2030

| Month | Lights (kW) | Fans (kW) | Defrost (kW) | AS Htrs (kW) | Tot Cas (kW) |
|---|---|---|---|---|---|
| Jan | 10.2 | 10.1 | 13.2 | 4.2 | 37.7 |
| Feb | 10.2 | 10.1 | 11.6 | 4.2 | 36.1 |
| Mar | 10.2 | 10.1 | 11.0 | 4.2 | 35.5 |
| Apr | 10.2 | 10.1 | 12.5 | 4.3 | 37.1 |
| May | 10.2 | 10.1 | 13.5 | 5.2 | 38.9 |
| Jun | 10.2 | 10.1 | 13.5 | 5.2 | 39.0 |
| Jul | 10.2 | 10.1 | 14.7 | 6.4 | 41.3 |
| Aug | 10.2 | 10.1 | 14.2 | 6.0 | 40.3 |
| Sep | 10.2 | 10.1 | 14.1 | 5.8 | 40.1 |
| Oct | 10.2 | 10.1 | 13.4 | 5.1 | 38.7 |
| Nov | 10.2 | 10.1 | 11.2 | 4.2 | 35.7 |
| Dec | 10.2 | 10.1 | 10.4 | 4.2 | 34.9 |
| YR | 10.2 | 10.1 | 14.7 | 6.4 | 41.3 |

Fig. 39

************ All Walkin Coolers ************

| Month | Lights (kWh) | Fans (kWh) | Defrost (kWh) | AS Htrs (kWh) | Tot Clr (kWh) |
|---|---|---|---|---|---|
| Jan | 0.0 | 0.0 | 0.0 | 0.0 | 0.0 |
| Feb | 0.0 | 0.0 | 0.0 | 0.0 | 0.0 |
| Mar | 0.0 | 0.0 | 0.0 | 0.0 | 0.0 |
| Apr | 0.0 | 0.0 | 0.0 | 0.0 | 0.0 |
| May | 0.0 | 0.0 | 0.0 | 0.0 | 0.0 |
| Jun | 0.0 | 0.0 | 0.0 | 0.0 | 0.0 |
| Jul | 0.0 | 0.0 | 0.0 | 0.0 | 0.0 |
| Aug | 0.0 | 0.0 | 0.0 | 0.0 | 0.0 |
| Sep | 0.0 | 0.0 | 0.0 | 0.0 | 0.0 |
| Oct | 0.0 | 0.0 | 0.0 | 0.0 | 0.0 |
| Nov | 0.0 | 0.0 | 0.0 | 0.0 | 0.0 |
| Dec | 0.0 | 0.0 | 0.0 | 0.0 | 0.0 |
| YR | 0.0 | 0.0 | 0.0 | 0.0 | 0.0 |

2040

| Month | Lights (kW) | Fans (kW) | Defrost (kW) | AS Htrs (kW) | Tot Clr (kW) |
|---|---|---|---|---|---|
| Jan | 0.0 | 0.0 | 0.0 | 0.0 | 0.0 |
| Feb | 0.0 | 0.0 | 0.0 | 0.0 | 0.0 |
| Mar | 0.0 | 0.0 | 0.0 | 0.0 | 0.0 |
| Apr | 0.0 | 0.0 | 0.0 | 0.0 | 0.0 |
| May | 0.0 | 0.0 | 0.0 | 0.0 | 0.0 |
| Jun | 0.0 | 0.0 | 0.0 | 0.0 | 0.0 |
| Jul | 0.0 | 0.0 | 0.0 | 0.0 | 0.0 |
| Aug | 0.0 | 0.0 | 0.0 | 0.0 | 0.0 |
| Sep | 0.0 | 0.0 | 0.0 | 0.0 | 0.0 |
| Oct | 0.0 | 0.0 | 0.0 | 0.0 | 0.0 |
| Nov | 0.0 | 0.0 | 0.0 | 0.0 | 0.0 |
| Dec | 0.0 | 0.0 | 0.0 | 0.0 | 0.0 |
| YR | 0.0 | 0.0 | 0.0 | 0.0 | 0.0 |

********** Annual Refrigeration Load Summary **********

| System | Refrig Load (ton-hrs) | Mech SC Load (ton-hrs) | Compressor (kW/ton) | Overall Sys (kW/ton) | Cond Load (10^6 Btu) |
|---|---|---|---|---|---|
| Rack A | 61432. | 0. | 1.79 | 1.99 | 1112.5 |
| Rack B | 45221. | 0. | 0.95 | 1.16 | 688.4 |
| Rack C | 61432. | 0. | 1.77 | 1.91 | 1102.0 |
| Rack D | 45221. | 0. | 0.93 | 1.07 | 685.5 |

Fig. 40

******** LOADS: Refrigeration rack A ********

| Month | Ref Load(MBtuh) | | | Unmet Ld(MBtuh) | | | Cond Rej (MBtuh) | | |
| --- | --- | --- | --- | --- | --- | --- | --- | --- | --- |
| | Min | Avg | Max | Min | Avg | Max | Min | Avg | Max |
| Jan | 70.2 | 79.9 | 103.2 | 0.0 | 0.0 | 0.0 | 105.1 | 119.5 | 154.5 |
| Feb | 70.0 | 79.8 | 101.5 | 0.0 | 0.0 | 0.0 | 104.8 | 119.5 | 152.0 |
| Mar | 71.5 | 81.3 | 99.5 | 0.0 | 0.0 | 0.0 | 107.1 | 121.7 | 149.0 |
| Apr | 72.8 | 83.4 | 104.2 | 0.0 | 0.0 | 0.0 | 108.9 | 125.1 | 159.1 |
| May | 73.7 | 86.5 | 108.5 | 0.0 | 0.0 | 0.0 | 110.2 | 130.9 | 168.8 |
| Jun | 74.0 | 87.6 | 108.6 | 0.0 | 0.0 | 0.0 | 110.8 | 133.3 | 167.5 |
| Jul | 74.1 | 89.9 | 114.0 | 0.0 | 0.0 | 0.0 | 110.9 | 137.8 | 179.7 |
| Aug | 74.3 | 89.2 | 111.5 | 0.0 | 0.0 | 0.0 | 111.2 | 136.4 | 173.7 |
| Sep | 74.0 | 87.4 | 111.3 | 0.0 | 0.0 | 0.0 | 110.8 | 132.6 | 169.6 |
| Oct | 73.1 | 84.6 | 107.9 | 0.0 | 0.0 | 0.0 | 109.4 | 127.0 | 164.1 |
| Nov | 71.1 | 81.8 | 100.0 | 0.0 | 0.0 | 0.0 | 106.4 | 122.4 | 149.6 |
| Dec | 71.6 | 80.8 | 98.0 | 0.0 | 0.0 | 0.0 | 107.2 | 121.0 | 146.7 |
| YR | 70.0 | 84.3 | 114.0 | 0.0 | 0.0 | 0.0 | 104.8 | 127.3 | 179.7 |

******** CONDITIONS: Refrigeration rack A ********

| Month | SST (F) | | | SDT (F) | | | SC (F) | | | SH (F) | | |
| --- | --- | --- | --- | --- | --- | --- | --- | --- | --- | --- | --- | --- |
| | Min | Avg | Max | Min | Avg | Max | Min | Avg | Max | Min | Avg | Max |
| Jan | -29.5 | -29.5 | -29.5 | 82.0 | 82.0 | 82.0 | 5.0 | 5.0 | 5.0 | 15.0 | 15.0 | 15.0 |
| Feb | -29.5 | -29.5 | -29.5 | 82.0 | 82.0 | 85.5 | 5.0 | 5.0 | 5.0 | 15.0 | 15.0 | 15.0 |
| Mar | -29.5 | -29.5 | -29.5 | 82.0 | 82.0 | 87.1 | 5.0 | 5.0 | 5.0 | 15.0 | 15.0 | 15.0 |
| Apr | -29.5 | -29.5 | -29.5 | 82.0 | 83.0 | 100.4 | 5.0 | 5.0 | 5.0 | 15.0 | 15.0 | 15.0 |
| May | -29.5 | -29.5 | -29.5 | 82.0 | 85.6 | 106.3 | 5.0 | 5.0 | 5.0 | 15.0 | 15.0 | 15.0 |
| Jun | -29.5 | -29.5 | -29.5 | 82.0 | 87.6 | 102.8 | 5.0 | 5.0 | 5.0 | 15.0 | 15.0 | 15.0 |
| Jul | -29.5 | -29.5 | -29.5 | 82.0 | 90.1 | 108.7 | 5.0 | 5.0 | 5.0 | 15.0 | 15.0 | 15.0 |
| Aug | -29.5 | -29.5 | -29.5 | 82.0 | 89.4 | 108.1 | 5.0 | 5.0 | 5.0 | 15.0 | 15.0 | 15.0 |
| Sep | -29.5 | -29.5 | -29.5 | 82.0 | 86.6 | 104.3 | 5.0 | 5.0 | 5.0 | 15.0 | 15.0 | 15.0 |
| Oct | -29.5 | -29.5 | -29.5 | 82.0 | 83.0 | 95.3 | 5.0 | 5.0 | 5.0 | 15.0 | 15.0 | 15.0 |
| Nov | -29.5 | -29.5 | -29.5 | 82.0 | 82.0 | 85.5 | 5.0 | 5.0 | 5.0 | 15.0 | 15.0 | 15.0 |
| Dec | -29.5 | -29.5 | -29.5 | 82.0 | 82.0 | 82.0 | 5.0 | 5.0 | 5.0 | 15.0 | 15.0 | 15.0 |
| YR | -29.5 | -29.5 | -29.5 | 82.0 | 84.6 | 108.7 | 5.0 | 5.0 | 5.0 | 15.0 | 15.0 | 15.0 |

Fig. 4

******** ENERGY USE: Refrigeration Rack A ********

| Month | Cases (MWh) | Clrs (MWh) | Comprsr (MWh) | Condsr (MWh) | Subclrs (MWh) | Tot Ref (MWh) |
|---|---|---|---|---|---|---|
| Jan | 8.2 | 0.0 | 8.6 | 0.5 | 0.0 | 17.3 |
| Feb | 7.4 | 0.0 | 7.8 | 0.5 | 0.0 | 15.6 |
| Mar | 8.3 | 0.0 | 8.8 | 0.6 | 0.0 | 17.7 |
| Apr | 8.2 | 0.0 | 8.8 | 1.0 | 0.0 | 18.0 |
| May | 8.7 | 0.0 | 9.7 | 1.3 | 0.0 | 19.8 |
| Jun | 8.6 | 0.0 | 9.6 | 1.5 | 0.0 | 19.8 |
| Jul | 9.2 | 0.0 | 10.4 | 1.6 | 0.0 | 21.3 |
| Aug | 9.1 | 0.0 | 10.3 | 1.6 | 0.0 | 21.0 |
| Sep | 8.6 | 0.0 | 9.5 | 1.4 | 0.0 | 19.5 |
| Oct | 8.6 | 0.0 | 9.2 | 1.0 | 0.0 | 18.8 |
| Nov | 8.0 | 0.0 | 8.6 | 0.6 | 0.0 | 17.2 |
| Dec | 8.0 | 0.0 | 8.5 | 0.5 | 0.0 | 16.9 |
| YR | 100.7 | 0.0 | 110.0 | 12.2 | 0.0 | 222.8 |

| Month | Cases (kW) | Clrs (kW) | Comprsr (kW) | Condsr (kW) | Subclrs (kW) | Tot Ref (kW) |
|---|---|---|---|---|---|---|
| Jan | 16.2 | 0.0 | 15.0 | 1.9 | 0.0 | 31.5 |
| Feb | 15.4 | 0.0 | 14.8 | 2.2 | 0.0 | 31.0 |
| Mar | 15.1 | 0.0 | 14.5 | 2.2 | 0.0 | 31.1 |
| Apr | 15.9 | 0.0 | 16.3 | 2.2 | 0.0 | 34.0 |
| May | 16.8 | 0.0 | 17.8 | 2.2 | 0.0 | 35.5 |
| Jun | 16.9 | 0.0 | 17.7 | 2.2 | 0.0 | 35.2 |
| Jul | 18.0 | 0.0 | 19.2 | 2.2 | 0.0 | 37.6 |
| Aug | 17.5 | 0.0 | 18.2 | 2.2 | 0.0 | 37.2 |
| Sep | 17.4 | 0.0 | 17.3 | 2.2 | 0.0 | 35.5 |
| Oct | 16.7 | 0.0 | 16.7 | 2.2 | 0.0 | 34.4 |
| Nov | 15.2 | 0.0 | 14.6 | 2.2 | 0.0 | 30.0 |
| Dec | 14.8 | 0.0 | 14.3 | 2.2 | 0.0 | 29.4 |
| YR | 18.0 | 0.0 | 19.2 | 2.2 | 0.0 | 37.6 |

2050

******** DEFROST RUN TIMES: Refrigeration Rack   A ********

| Month | Cases (hours) | Clrs (hours) |
|---|---|---|
| Jan | 138.7 | 0.0 |
| Feb | 123.6 | 0.0 |
| Mar | 149.6 | 0.0 |
| Apr | 167.6 | 0.0 |
| May | 210.1 | 0.0 |
| Jun | 214.3 | 0.0 |
| Jul | 234.6 | 0.0 |
| Aug | 231.7 | 0.0 |
| Sep | 211.2 | 0.0 |
| Oct | 189.1 | 0.0 |
| Nov | 151.0 | 0.0 |
| Dec | 142.4 | 0.0 |
| YR  | 2163.8 | 0.0 |

************ HVAC Energy Use - ZONE   1 ************

| Month | Compressr (MWh) | Fans (MWh) | Resist Ht (MWh) |
|---|---|---|---|
| Jan | 1.5 | 10.0 | 0.1 |
| Feb | 1.9 | 9.1 | 0.0 |
| Mar | 4.1 | 10.0 | 0.0 |
| Apr | 7.9 | 9.7 | 0.0 |
| May | 12.5 | 10.0 | 0.0 |
| Jun | 14.7 | 9.7 | 0.0 |
| Jul | 17.2 | 10.0 | 0.0 |
| Aug | 16.8 | 10.0 | 0.0 |
| Sep | 13.7 | 9.7 | 0.0 |
| Oct | 8.5 | 10.0 | 0.0 |
| Nov | 4.0 | 9.7 | 0.0 |
| Dec | 1.8 | 9.7 | 0.0 |
| YR | 104.6 | 117.9 | 0.1 |

| Month | Compressr (kW) | Fans (kW) | Resist Ht (kW) |
|---|---|---|---|
| Jan | 22.4 | 13.5 | 11.8 |
| Feb | 25.4 | 13.5 | 0.4 |
| Mar | 29.5 | 13.5 | 0.0 |
| Apr | 37.5 | 13.5 | 0.0 |
| May | 46.9 | 13.5 | 0.0 |
| Jun | 43.9 | 13.5 | 0.0 |
| Jul | 50.7 | 13.5 | 0.0 |
| Aug | 48.4 | 13.5 | 0.0 |
| Sep | 46.0 | 13.5 | 0.0 |
| Oct | 40.2 | 13.5 | 0.0 |
| Nov | 28.3 | 13.5 | 0.0 |
| Dec | 26.0 | 13.5 | 0.0 |
| YR | 50.7 | 13.5 | 11.8 |

******** HVAC Operating Hours - ZONE 1 ********

| Month | Economisr (hours) | DX Sys 1 (hours) | DX Sys 2 (hours) | DX1 addnl (hours) | DX2 addnl (hours) | HP Sys 1 (hours) | HP Sys 2 (hours) |
|---|---|---|---|---|---|---|---|
| Jan | 0.0 | 34.0 | 0.0 | 0.0 | 0.0 | 0.0 | 0.0 |
| Feb | 0.0 | 41.9 | 0.0 | 0.0 | 0.0 | 0.0 | 0.0 |
| Mar | 0.0 | 88.0 | 0.0 | 0.0 | 0.0 | 0.0 | 0.0 |
| Apr | 0.0 | 154.5 | 0.0 | 0.0 | 0.0 | 0.0 | 0.0 |
| May | 0.0 | 226.1 | 0.0 | 0.0 | 0.0 | 0.0 | 0.0 |
| Jun | 0.0 | 258.5 | 0.0 | 0.0 | 0.0 | 0.0 | 0.0 |
| Jul | 0.0 | 293.5 | 0.0 | 0.0 | 0.0 | 0.0 | 0.0 |
| Aug | 0.0 | 289.3 | 0.0 | 0.0 | 0.0 | 0.0 | 0.0 |
| Sep | 0.0 | 243.8 | 0.0 | 0.0 | 0.0 | 0.0 | 0.0 |
| Oct | 0.0 | 165.7 | 0.0 | 0.0 | 0.0 | 0.0 | 0.0 |
| Nov | 0.0 | 86.0 | 0.0 | 0.0 | 0.0 | 0.0 | 0.0 |
| Dec | 0.0 | 40.6 | 0.0 | 0.0 | 0.0 | 0.0 | 0.0 |
| YR | 0.0 | 1921.8 | 0.0 | 0.0 | 0.0 | 0.0 | 0.0 |

| Month | Economisr (max %ON) | DX Sys 1 (max %ON) | DX Sys 2 (max %ON) | DX1 addnl (max %ON) | DX2 addnl (max %ON) | HP Sys 1 (max %ON) | HP Sys 2 (max %ON) |
|---|---|---|---|---|---|---|---|
| Jan | 0.0 | 46.3 | 0.0 | 0.0 | 0.0 | 0.0 | 0.0 |
| Feb | 0.0 | 48.2 | 0.0 | 0.0 | 0.0 | 0.0 | 0.0 |
| Mar | 0.0 | 54.0 | 0.0 | 0.0 | 0.0 | 0.0 | 0.0 |
| Apr | 0.0 | 63.5 | 0.0 | 0.0 | 0.0 | 0.0 | 0.0 |
| May | 0.0 | 74.1 | 0.0 | 0.0 | 0.0 | 0.0 | 0.0 |
| Jun | 0.0 | 70.1 | 0.0 | 0.0 | 0.0 | 0.0 | 0.0 |
| Jul | 0.0 | 78.1 | 0.0 | 0.0 | 0.0 | 0.0 | 0.0 |
| Aug | 0.0 | 75.9 | 0.0 | 0.0 | 0.0 | 0.0 | 0.0 |
| Sep | 0.0 | 73.8 | 0.0 | 0.0 | 0.0 | 0.0 | 0.0 |
| Oct | 0.0 | 67.3 | 0.0 | 0.0 | 0.0 | 0.0 | 0.0 |
| Nov | 0.0 | 52.5 | 0.0 | 0.0 | 0.0 | 0.0 | 0.0 |
| Dec | 0.0 | 49.8 | 0.0 | 0.0 | 0.0 | 0.0 | 0.0 |
| YR | 0.0 | 78.1 | 0.0 | 0.0 | 0.0 | 0.0 | 0.0 |

NOTE: addnl - additional hours of operation for humidity control
SYS 1 is outdoor coil in dual path system

************* Space Loads - ZONE 1 *************

| Month | Envelope 10^6 Btu | Inf. Sen 10^6 Btu | Inf. Lat 10^6 Btu | Gain Sen 10^6 Btu | Case Sen 10^6 Btu | Gain Lat 10^6 Btu | Case Lat 10^6 Btu |
|---|---|---|---|---|---|---|---|
| Jan | -56.5 | -11.5 | -1.0 | 220.5 | -56.4 | 20.3 | -8.3 |
| Feb | -48.5 | -9.7 | -0.4 | 199.3 | -51.0 | 18.4 | -7.4 |
| Mar | -33.2 | -8.5 | 0.1 | 220.6 | -57.5 | 20.3 | -9.9 |
| Apr | -9.9 | -4.5 | 2.1 | 213.5 | -56.1 | 19.7 | -12.9 |
| May | 7.2 | -1.8 | 5.5 | 220.6 | -58.2 | 20.3 | -18.6 |
| Jun | 18.1 | -0.1 | 6.8 | 213.5 | -56.3 | 19.7 | -19.6 |
| Jul | 23.1 | 0.7 | 9.4 | 220.6 | -58.2 | 20.3 | -22.2 |
| Aug | 24.0 | 0.5 | 8.5 | 220.6 | -58.2 | 20.3 | -21.8 |
| Sep | 14.9 | -0.9 | 6.4 | 213.5 | -56.3 | 19.7 | -19.2 |
| Oct | -6.9 | -4.9 | 2.8 | 220.6 | -58.0 | 20.3 | -15.5 |
| Nov | -33.0 | -8.1 | 0.6 | 213.5 | -55.6 | 19.7 | -10.5 |
| Dec | -52.1 | -10.3 | -0.5 | 213.5 | -55.2 | 19.7 | -9.2 |
| YR | -152.9 | -59.0 | 40.1 | 2590.4 | -676.9 | 238.8 | -175.2 |

| Month | Envelope 10^3 Btuh | Inf. Sen 10^3 Btuh | Inf. Lat 10^3 Btuh | Gain Sen 10^3 Btuh | Case Sen 10^3 Btuh | Gain Lat 10^3 Btuh | Case Lat 10^3 Btuh |
|---|---|---|---|---|---|---|---|
| Jan | 110.7 | -3.0 | 10.8 | 347.2 | -70.7 | 32.0 | -5.1 |
| Feb | 105.6 | -0.9 | 14.8 | 347.2 | -70.7 | 32.0 | -5.1 |
| Mar | 111.3 | 0.1 | 11.1 | 347.2 | -70.7 | 32.0 | -5.9 |
| Apr | 115.3 | 6.9 | 16.1 | 347.2 | -75.1 | 32.0 | -11.0 |
| May | 134.1 | 9.8 | 21.7 | 347.2 | -76.5 | 32.0 | -18.4 |
| Jun | 111.8 | 7.9 | 19.1 | 347.2 | -78.1 | 32.0 | -21.3 |
| Jul | 127.1 | 10.8 | 25.1 | 347.2 | -77.9 | 32.0 | -22.8 |
| Aug | 146.7 | 10.8 | 22.3 | 347.2 | -78.2 | 32.0 | -24.7 |
| Sep | 147.0 | 8.9 | 22.6 | 347.2 | -77.8 | 32.0 | -22.1 |
| Oct | 147.2 | 4.0 | 20.5 | 347.2 | -75.5 | 32.0 | -13.7 |
| Nov | 118.4 | -0.9 | 11.7 | 347.2 | -70.7 | 32.0 | -5.2 |

********** Ventilation Loads - ZONE 1 ***************

| Month | SenVnt(+) 10^6 Btu | SenVnt(-) 10^6 Btu | LatVnt(+) 10^6 Btu | LatVnt(-) 10^6 Btu | AAHX(+) 10^6 Btu | AAHX(-) 10^6 Btu |
|---|---|---|---|---|---|---|
| Jan | 0.0  | -50.0 | 2.7  | -7.1  | 0.0 | 0.0 |
| Feb | 0.0  | -42.0 | 4.5  | -5.8  | 0.0 | 0.0 |
| Mar | 0.0  | -36.2 | 6.6  | -5.5  | 0.0 | 0.0 |
| Apr | 1.0  | -19.2 | 12.9 | -2.2  | 0.0 | 0.0 |
| May | 4.0  | -9.1  | 28.0 | -0.6  | 0.0 | 0.0 |
| Jun | 5.5  | -2.9  | 33.1 | 0.0   | 0.0 | 0.0 |
| Jul | 8.5  | -2.1  | 45.5 | 0.0   | 0.0 | 0.0 |
| Aug | 7.8  | -2.4  | 41.3 | 0.0   | 0.0 | 0.0 |
| Sep | 4.6  | -5.5  | 31.1 | -0.1  | 0.0 | 0.0 |
| Oct | 0.9  | -20.5 | 15.4 | -1.2  | 0.0 | 0.0 |
| Nov | 0.0  | -34.5 | 7.3  | -3.8  | 0.0 | 0.0 |
| Dec | 0.0  | -44.3 | 4.6  | -6.2  | 0.0 | 0.0 |
| YR  | 32.3 | -268.7| 233.0| -32.4 | 0.0 | 0.0 |

| Month | SenVnt(+) 10^3 Btuh | SenVnt(-) 10^3 Btuh | LatVnt(+) 10^3 Btuh | LatVnt(-) 10^3 Btuh | AAHX(+) 10^3 Btuh | AAHX(-) 10^3 Btuh |
|---|---|---|---|---|---|---|
| Jan | 0.0  | -8.5 | 44.1  | 0.0 | 0.0 | 0.0 |
| Feb | 3.2  | 0.0  | 60.9  | 0.0 | 0.0 | 0.0 |
| Mar | 7.1  | 0.0  | 45.7  | 0.0 | 0.0 | 0.0 |
| Apr | 34.3 | 0.0  | 66.0  | 0.0 | 0.0 | 0.0 |
| May | 46.0 | 0.0  | 88.8  | 0.0 | 0.0 | 0.0 |
| Jun | 38.2 | 0.0  | 83.8  | 0.0 | 0.0 | 0.0 |
| Jul | 49.9 | 0.0  | 102.8 | 0.0 | 0.0 | 0.0 |
| Aug | 49.9 | 0.0  | 91.9  | 0.0 | 0.0 | 0.0 |
| Sep | 42.1 | 0.0  | 93.0  | 0.0 | 0.0 | 0.0 |
| Oct | 22.6 | 0.0  | 84.5  | 0.0 | 0.0 | 0.0 |
| Nov | 3.2  | 0.0  | 50.5  | 0.0 | 0.0 | 0.0 |
| Dec | 0.0  | -4.6 | 64.0  | 0.0 | 0.0 | 0.0 |
| YR  | 49.9 | 0.0  | 102.8 | 0.0 | 0.0 | 0.0 |

************ Air System Loads - ZONE 1 ************

| Month | SenEcn(+)<br>10^6 Btu | SenEcn(-)<br>10^6 Btu | LatEcn(+)<br>10^6 Btu | LatEcn(-)<br>10^6 Btu | Sen DX #1<br>10^6 Btu | Lat DX #1<br>10^6 Btu | Sen DX #2<br>10^6 Btu | Lat DX #2<br>10^6 Btu |
|---|---|---|---|---|---|---|---|---|
| Jan | 0.0 | 0.0 | 0.0 | 0.0 | -23.7 | -0.4 | 0.0 | 0.0 |
| Feb | 0.0 | 0.0 | 0.0 | 0.0 | -28.5 | -0.8 | 0.0 | 0.0 |
| Mar | 0.0 | 0.0 | 0.0 | 0.0 | -60.0 | -1.1 | 0.0 | 0.0 |
| Apr | 0.0 | 0.0 | 0.0 | 0.0 | -99.6 | -4.8 | 0.0 | 0.0 |
| May | 0.0 | 0.0 | 0.0 | 0.0 | -136.7 | -15.0 | 0.0 | 0.0 |
| Jun | 0.0 | 0.0 | 0.0 | 0.0 | -152.5 | -20.1 | 0.0 | 0.0 |
| Jul | 0.0 | 0.0 | 0.0 | 0.0 | -166.6 | -29.5 | 0.0 | 0.0 |
| Aug | 0.0 | 0.0 | 0.0 | 0.0 | -166.1 | -26.8 | 0.0 | 0.0 |
| Sep | 0.0 | 0.0 | 0.0 | 0.0 | -145.0 | -18.5 | 0.0 | 0.0 |
| Oct | 0.0 | 0.0 | 0.0 | 0.0 | -105.5 | -7.7 | 0.0 | 0.0 |
| Nov | 0.0 | 0.0 | 0.0 | 0.0 | -58.1 | -1.9 | 0.0 | 0.0 |
| Dec | 0.0 | 0.0 | 0.0 | 0.0 | -28.0 | -0.7 | 0.0 | 0.0 |
| YR | 0.0 | 0.0 | 0.0 | 0.0 | -1170.5 | -127.3 | 0.0 | 0.0 |

| Month | SenEcn(+)<br>10^3 Btuh | SenEcn(-)<br>10^3 Btuh | LatEcn(+)<br>10^3 Btuh | LatEcn(-)<br>10^3 Btuh | Sen DX #1<br>10^3 Btuh | Lat DX #1<br>10^3 Btuh | Sen DX #2<br>10^3 Btuh | Lat DX #2<br>10^3 Btuh |
|---|---|---|---|---|---|---|---|---|
| Jan | 0.0 | 0.0 | 0.0 | 0.0 | 0.0 | 0.0 | 0.0 | 0.0 |
| Feb | 0.0 | 0.0 | 0.0 | 0.0 | 0.0 | 0.0 | 0.0 | 0.0 |
| Mar | 0.0 | 0.0 | 0.0 | 0.0 | 0.0 | 0.0 | 0.0 | 0.0 |
| Apr | 0.0 | 0.0 | 0.0 | 0.0 | 0.0 | 0.0 | 0.0 | 0.0 |
| May | 0.0 | 0.0 | 0.0 | 0.0 | 0.0 | 0.0 | 0.0 | 0.0 |
| Jun | 0.0 | 0.0 | 0.0 | 0.0 | 0.0 | 0.0 | 0.0 | 0.0 |
| Jul | 0.0 | 0.0 | 0.0 | 0.0 | 0.0 | 0.0 | 0.0 | 0.0 |
| Aug | 0.0 | 0.0 | 0.0 | 0.0 | 0.0 | 0.0 | 0.0 | 0.0 |
| Sep | 0.0 | 0.0 | 0.0 | 0.0 | 0.0 | 0.0 | 0.0 | 0.0 |
| Oct | 0.0 | 0.0 | 0.0 | 0.0 | 0.0 | 0.0 | 0.0 | 0.0 |
| Nov | 0.0 | 0.0 | 0.0 | 0.0 | 0.0 | 0.0 | 0.0 | 0.0 |
| Dec | 0.0 | 0.0 | 0.0 | 0.0 | 0.0 | 0.0 | 0.0 | 0.0 |
| YR | 0.0 | 0.0 | 0.0 | 0.0 | 0.0 | 0.0 | 0.0 | 0.0 |

************ Ventilation Rates - ZONE 1 ************

| Month | Vent Flow (cfm) | | | Actual (cfm/p) | | |
|---|---|---|---|---|---|---|
| | Min | Avg | Max | Min | Avg | Max |
| Jan | 2000.0 | 2000.0 | 2000.0 | 12.5 | 16.1 | 25.0 |
| Feb | 2000.0 | 2000.0 | 2000.0 | 12.5 | 16.1 | 25.0 |
| Mar | 2000.0 | 2000.0 | 2000.0 | 12.5 | 16.1 | 25.0 |
| Apr | 2000.0 | 2000.0 | 2000.0 | 12.5 | 16.1 | 25.0 |
| May | 2000.0 | 2000.0 | 2000.0 | 12.5 | 16.1 | 25.0 |
| Jun | 2000.0 | 2000.0 | 2000.0 | 12.5 | 16.1 | 25.0 |
| Jul | 2000.0 | 2000.0 | 2000.0 | 12.5 | 16.1 | 25.0 |
| Aug | 2000.0 | 2000.0 | 2000.0 | 12.5 | 16.1 | 25.0 |
| Sep | 2000.0 | 2000.0 | 2000.0 | 12.5 | 16.1 | 25.0 |
| Oct | 2000.0 | 2000.0 | 2000.0 | 12.5 | 16.1 | 25.0 |
| Nov | 2000.0 | 2000.0 | 2000.0 | 12.5 | 16.1 | 25.0 |
| Dec | 2000.0 | 2000.0 | 2000.0 | 12.5 | 16.1 | 25.0 |
| YR | 2000.0 | 2000.0 | 2000.0 | 12.5 | 16.1 | 25.0 |

************ Hot Gas Bypass Degradation - ZONE 1 ************

| Month | DX1 Degrade (%) | | | DX2 Degrade (%) | | |
|---|---|---|---|---|---|---|
| | Min | Avg | Max | Min | Avg | Max |
| Jan | 100.0 | 100.0 | 100.0 | 0.0 | 0.0 | 0.0 |
| Feb | 100.0 | 100.0 | 100.0 | 0.0 | 0.0 | 0.0 |
| Mar | 100.0 | 100.0 | 100.0 | 0.0 | 0.0 | 0.0 |
| Apr | 100.0 | 100.0 | 100.0 | 0.0 | 0.0 | 0.0 |
| May | 100.0 | 100.0 | 100.0 | 0.0 | 0.0 | 0.0 |
| Jun | 100.0 | 100.0 | 100.0 | 0.0 | 0.0 | 0.0 |
| Jul | 100.0 | 100.0 | 100.0 | 0.0 | 0.0 | 0.0 |
| Aug | 100.0 | 100.0 | 100.0 | 0.0 | 0.0 | 0.0 |
| Sep | 100.0 | 100.0 | 100.0 | 0.0 | 0.0 | 0.0 |
| Oct | 100.0 | 100.0 | 100.0 | 0.0 | 0.0 | 0.0 |
| Nov | 100.0 | 100.0 | 100.0 | 0.0 | 0.0 | 0.0 |
| Dec | 100.0 | 100.0 | 100.0 | 0.0 | 0.0 | 0.0 |
| YR | 100.0 | 100.0 | 100.0 | 0.0 | 0.0 | 0.0 |

2080

************ Heating ************

| Month | Ht Reclm $10^6$ Btu | Heat Pmps $10^6$ Btu | Purch Ht $10^6$ Btu | Boilr Ht $10^6$ Btu | Tot Heat $10^6$ Btu |
|---|---|---|---|---|---|
| Jan | 3.5 | 0.0 | 0.2 | 0.0 | 3.7 |
| Feb | 2.5 | 0.0 | 0.0 | 0.0 | 2.5 |
| Mar | 0.0 | 0.0 | 0.0 | 0.0 | 0.0 |
| Apr | 0.0 | 0.0 | 0.0 | 0.0 | 0.0 |
| May | 0.0 | 0.0 | 0.0 | 0.0 | 0.0 |
| Jun | 0.0 | 0.0 | 0.0 | 0.0 | 0.0 |
| Jul | 0.0 | 0.0 | 0.0 | 0.0 | 0.0 |
| Aug | 0.0 | 0.0 | 0.0 | 0.0 | 0.0 |
| Sep | 0.0 | 0.0 | 0.0 | 0.0 | 0.0 |
| Oct | 0.0 | 0.0 | 0.0 | 0.0 | 0.0 |
| Nov | 0.4 | 0.0 | 0.0 | 0.0 | 0.4 |
| Dec | 0.0 | 0.0 | 0.0 | 0.0 | 0.0 |
| YR | 6.3 | 0.0 | 0.2 | 0.0 | 6.5 |

| Month | Ht Reclm $10^3$ Btuh | Heat Pmps $10^3$ Btuh | Purch Ht $10^3$ Btuh | Boilr Ht $10^3$ Btuh | Tot Heat $10^3$ Btuh |
|---|---|---|---|---|---|
| Jan | 174.5 | 0.0 | 40.2 | 0.0 | 201.4 |
| Feb | 165.5 | 0.0 | 1.4 | 0.0 | 167.0 |
| Mar | 13.7 | 0.0 | 0.0 | 0.0 | 13.7 |
| Apr | 0.0 | 0.0 | 0.0 | 0.0 | 0.0 |
| May | 0.0 | 0.0 | 0.0 | 0.0 | 0.0 |
| Jun | 0.0 | 0.0 | 0.0 | 0.0 | 0.0 |
| Jul | 0.0 | 0.0 | 0.0 | 0.0 | 0.0 |
| Aug | 0.0 | 0.0 | 0.0 | 0.0 | 0.0 |
| Sep | 0.0 | 0.0 | 0.0 | 0.0 | 0.0 |
| Oct | 0.0 | 0.0 | 0.0 | 0.0 | 0.0 |
| Nov | 147.8 | 0.0 | 0.0 | 0.0 | 147.8 |
| Dec | 0.0 | 0.0 | 0.0 | 0.0 | 0.0 |
| YR | 174.5 | 0.0 | 40.2 | 0.0 | 201.4 |

Fig. 48

**************** Water Loop Performance****************

| Month | Loop Temp (F) | | | Loop DeltaT (F) | | | Loop Flow (gpm) | | |
|---|---|---|---|---|---|---|---|---|---|
| | Min | Avg | Max | Min | Avg | Max | Min | Avg | Max |
| Jan | 40.0 | 40.0 | 40.0 | 0.0 | 0.0 | 0.0 | 0.0 | 0.0 | 0.0 |
| Feb | 40.0 | 40.0 | 40.0 | 0.0 | 0.0 | 0.0 | 0.0 | 0.0 | 0.0 |
| Mar | 40.0 | 40.0 | 40.0 | 0.0 | 0.0 | 0.0 | 0.0 | 0.0 | 0.0 |
| Apr | 40.0 | 40.0 | 40.0 | 0.0 | 0.0 | 0.0 | 0.0 | 0.0 | 0.0 |
| May | 40.0 | 40.0 | 40.0 | 0.0 | 0.0 | 0.0 | 0.0 | 0.0 | 0.0 |
| Jun | 40.0 | 40.0 | 40.0 | 0.0 | 0.0 | 0.0 | 0.0 | 0.0 | 0.0 |
| Jul | 40.0 | 40.0 | 40.0 | 0.0 | 0.0 | 0.0 | 0.0 | 0.0 | 0.0 |
| Aug | 40.0 | 40.0 | 40.0 | 0.0 | 0.0 | 0.0 | 0.0 | 0.0 | 0.0 |
| Sep | 40.0 | 40.0 | 40.0 | 0.0 | 0.0 | 0.0 | 0.0 | 0.0 | 0.0 |
| Oct | 40.0 | 40.0 | 40.0 | 0.0 | 0.0 | 0.0 | 0.0 | 0.0 | 0.0 |
| Nov | 40.0 | 40.0 | 40.0 | 0.0 | 0.0 | 0.0 | 0.0 | 0.0 | 0.0 |
| Dec | 40.0 | 40.0 | 40.0 | 0.0 | 0.0 | 0.0 | 0.0 | 0.0 | 0.0 |
| YR | 40.0 | 40.0 | 40.0 | 0.0 | 0.0 | 0.0 | 0.0 | 0.0 | 0.0 |

| Month | Loop Q (MBtuh) | | | Lp QREF (MBtuh) | | | Lp QHVC (MBtuh) | | |
|---|---|---|---|---|---|---|---|---|---|
| | Min | Avg | Max | Min | Avg | Max | Min | Avg | Max |
| Jan | 0.0 | 0.0 | 0.0 | 0.0 | 0.0 | 0.0 | 0.0 | 0.0 | 0.0 |
| Feb | 0.0 | 0.0 | 0.0 | 0.0 | 0.0 | 0.0 | 0.0 | 0.0 | 0.0 |
| Mar | 0.0 | 0.0 | 0.0 | 0.0 | 0.0 | 0.0 | 0.0 | 0.0 | 0.0 |
| Apr | 0.0 | 0.0 | 0.0 | 0.0 | 0.0 | 0.0 | 0.0 | 0.0 | 0.0 |
| May | 0.0 | 0.0 | 0.0 | 0.0 | 0.0 | 0.0 | 0.0 | 0.0 | 0.0 |
| Jun | 0.0 | 0.0 | 0.0 | 0.0 | 0.0 | 0.0 | 0.0 | 0.0 | 0.0 |
| Jul | 0.0 | 0.0 | 0.0 | 0.0 | 0.0 | 0.0 | 0.0 | 0.0 | 0.0 |
| Aug | 0.0 | 0.0 | 0.0 | 0.0 | 0.0 | 0.0 | 0.0 | 0.0 | 0.0 |
| Sep | 0.0 | 0.0 | 0.0 | 0.0 | 0.0 | 0.0 | 0.0 | 0.0 | 0.0 |
| Oct | 0.0 | 0.0 | 0.0 | 0.0 | 0.0 | 0.0 | 0.0 | 0.0 | 0.0 |
| Nov | 0.0 | 0.0 | 0.0 | 0.0 | 0.0 | 0.0 | 0.0 | 0.0 | 0.0 |
| Dec | 0.0 | 0.0 | 0.0 | 0.0 | 0.0 | 0.0 | 0.0 | 0.0 | 0.0 |
| YR | 0.0 | 0.0 | 0.0 | 0.0 | 0.0 | 0.0 | 0.0 | 0.0 | 0.0 |

METHOD OF AND SYSTEM FOR AUDITING THE ENERGY-USAGE OF A FACILITY

FIELD OF THE INVENTION

The present invention relates to a method of and system for auditing the energy-usage of a facility (e.g., a supermarket).

BACKGROUND OF THE INVENTION

Owners of commercial facilities are always searching for methods to improve the performance and profitability of the numerous systems and equipment at their facilities. For example, a supermarket or food distribution warehouse includes refrigeration systems; lighting systems; heating, ventilation, and air-conditioning (HVAC) systems; and other miscellaneous equipment and systems that are expensive to operate and maintain. It would be beneficial to adjust the operation of the systems and equipment at a facility to increase the efficiency of the facility, thereby potentially reducing the cost to operate the facility.

SUMMARY OF THE INVENTION

Improving the performance and efficiency of the systems of a facility typically involves understanding and controlling numerous interdependent variables involved in the operation of the systems and the parameters of the facility. The invention provides a method of auditing the operations at a facility to determine actions to reduce energy-usage and lower maintenance costs.

In one embodiment, the invention provides a method of auditing the energy-usage by a facility, where the facility includes an energy-using system having an operating parameter with a value. The method includes acquiring an initial value of the operating parameter, acquiring initial data of the energy-using system with the operating parameter set at the initial value, acquiring values relating to a weather parameter for the facility, and creating a baseline model of the energy-usage by the facility with the initial energy-using system data and the weather data.

The method can further include determining an initial rate of energy-usage or consumption by a facility based upon the baseline energy model, changing the initial value of the operating parameter, determining a modified rate of energy-usage by the facility, and calculating a difference between the initial rate of energy-usage and the modified rate of energy-usage. The difference represents a potential savings in energy-usage from changing the value for the operating parameter.

In another embodiment, the invention provides a software for modeling an energy-usage of a facility. The software is executed by a processor to acquire an initial value of an operating parameter for an energy-using system, to acquire initial data of the energy-using system with the operating parameter set at the initial value, to acquire values relating to a weather parameter for the facility, and to create a baseline model of the energy-usage by the facility with the initial energy-usage data and the values of the relating to the weather parameter for the facility.

Other features of the invention will become apparent by consideration of the detailed description and accompanying drawings.

BRIEF DESCRIPTION OF THE DRAWINGS

FIG. 3 is an illustration of one embodiment of a survey form page for obtaining information relating to general customer information and operation.

FIG. 4 is an illustration of one embodiment of a survey form page for obtaining information relating to outside lighting, customer/employee occupancy, and doors.

FIG. 5 is an illustration of one embodiment of a survey form page for obtaining information relating to the characteristics or parameters for the construction of the building and to the heating, ventilation, and air-conditioning (HVAC) zones of the facility.

FIG. 6 is an illustration of one embodiment of a survey form page for obtaining information relating to use of office space and to equipment/appliances located outside of the facility.

FIG. 7 is an illustration of one embodiment of a survey form page for obtaining information relating to interior lighting and to equipment/appliances located inside of the facility.

FIG. 8 is an illustration of one embodiment of a survey form page for obtaining information relating to refrigerated display cases.

FIG. 9 is an illustration of one embodiment of a survey form page for obtaining information relating to racks and compressors of a refrigeration system.

FIG. 10 is an illustration of one embodiment of a survey form page for obtaining information relating to conventional units for a refrigeration system.

FIG. 11 is an illustration of one embodiment of a survey form page for obtaining information relating to condensers of a refrigeration system.

FIG. 12 is an illustration of one embodiment of a survey form page for obtaining information relating to accessory components for racks of a refrigeration system.

FIG. 13 is an illustration of one embodiment of a survey form page for obtaining information relating to an HVAC system.

FIG. 14 is an illustration of one embodiment of a survey form page for obtaining information relating to exhaust fans, supply fans for hood systems, unit heaters, and evaporative coolers of an HVAC system.

FIG. 16 is an illustration of one embodiment of a cover page of an audit form.

FIG. 17 is an illustration of one embodiment of an audit form page relating to scheduling information for performing the audit.

FIG. 18 is an illustration of one embodiment of an audit form page relating to an auditing notes section.

FIG. 19 is an illustration of one embodiment of an audit form page relating to a maintenance exception report.

FIG. 20 is an illustration of one embodiment of an audit form page relating to calibration of instruments used in performing the audit.

FIG. 21 is an illustration of one embodiment of an audit form page relating to circuit information of a refrigeration system.

FIG. 22 is an illustration of one embodiment of an audit form page relating to defrost operation of a refrigeration system.

FIG. 23 is an illustration of one embodiment of an audit form page relating to rack/condenser/controller calibration of a refrigeration system.

FIG. 24 is an illustration of one embodiment of an audit form page relating to rack operation of a refrigeration system.

FIG. 25 is an illustration of one embodiment of an audit form page relating to rack compressor operation of a refrigeration system.

FIG. 26 is an illustration of one embodiment of an audit form page relating to air-cooled condenser operation of a refrigeration system.

FIG. 27 is an illustration of one embodiment of an audit form page relating to rack controller operation.

FIG. 28 is an illustration of one embodiment of an audit form page relating to HVAC set points and operation.

FIG. 29 is an illustration of one embodiment of an audit form page relating to lighting system operation.

FIG. 30 is an illustration of one embodiment of an audit form page relating to anti-sweat heater control operation of a refrigeration system.

FIG. 31 is an illustration of one embodiment of an audit form page relating to refrigeration rack set points and operation.

FIG. 32 is an illustration of one embodiment of an audit form page relating to HVAC set points and operation.

FIG. 34 is an illustration of one embodiment of a first report spreadsheet relating to data for weather parameters for a facility.

FIG. 35 is an illustration of one embodiment of a second report spreadsheet relating to operating costs and energy usage at peak hours of a facility.

FIG. 36 is an illustration of one embodiment of a third report spreadsheet relating to energy usage by system of a facility.

FIG. 37 is an illustration of one embodiment of a fourth report spreadsheet relating to natural gas use by system of a facility.

FIG. 39 is an illustration of one embodiment of a sixth report spreadsheet relating to energy-usage by a display case.

FIG. 40 is an illustration of one embodiment of a seventh report spreadsheet relating to energy-usage of a walk-in cooler and an annual refrigeration load summary.

FIG. 41 is an illustration of one embodiment of an eighth report spreadsheet relating to heat loads and operating conditions of a refrigeration rack.

FIG. 43 is an illustration of one embodiment of a tenth report spreadsheet relating to defrost run times and HVAC energy-usage.

FIG. 44 is an illustration of one embodiment of an eleventh report spreadsheet relating to HVAC operating hours.

FIG. 45 is an illustration of one embodiment of a twelfth report spreadsheet relating to space heat loads.

FIG. 46 is an illustration of one embodiment of a thirteenth report spreadsheet relating to ventilation loads.

FIG. 47 is an illustration of one embodiment of a fourteenth report spreadsheet relating to air handling system loads, as well as ventilation rates.

FIG. 48 is an illustration of one embodiment of a fifteenth report spreadsheet relating to hot gas bypass degradation, as well as heating loads.

FIG. 49 is an illustration of one embodiment of a sixteenth report spreadsheet relating to water loop performance.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

Figure 1:
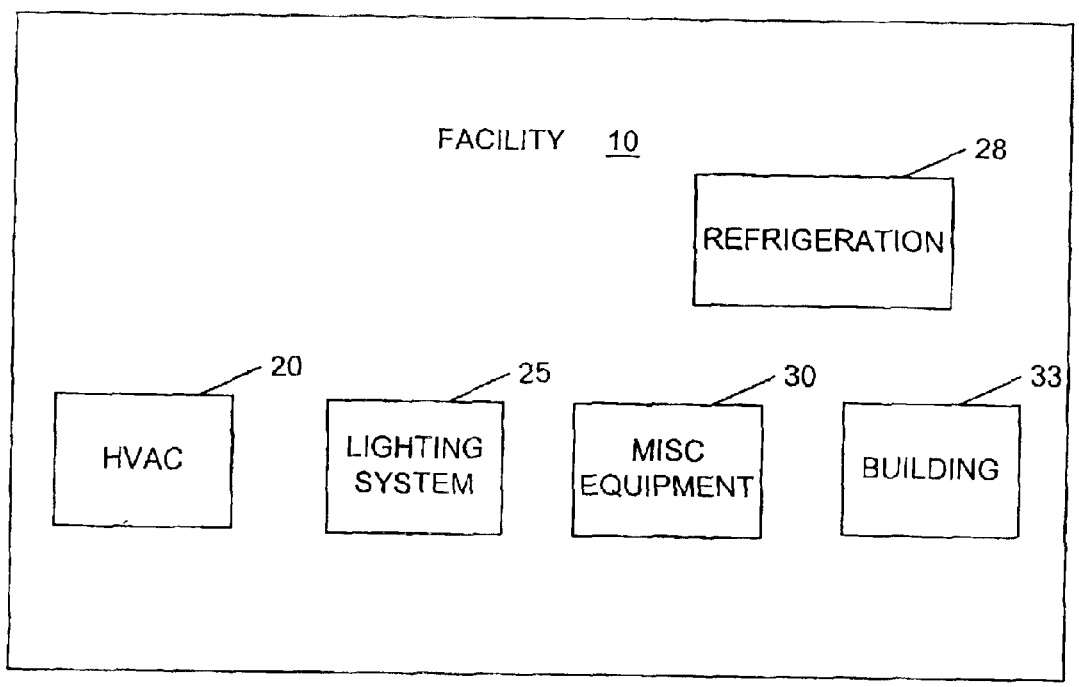
FIG. 1 is a schematic diagram of a facility.

A facility 10 having an energy-using system is schematically shown in FIG. 1. As used herein, the term facility 10 is broadly construed to mean one or more buildings, structures, locations and/or areas having an energy system. An example facility 10 is a supermarket, which generally includes a HVAC system 20, a lighting system 25, a refrigeration system 28, miscellaneous equipment and appliances 30, and a building 33. Of course, the facility 10 can include multiple identical systems and equipment (e.g., multiple HVAC systems 20) or a facility 10 where not all of the systems noted above are required.

The HVAC system 20 generally can be of any type (e.g., water, gas, electrical, etc.) and can include compressor(s), condenser(s), heat pump(s), humidity control unit(s), blower(s), furnace(s), air conditioner(s), fan(s), evaporative cooler(s), etc. The lighting system 25 generally can be of any type (e.g., outdoor, interior, security, etc.) and can include light fixtures, ballasts, photocells, timers, daylight sensors, on/off switches, etc. The refrigeration system 28 can generally include a rack, a branch circuit, and a display case. The refrigeration rack generally includes a compressor and a condenser, or group of compressor(s) and condenser(s) that operate a display case or group of display cases. In general, the branch circuit transmits the refrigerant to and from the refrigeration display case(s). The refrigeration display case(s) generally includes evaporator(s) and one or more shelves for cooling and displaying meat, dairy, produce, frozen foods, deli, etc. The refrigeration system 28 can include a conventional unit having a compressor and a condenser to operate a display case, or a multiplex unit having a group of compressors and condensers for operation of a group of display cases.

The facility 10 can also include various other miscellaneous systems having equipment and appliances 30. Other types of equipment and other systems at a supermarket include ovens, heat lamps, slicing machines, generators, etc. As will become more apparent below, the invention can be adjusted for additional energy-using systems in a facility 10 and is not limited to the systems described above. In some embodiments, the invention provides for auditing the ingress and egress of customers and/or workers entering the facility 10, and various building construction parameters or characteristics of the facility 10. Example construction parameters include roofing materials and wall materials having various insulation ratings. The invention can also be applied to one or more facilities that share use of one or more HVAC systems, refrigeration systems, lighting systems, etc.

The following description of the operation of the invention is generally directed toward a supermarket. However, the invention can also be used for a food distribution warehouse, a food-processing facility, or a similar facility that includes HVAC system(s), lighting system(s), refrigeration system(s), etc. Furthermore, for some embodiments, it is envisioned that not all of the acts below may be required, that some of the acts may be modified, or that the order of the acts may vary.

Figure 2:
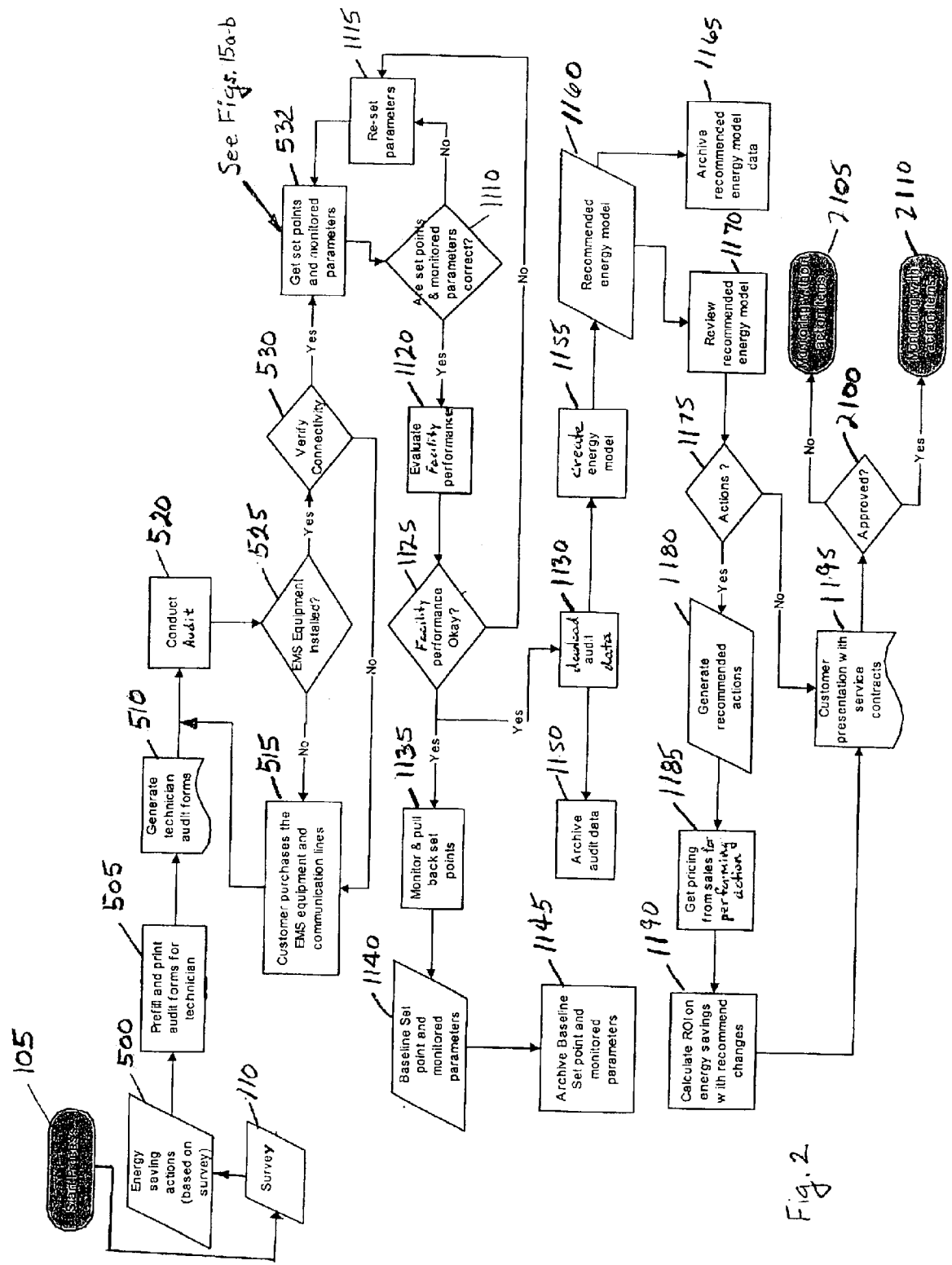
FIG. 2 is a flow diagram of one method of auditing a facility.

FIG. 2 is a flow diagram of one embodiment of a method for auditing the energy-usage of a facility 10 (e.g., a supermarket). The process starts at act 105. At act 110, a survey technician and/or a customer performs an initial survey of the energy-using or -consuming systems of the facility 10. The initial survey includes completing an initial survey form that provides the audit technician with basic information of the facility 10. One embodiment of the initial survey form is shown in FIGS. 3–14. As shown in FIGS. 3–14, the initial survey form includes multiple pages.

FIG. 3 illustrates a cover page 115 for the initial survey form. The cover page 115 includes entries for general customer address information 116 (e.g., name, address, phone), a start survey date 118, an end survey date 120, managerial information 122 (e.g., name, title), a time and attendance 124 for a type and a location of the system, and an entry area 128 for a general schedule of hours of operation of the facility 10.

FIG. 4 illustrates a second page 130 of the initial survey form, which collects information relating to the general utilities (e.g., gas, water, electricity) for the facility 10. In addition, the second page 130 includes entries for a number of electrical meters 132, an amperage of the electrical main 134, a number of natural gas meters 136, and a number of water meters 138. In addition, the second page 130 includes entries for the outdoor lighting systems of the facility 10, including a general designation 140 of the lighting system (e.g., parking area, building, security, etc.) and detailed information 142 of the outdoor lighting fixtures (e.g., type, quantity, wattage, type of ballasts, photo cell, time schedule, etc.). The second page 130 further includes entries for customer and employee occupancy information 144 (e.g., parking spaces, peak store hours, number of workers at peak store hours, etc.). The second page 130 further includes entries for detailed information 146 relating to equipment room doors (e.g., machine room, air-handling unit (AHU) room, electrical room, etc.) and general facility doors 148 (e.g., the number of overall doors, whether the door(s) are automatically-operated, speed of the door(s), maintenance need of the door(s), type of door(s), etc.).

FIG. 5 illustrates a third page 150 of the initial survey form, which relates to the building envelope or construction parameters (e.g., roof, walls, etc.) of the facility 10. One embodiment of the third page 150 includes entries for the American Society of Heating, Refrigeration, Air Conditioning Engineers (ASHRAE) classification of the roof 152, the roof height 154, and the roof color 156 (e.g., light, dark, medium). The page 150 further includes entries to define the HVAC zones and the walls/partitions in the zones. For each wall and/or partition, the page 150 includes entries for wall length 158, wall color 160, direction facing 162, type of wall construction 164, percent open area 166, window area 168, insulation rating (e.g., U-value) 170, and shading 172.

FIG. 6 illustrates a fourth page 180 of the initial survey form, which includes entries for general square footage of space for a bank 181, offices 182, vestibules 184, video areas 186, and warehouse areas 188. In addition, the fourth page 180 further includes general information of the outside equipment at the facility 10. One embodiment of page 180 includes entries for description 190, make 192, model number 194, serial number 196, gas rating 198, voltage rating 200, amperage rating 202, and phase rating 204 of each equipment/appliance located outside.

FIG. 7 illustrates a fifth page 206 of the survey form, which relates to interior lighting and equipment. For each predetermined area or HVAC zone, a fifth page 206 includes entries for the type of lighting fixture 208, a designation 210 of the HVAC zone, the quantity 212 of electrical fixtures, a wattage 214 of fixtures, a use of the lighting 215, a type of ballast 216, a use of photo cells 218, a time schedule for lighting operation 220, a use of occupancy sensors 222, and a use of skylights 224. The fifth page 206 also includes entries for information relating to interior equipment and appliances, including a location 226 of the equipment in a HVAC zone, a location 228 of the equipment in a store department, a description 230 of the equipment, a make 232 of the equipment, a model number 234 of the equipment, a serial number 236 of the equipment, a gas rating 238 of the equipment, and a motor rating (e.g., voltage 240, amperage 242, and phase 244) of the equipment.

FIG. 8 illustrates a sixth page 250 of the survey form, which relates to a refrigeration system 28. For each refrigeration display case of the refrigeration system 28, the sixth page 250 includes entries for an identification number 252, a make 254, a model number 256, a serial number 258, a door size 260, a case type 262, a verification 264 of a box drive switch, defrost system information 266 (e.g., standard temperature, lights, quantity, type, voltage, amperage, phase), and voltage and amperage ratings of the fans 268, the anti-sweat heaters 270, and the lights 272.

FIG. 9 illustrates a seventh page 280 of the survey form, which relates to racks and compressor systems. For each compressor system, the seventh page 280 includes entries for an identification number 282 of the compressor system, a make 284 of the compressor system, a model number 286 of the compressor system, a serial number 288 of the compressor system; a horsepower 290, a speed 292 (e.g., revolutions per minute (rpm)), and a full-load amperage rating 293 for the motor; a verification of an unloader 294; a verification of a head fan 296; a verification of a crank-case heater 297; and a rating of the variable speed drive 298. The seventh page 280 further includes entries for refrigeration rack information, including an identification number 300, a make 302, a model number 304, a serial number 306, a suction pressure 308, a discharge type 310, a refrigerant type 312, and a voltage rating 314 of each rack of the refrigeration system.

FIG. 10 illustrates an eighth page 320 of the survey form, which relates to conventional compressor/condenser units. For each compressor/condenser unit, the eighth page 320 includes entries for an identification number 322, a make 324, a model number 326, and a serial number 328 (of each compressor); a capacity-rating 330 of the condenser; a flow capacity 332 (e.g., gpm) of the condenser; a number 334 of compressor fans; a horsepower 336 of the condenser; a number 338 of unloaders; a verification 340 of a head fan; a verification 341 of crank-case heater, and a verification 342 (e.g., use of a variable speed drive, bypass, etc.) of a variable speed drive.

FIG. 11 illustrates a ninth page 350 of the survey form, which relates to detailed information of the condensers. For each rack, the ninth page 350 includes entries for the type 352 of condenser (e.g., air, evaporator, fluid); a voltage rating 354, a phase rating 356, a frequency rating 358, a control circuit voltage rating 360, a make 362, a model number 364, and a serial number 366 of the condenser; a number 368 of fans; a fan horsepower 369; a high 370 and low 372 horsepower and amperage rating for the fans; a pump motor rating 374 (e.g., horsepower, amperage); a sump heater rating 376 (e.g., kilowatts); a make/model 378 of the fan variable speed drive; a make/model 380 of the pump motor variable speed drive; a verification of a split condenser 382, and a number of tubes 384.

FIG. 12 illustrates a tenth page 390 of the survey form, which relates to accessories of the refrigeration racks. For each rack, the tenth page 390 includes entries for a number of compressors 392, a verification 394 of a heat reclaim/HVAC zone air-conditioning unit, a hot water reclaim 396, a verification 398 of a water bypass of the heat reclaim, a verification 400 of a split suction, a verification 402 of load shifting, a verification 404 of a flood valve, a rating 406 of a receiver (e.g., size, flow thru, surge, critically charged, etc.), a verification 408 of a subcooler (e.g., mechanical, ambient, flooded), a verification 410 of a hot gas bypass, a use and type 412 of a driveway/walkway heater (e.g., electric, glycol), a verification 414 of a liquid pump, a verification and type 416 of oil coolers, and a verification 418 of liquid pressure regulating valves. The tenth page 390 further includes entries for information (e.g., make, model, serial number, wattage, fuel type, load shift, use in an emergency, voltage, amperage, phase rating, etc.) relating to generators 420, air compressors 422, water heaters 424, ventilation intake units 426, and ventilation exhaust units 428.

FIG. 13 illustrates an eleventh page 430 of the survey form, which relates to detailed information of the HVAC system 20. The eleventh page 430 includes entries for the general type of the HVAC system 432 (e.g., built-up, package unit, split system), a brief description 434 of the HVAC system and the area served, a description 436 of the HVAC unit, and a description 438 of the blower motor to the HVAC unit. Certain HVAC units can include a cooling unit and a heating unit. For the cooling unit, the eleventh page 430 includes entries for the cooling unit type 440 (e.g., dx, water) and cooler unit capacity 442 for each stage of the HVAC unit. For the heating unit, the page 430 includes entries for the heating unit type 444 (e.g., gas, electric, heat pump, water) and heating unit rating 446 (e.g., MBh, kW) for each stage of the HVAC unit.

The eleventh page 430 further includes entries 448 for describing a humidity control unit. The entries 448 include identification, type, make, model number, and serial number of the humidity control unit(s). The eleventh page 430 further includes entries for describing the compressor or condensing unit(s). In particular, the eleventh page 430 includes an entry for the type refrigerant used 450; a voltage rating for the compressor 452; a make 454, a model number 456, a serial number 458, a motor rating 460 (e.g., horsepower, rpm, full-load amperage) for an open drive motor, a verification 462 of compressor unloaders; a verification 464 of a crank-case heater; and a verification 466 (e.g., variable speed drive or bypass) of a variable speed drive.

FIG. 14 illustrates a twelfth page 470 of the survey form, which includes entries to general equipment information (e.g., location, make, model, serial number). The entries include information relating to exhaust fans, supply fans for hood systems, unit heaters, evaporative coolers, and other miscellaneous equipment. For the exhaust and supply fans, the page 470 includes entries for a flow rating 472 (e.g., CFM), a voltage rating 474, a phase rating 476, and an amperage rating 478. For the unit heaters, the page 470 further includes entries for a type 480 (e.g., gas, electric) and a capacity rating 482 (e.g., MBH, kW). For the evaporative coolers and other miscellaneous equipment, the form 470 further includes entries for a capacity 484 (e.g., CFM), a voltage rating 486, a phase rating 488, and an amperage rating 490.

Referring back to FIG. 2 and at act 500, the survey technician and/or customer performs initial energy-saving actions based upon the information collected in the survey forms described above. Simple energy-saving actions can include fixing failed or broken equipment, replacing bad lights, simple cleaning of dirty areas, etc. Act 505 includes pre-filling or printing the audit forms (described below) with information collected in the survey form described above. In one embodiment, the information in the survey form is entered by computer entry into an electronic data storage. In another embodiment, the information in the survey form is manually entered into a paper form and also entered by computer entry into an electronic data storage. Act 510 includes generating the audit forms for an audit technician to complete. In one embodiment, a computer downloads the information archived in the electronic data storage to the audit forms before printing the audit form for an audit technician.

At act 515 (FIG. 2), the customer purchases an electronic monitoring system (EMS) equipment and communication lines to enable communication from the facility 10 with an analyst at a remote monitoring center. A monitoring team installs the EMS equipment and communication lines at the facility 10. One embodiment of the EMS equipment includes a modem and at least one phone communication line. In general, the EMS equipment allows an analyst at a remote monitoring center to receive alarms at the facility 10. In another embodiment, the EMS equipment allows the analyst at the remote monitoring center to make changes to the values of the operating parameters of the energy-using systems at the facility 10.

At act 520 (FIG. 2), the technician initiates the on-site audit of the facility 10. The audit of the facility 10 includes conducting on-site analyses of the operating parameters and performance of the systems and equipment listed in the initial survey form described above. The audit team can include one or more audit technicians depending on miscellaneous factors (e.g., the size of the facility, the number and complexity of the systems, available time to conduct the audit, etc.), but typically two audit technicians perform the audit. At act 525, the audit technician determines if the EMS equipment is installed at the facility 10. At act 530, the monitor team verifies the connectivity of the EMS equipment and communication lines with the remote monitor center. If there is no connectivity, the monitoring team confirms the purchase of the EMS and communication lines with the customer.

Act 532 includes the acts involved in performing the on-site audit and is described below. In general, act 532 includes acquiring values for the set points and operational parameters of the energy-using systems of the facility.

Figure 15A:
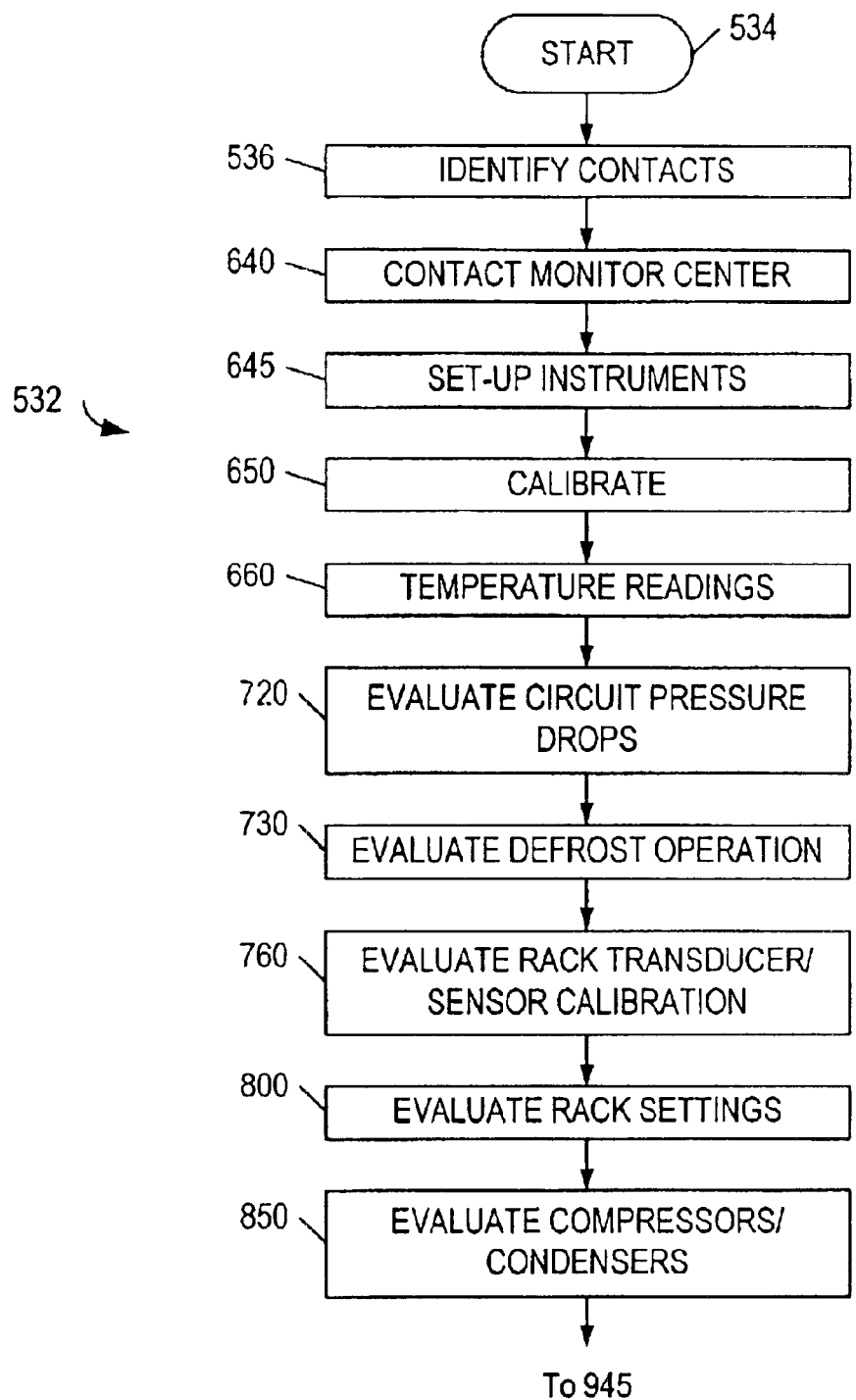
FIG. 15 is flow diagram of one embodiment of the audit procedure at the facility.

FIG. 15 illustrates a flow diagram of one embodiment of act 532 in performing the on-site audit. Act 534 (FIG. 15a) is the start of the on-site audit. Act 536 includes the technician identifying the facility 10 and a list of contact names and phone numbers of personnel at the facility and at the remote monitoring center if questions should arise. In one embodiment, the technician identifies the facility 10 and the list of contact names using a cover page 538 of the audit form as illustrated in FIG. 16. The technician makes entries 540 for a facility name, address, phone number, and controller type. The technician also enters a contact name and a phone number 542 for a technician on the monitoring team responsible for communications and the EMS equipment, a contact name and a phone number 545 of any service companies (e.g., HVAC) responsible to the facility 10, an identification 550 of an analyst at the remote monitoring center, an identification 555 of the auditing technician team on-site and how they can be contacted, the time and date 560 that the audit starts, and the time and date 565 that the audit ends. In one embodiment, the audit team and the analyst at the monitoring center work for the same employer. In another, the audit team can be independent contractors hired to perform the on-site audit.

Act 536 (FIG. 15a) further includes completing a second page 570 of the audit form as illustrated in FIG. 17. The second page 570 relates to a work schedule for completing the audit. The technician identifies a facility name and address 575, a contact information for personnel at the facility 580, a controller type 585, a modem number 590, an availability of an equipment legend 595, an availability of mechanical plans 600, a verification of a survey 605 being completed, and a verification of an audit schedule 610 being prepared. In addition, the technician identifies a surveyor 615 and an audit team 620.

The act 536 (FIG. 15a) can further include recording audit notes. One embodiment of entries for auditing notes is a third page 630 of the audit form as illustrated in FIG. 18. In addition, act 536 can further include noting maintenance exceptions at the facility 10. One embodiment of entries for noting maintenance exceptions is fourth page 635 of the audit form as illustrated in FIG. 19. The term maintenance exception includes notes of excessively dirty systems that should be cleaned before an on-site audit is performed.

At act 640 (FIG. 15a), a technician contacts the monitor center to indicate the start of the on-site audit process. At act 645, the technician sets up the sensors and instruments provided in a tool kit. One embodiment of the took kit includes an infrared temperature gun, refrigeration gauge manifolds and respective hoses, hoses for calibrating transducers, high-side and low-side liquid filled gauges, a multi-meter and a thermocouple, a sling psychrometer, a light level sensor, and a data logger with temperature sensors. The temperature gun measures temperatures inside refrigeration units or display cases. An exemplary infrared temperature gun is the Raynger ST™ manufactured by Raytek. The refrigeration gauge manifolds include one low-side manifold and one high-side manifold. The multi-meter and thermocouple enable a technician to collect voltage and current readings from equipment. An exemplary multi-meter is the Fluke 16™. The sling psychrometer enables collecting humidity measurements inside a room. The velometer enables ventilation system testing and balancing. An exemplary velometer is the Balometer Jr.™ manufactured by Alnor.

The light level sensor enable measurement of the light levels at various locations in the facility 10. An exemplary light level sensor is manufactured by Sylvania. The data logger enables recording of measurements with a plurality of sensors at predetermined intervals for a predetermined time. The measurements can then be downloaded for analyses. An exemplary datalogger is the SmartReader 8™ manufactured by ACR Systems, Inc. An exemplary temperature sensor is the ACR Systems, Inc., Model # 35-001 and Model # 01-0036. In addition, the tool kit includes refrigerant and a clamp-on amprobe. The tool kit described above identifies one embodiment of a tool kit. Of course, the tool kit can include other miscellaneous components associated with the instruments described above as well as other instruments.

At act 650 (FIG. 15a), the technician calibrates the sensors and instruments to be used in performing the audit. One embodiment of a fifth page 655 of the audit form that lists a proper procedure for calibrating the sensors and instruments is shown in FIG. 20. The technician follows the instructions on the fifth page 655 to calibrate the infrared gun, and to record entries that document the proper performance of the calibration. The page 655 further includes an entry to check that the calibration gauge is zeroed, a tank temperature reading, a tank pressure reading, a gauge pressure reading, and a check that the gauge is reset. Of course, the technician can calibrate the respective gauges using other proper procedures recommended by a manufacturer of the instrument being calibrated. Alternative embodiments can include additional calibration instruction forms.

At act 660 (FIG. 15a), the technician acquires temperature readings and other information for the circuits of the refrigeration system. As noted above, a circuit includes the refrigeration lines to and from the refrigeration display cases. One embodiment of act 660 includes completing the tasks outlined by the entries of a sixth page 665 of the audit form as illustrated in FIG. 21. One embodiment of the sixth page 665 includes entries for a list 670 of the circuits comprising a rack and a description 680 of the case(s) served by each circuit. For each circuit, the technician uses infrared temperature guns to collect ambient temperature readings for the different HVAC zones (e.g., machine room, etc.) and walks the floor taking measurements from the cases served by the respective circuit. A first technician on the floor reads and relays discharge temperatures of the cases via a two-way radio to a second technician positioned by a temperature sensor of the controller for the cases. The technician at the controller compares the temperature reading at the case with the temperature indicated by the sensor of the controller. Each case temperature is read. If there is only one sensor for a lineup of cases, the sensor reading is listed for that case in the lineup only. Every case discharge and product temperature is recorded before and after the audit. Any sensors that are not operating correctly are calibrated or noted for replacement. For each cooler coil in the display cases, the first and second technician record the return air temperature into the coil and records this as a discharge temperature, while comparing it the sensor reading at the controller. Of course, the technician can acquire the temperature readings using other suitable methods (e.g., an instrument linked to the EMS in communication with the remote monitoring center) and instruments.

As shown in FIG. 21, one embodiment of act 660 further includes the technician acquiring data related to the data of the circuit operation as outlined by the entries in the sixth page 665 of the audit form as shown in FIG. 21. One embodiment of the entries includes an initial discharge temperature reading 685, an after tune-up discharge temperature reading 690, a product temperature reading 695, a probe case temperature reading 700, an initial suction temperature reading 705 at the evaporator pressure regulator (EPR) setting, and an after tune-up suction temperature reading 710 for each circuit. Of course, act 660 can include acquiring additional temperature readings and settings not noted in page 665.

At act 720 (FIG. 15a), the technician evaluates the pressure drops for each circuit of the refrigeration system. One embodiment of act 720 includes the technician using the pressure gauges of the tool kit to perform the tasks outlined by additional entries of the sixth page 665 of the audit form as illustrated in FIG. 21. As shown in FIG. 21, the technician makes entries for an initial 722 and an after tune-up 723 offset between actual instrument readings and controller readings of the circuit, an evaporator pressure reading 724, an initial EPR setting 725 (e.g., psi), an after tune-up EPR setting 726, and a pressure drop 728 equal to the difference between the initial 725 and after tune-up 726 EPR settings. The offset is the difference between an actual instrument reading and the sensor reading at the controller.

Act 730 (FIG. 15a) includes evaluating the defrost operation of the refrigeration system. If the refrigeration case includes an electric defrost system, the technician records the voltage and amperage draw for each circuit while in the defrost mode. The technician also reviews the defrost schedule to determine optimum frequency and duration for the defrost modes. In one embodiment, the technician has the defrost schedule prior to the audit and simply advises the customer as to what circuits are in need of adjustments. If differences exist or if the defrost schedule is not provided, the technician lists the defrost schedule in seventh page 732 of the audit form as illustrated in FIG. 22. The seventh page 732 relates to evaluating the performance of the defrost operation. In evaluating the performance of a defrost operation, the technician activates the defrost systems one at a time and confirms the temperature rise duration of the defrost operation. This performance is not necessary if the defrost circuit is based on OFF time. One embodiment of act 730 includes completing the tasks outlined by the entries of the seventh page 732 as illustrated in FIG. 22. The technician makes entries for a refrigeration rack identification number 734 and a suction group of the rack 736. For each circuit of the rack, the technician acquires the circuit identification number 738, a description 740 of the cases, a defrost voltage reading 742, a defrost amperage reading 744, a verification 746 that the defrost schedule is balanced, a verification 748 of the proper cooling/heating operation of the defrost system, a description 750 of a manual defrost schedule, a verification 752 of a forced defrost being performed, and a case temperature rise 754.

At act 760 (FIG. 15a), the technician evaluates the calibration of the rack transducers, sensors, controllers, compressors, condensers, etc. of each refrigeration system. Act 760 includes recording sensor and transducer readings, as well as listing the offsets between actual gauge readings and sensor readings at the controller. One embodiment of act 760 includes completing the tasks outlined by the eighth page 762 of the audit form as illustrated in FIG. 23. The eighth page 762 relates to calibrating the rack/condenser/controller units. The technician acquires suction pressures 764 for each group of compressors. The page 762 further includes entries for a discharge pressure 766, and a drop leg 768. For each of the previously noted entries, the technician acquires a transducer reading, a gauge reading, and an initial and after tune-up offset between actual instrument readings and controller readings. In addition, the technician acquires a suction temperature 770, a discharge temperature 772, a drop leg temperature 774, a liquid header temperature 776, a subcooler inlet temperature 778, a subcooler outlet temperature 780, an ambient air temperature 782, and a sump temperature 784. For each of the previously noted entries, the technician acquires a thermocouple reading 786, a sensor reading 788, and determines an initial 790 and an after tune-up 792 offset between actual instrument readings and controller readings. For a receiver, the technician acquires the controller readings, mechanical gauge readings, and offsets when the heat reclaim is off, when the heat reclaim is on, when the hot gas is off, and when the hot gas is on. In one embodiment, a heat reclaim includes heat wasted by the refrigeration system and provided to the HVAC system to warm the occupied space of the facility, thereby improving energy efficiency.

At act 800 (FIG. 15a), the technician evaluates the settings for the rack(s). Act 800 includes listing all initial valve and component set points, along with any changes or adjustments. Act 800 further includes recording the initial settings of the various valves of the racks, including evaporative pressure regulating valves (EPRs), liquid differential valves, condenser holdback valves, receiver pressurization valves, liquid pressure regulators, and discharge differential valves. A liquid pressure regulator acts as holdback valves maintaining a constant pressure to the liquid header. A discharge differential valve controls the discharge flow into the hot gas manifold during hot gas defrost. One embodiment of act 800 includes completing the tasks outlined by the entries of the ninth page 805 of the audit form as illustrated in FIG. 24. The ninth page 805 relates to rack information. For one embodiment of page 805, the technician measures and/or records entries to identify a rack 810 (e.g., rack number, suction group, refrigerant type, oil type, manufacturer, date built, model number), a suction transducer set point 812, a floating suction pressure reading 814, a holdback valve setting 816, a receiver pressurization valve setting 818, a liquid pressure regulator setting 820, a discharge differential valve setting 822, a liquid differential valve setting 824, and a subcooler setting 826. For each of the previously noted entries, the technician records entries of a design setting 828, an initial setting 830, an after tune-up setting 832, and the resultant pressure drop 834 following the tune-up. The page 805 further includes entries related to components at the high-pressure side of the respective refrigeration rack. The technician records high-side pressure readings 836 (e.g., inlet, outlet, pressure drop) across a liquid drier; an oil separator, a discharge to drain, and a heat reclaim valve. In addition, the technician records entries related to components located at the low-pressure side of the respective rack. The low-side entries 838 include pressure readings (e.g., inlet, outlet, pressure drop) for each of the suction filters. The technician also describes the operation 840 (e.g., fans operating, louvres operating, controls functioning, temperature set point) of the machine room ventilation system, and provides a description 842 of the oil reservoir. In addition, the technician records entries 845 relating to the status of the heat reclaim, including the type of heat reclaim, the initial and after tune-up pressure settings, whether the heat reclaim is working, and verification of operation of a reclaim holdback valve and a water differential valve.

At act 850 (FIG. 15a), the technician evaluates the operation of the compressors and condensers of the refrigeration system 28. One embodiment of act 850 includes performing the tasks outlined by the entries of the tenth page 852 of the audit form as illustrated in FIG. 25. For each compressor, the technician measures and/or enters an identity 854 of the compressor (e.g., compressor number, a model number, a serial number), an initial and an after tune-up low pressure control reading 856, an initial and an after tune-up high pressure control reading 858, a verification of an oil failure 860, and a verification of demand cooling 862. In addition, the technician measures and records a suction temperature 864, a suction pressure 866, a discharge temperature 868, a discharge pressure 870, a loaded amperage demand 872, an unloaded amperage demand 874, an oil level reading 876, a voltage reading 878, and a vacuum test evaluation 880. The technician maintains the suction pressure while acquiring the above-noted compressor readings. The technician also verifies that all connections in the system are tight and look for heated conditions and visual wear and tear.

In one embodiment, act 850 (FIG. 15a) further includes the technician evaluating the operation of the air-cooled condensers for each refrigeration rack. The technician observes operation of the air-cooled condensers and confirms proper rotation, alignment, and cleanliness of the fan motors. The technician also reviews operation of the evaporative condensers and checks the water treatment. One embodiment of act 850 includes performing the tasks outlined by the entries of the eleventh page 900 of the audit form as illustrated in FIG. 26, which relates to air-cooled condenser information. For each fan of the condensers, the technician acquires a general condenser identification 902, an initial and an after tune-up alignment value 904 for a fan, an initial and an after tune-up rotation value 906, and an initial and after tune-up control set points 908. In addition, the technician acquires a verification for the proper operation 910 of a discrete spray, the proper rotation 912 of a fan motor, the proper rotation 914 of a pump motor, the proper operation 916 of a variable speed drive, the proper operation 918 of a working float, the proper operation 920 of a bleed valve, the proper operation 922 of a water treatment, and the pH of the water 924 being within an acceptable level. In addition, the technician evaluates the method of control of the condensers. The technician acquires a verification 926 of pressure control, a verification of EMS control 928, a verification 930 of a temperature-dependent control, a wet bulb temperature reading 932, a sump temperature reading 934, a verification 936 of damper control, and initial and after tune-up control set points 938 for a low fan, a high fan, and a pump. Act 850 further includes taking a sample of the refrigerant from the condenser, acquiring a pressure reading based upon ambient temperature, and examining whether condensables are present.

At act 945 (FIG. 15b), the technician verifies a proper operation of the controller(s) to the refrigeration system 28. The technician cycles the compressors and other miscellaneous outputs and confirms that all relays energize and that the desired response occurs. For example, the technician checks whether the probes are positioned correctly. One embodiment of act 945 further includes performing the tasks outlined by the entries of the twelfth page 950 of the audit form as illustrated in FIG. 27, which relates to controller verification. For each compressor, the technician enters a pass/fail 952 for the controllers to the compressor, a pass/fail 954 for the head fan, and a pass/fail 956 for the variable speed drive. The technician also makes entries for the pass/fail 958 of the fan(s) to the air-cooled condenser, the pass/fail 960 of the evaporative condenser, the pass/fail 962 of the HVAC system, the pass/fail 964 of pump station, the pass/fail 966 of the heat reclaim, the pass/fail of the 968 hot water reclaim, the pass/fail of the 970 exhaust fan(s), and the pass/fail 972 of the unit heater(s). In one embodiment, the hot water reclaim includes heat wasted by the refrigeration system provided to pre-heat the domestic water supply, thereby improving energy efficiency.

At act 980 (FIG. 15b), the technician evaluates the operation of miscellaneous and stand-alone equipment 30 at the facility 10. Stand-alone equipment can include slicers, ovens, electronic displays, etc.

At act 982 (FIG. 15b), the technician evaluates the operation of the HVAC system 20. If a vendor maintains the HVAC system 20, the technician can contact the vendor to get the set points and operating scheme for the HVAC system. One embodiment of act 982 includes performing the tasks outlined by the entries of the thirteenth page 984 and fourteenth page 986 of the audit form as illustrated in FIGS. 28a and 28b, which relates to HVAC set points. In completing the fourteenth page 984, the technician enters an ambient dry bulb temperature 988, an ambient wet bulb temperature 990, and a wet 992 and dry bulb 994 temperature for one or more HVAC zone(s) of the facility 10. For each HVAC unit (e.g., blower motor, drive, etc.), the technician enters a general type 995 (e.g., built-up, package unit, split system), a description 996, a unit identification number 997, a make 998, a model number 1000, and a serial number 1002. Operating a blower motor of the HVAC unit at high and low speed, the technician records a horsepower 1004, an amperage draw 1006, an actual voltage draw 1008, an evaluation of the variable speed drive 1010, and a verification 1012 of an economizer. For each HVAC unit, the technician records a filter pressure drop 1014, an evaporator pressure drop 1016, a heat coil pressure drop 1018, a make-up air unit capacity 1020, a make-up air unit opening size 1022, a type of air filter 1024, a size of filter 1026, and a quantity of filters 1028. For each stage of an HVAC unit in a cooling mode, the technician records the type and temperature set points 1030. Likewise, for each stage of a heating mode, the technician records the temperature set points 1032, and the night setback settings 1034. Act 982 further includes calibrating the HVAC sensors and acquiring a sensor reading 1036, an initial offset 1038, and an after tune-up offset 1040 for each type of sensor (e.g., humidity, dew point, temperature).

Act 982 (FIG. 15b) further includes calibrating the compressors and condensers of the HVAC system 20. The technician records entries for a suction temperature 1042, a discharge temperature 1044, an initial and an after tune-up low power setting 1046, an initial and an after tune-up high power setting 1050, an amperage draw 1052, a voltage draw 1054, and an oil level 1056. In addition, the technician identifies an initial and an after tune-up setting for the alignment 1058, the rotation 1060, and the control set points 1062.

At act 1042 (FIG. 15b), the technician calibrates the humidity control of the HVAC system 20. One embodiment of calibrating the humidity control is outlined by the entries of the fourteenth page 986 of the audit form illustrated in FIG. 28b, which relates to humidity control. The technician verifies a description 1064 of the humidity control type and an initial and an after tune-up set point 1066.

At act 1070 (FIG. 15b), the technician evaluates the lighting system 25. The technician assesses the facility and determines the type of lighting control (e.g., photocells, daylight sensors, on/off timers, etc.) and the schedule that the lighting system 20 is on. One embodiment of act 1070 includes performing the tasks outlined by the entries of a fifteenth page 1072 of the audit form as illustrated in FIG.

29, which relates to lighting verification. In evaluating the lighting system, the technician runs all of the lighting systems 20 by cycling controller relays to confirm operation of the lighting for each area of the facility 10 (e.g., parking area, interior sales, interior perimeter, exterior perimeter). If a faulty condition is found, the technician notes the condition on page 1072. The technician also records entries for the schedule 1074, verification of the equipment monitoring system (EMS) control 1076, and verification of testing the EMS control 1078. In addition, the technician identifies and tests the control devices used for the lighting 1080 (e.g., photocells, daylight sensors, on/off switches).

At act 1082 (FIG. 15b), the technician evaluates operation of an anti-sweat control system. The technician determines if and how the anti-sweat heaters in the facility 10 are being controlled. Depending on the type of control, the technician calibrates the sensors and records any sweating conditions due to faulty heater or poor control. One embodiment of act 1082 includes performing the tasks outlined by the entries of the sixteenth page 1084 of the audit form as illustrated in FIG. 30, which relates to anti-sweat control. One embodiment of act 1082 includes identifying the circuit number 1086, recording a description of the refrigeration display cases for the respective circuit 1088, measuring an amperage draw or wattage per door 1090, verifying a control of the anti-sweat heaters 1092, counting the number of doors 1094, measuring an initial and an after tune-up set point 1096, measuring an initial and an after tune-up calibration of sensors 1098, verifying that the heaters are working 100, and verifying whether sweating is occurring 1102.

Figure 15B:
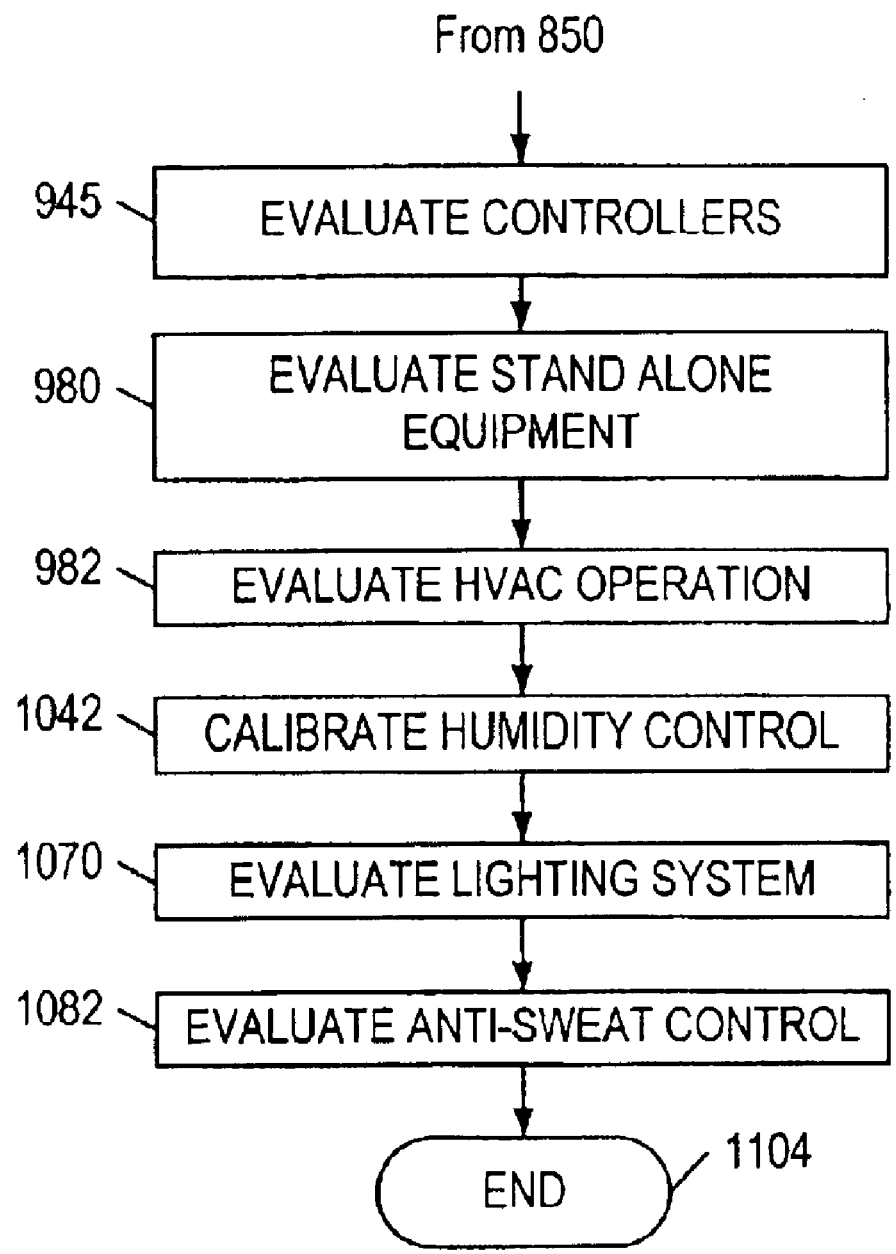

Referring to FIG. 15b, act 1104 is the end of acquiring data for the set points and the monitored parameters for the energy-using systems of the facility 10.

Referring back to FIG. 2 and at act 1110, the technician determines whether the set points and values of the monitored parameters described above are correct. FIG. 31 illustrates one embodiment of a series of set points for the air-cooled and evaporative condensers, pressure control valves, etc. Of course, additional set points noted in FIG. 31 can be provided to the technician. FIG. 32 illustrates one embodiment of a series of set points for the HVAC system 20, including humidity control, temperature control, and heating control. Of course, the set points noted in FIG. 32 can vary. In another embodiment, a source for the series of set points referred to in FIGS. 31 and 32 can be from manufacturer manuals and literature.

At act 1115 (FIG. 2), if the set points and monitored parameters are not correct, the technician resets the set points and parameters and acquires additional data for the operating parameters of the energy-using systems of the facility 10. If the set points and monitored parameters are correct, the technician evaluates the facility performance at act 1120. One embodiment of evaluating the store performance includes monitoring for any alarm conditions, collecting additional temperature readings to check proper food temperature, observing run-times of the energy-using systems, etc. At act 1125, the technician and/or customer determine if the store performance is acceptable. If the store performance is acceptable, the technician downloads the audit forms to the remote monitoring center at act 1130. At act 1135, the technician continues to monitor the set points for the facility 10.

At act 1140, the technician establishes the initial data to be used in creating a baseline model (discussed later) for the energy-usage of the facility 10. The data includes values for the initial set points and monitored parameters established by the audit of the facility 10. In one embodiment, the initial data is been recorded on the pages of the survey form and/or audit form described above (e.g., initial temperature).

At act 1145, the technician archives the baseline set points and monitored parameters established by the audit process described above for the facility 10. In one embodiment, the technician collects the pages of the survey form and pages of the audit form described and checks that all pages have been completed, legible, and in good order. The technician can also bind the survey form and/or audit form collectively.

The audit process may take several days to complete and the technician can elect to post-pone a remainder of the audit process until the next day. Therefore, a technician can postpone the audit at any point at the end of the workday. When leaving for the workday, the technician notifies the monitor center of the tune-up adjustments made to the settings and set points. The next day, the technician notifies the remote monitoring center that the audit process is being resumed. The technician can determine from the remote monitoring center if any overnight alarm conditions occurred. Additionally, the tasks described above can be performed by a team of technicians.

At act 1150 (FIG. 2), an analyst at the remote monitoring center archives the data of the audit forms described above on paper and in an electronic database. In one embodiment, the data for the monitored operating parameters is entered by computer entry into a database storage accessible by the software for creating the baseline energy-usage model. In another embodiment, the EMS and communication lines allows the data from the audit to be automatically archived in the electronic database storage at the remote monitoring center.

At act 1155 (FIG. 2), the analyst uses software executed by a processor and the audit data to create a model of the energy-usage of the facility. In one embodiment, the analyst creates a baseline model of the energy usage of the facility using the initial data acquired at the initial values of the operating parameters of the energy-using systems. In another embodiment, the analyst can also create a modified model of the energy-usage of the facility using acquired data for a change(s) in the value of the operational parameter(s) following a tune-up of the of energy-using system(s).

More specifically and in one embodiment of act 1155, an analyst uses a software program and the information or data for the initial settings and parameters acquired in the survey and audit forms to create a model of the energy-usage at the facility 10. In creating a model of the energy-usage of the facility, the software includes program instructions that account for the interactions between the building 33 construction, the HVAC system 20, the lighting system 25, the refrigeration system 28, miscellaneous equipment 30, etc. in the facility 10. In one embodiment of the model, the energy-usage is determined on an hourly-basis. Of course, the time basis for the model can vary. More detailed methods for creating the model are discussed below.

A. Internal and Building Envelope

The model of the building construction, or building envelope, includes consideration of the weather data and various building 33 parameters (e.g., roof material, wall construction, floor construction, etc.). One embodiment of act 1155 includes software using Typical Meteorological Year (TMY) data to simulate the weather on an hourly basis for an entire year. Among other things, the weather data is used to model the solar radiation load on the building 33 surface as well as the HVAC 20 and refrigeration systems 28. The weather data is pre-processed to determine the total incident solar radiation for each hour on horizontal and vertical surfaces facing a plurality of directions (e.g., north, northeast, south, etc.). The software uses these radiation load values along with ambient temperature readings and surface characteristics to determine the hourly temperature for each surface. The software can also use the weather data to determine dew points, relative humidity, and wet bulb parameters.

Using the weather data, the software determines internal and envelope (i.e., external) loads on the facility 10, excluding the loads for the refrigeration system 28. Note, a heat load as used herein encompasses a loss or gain in heat. Thus, the use of the term load is used interchangeably to refer to a generated quantity or gain of heat or a loss/absorbed quantity or load of heat.

One embodiment of the software determines the internal and envelope loads using a Total Equivalent Temperature Difference/Time Averaged Method (TETD/TA) as outlined by ASHRAE. In another embodiment, a transfer function method (TFM) can be used to determine internal and envelope loads on the facility 10.

More specifically and in one embodiment, the various envelope components of the space heat gain are determined using TETD values published by ASHRAE. These envelope loads are combined with internal heat gains to obtain an instantaneous total rate of heat gain for a space. This total rate of heat gain of a space is converted to an instantaneous space-cooling load by a time-averaging technique that averages the radiant portions of the heat gain and load components for the current hour with related values from the two previous hours. This method provides a rational means to deal quantitatively with the heat capacitance of the building envelope.

1. Roof and Walls

In one embodiment, the heat gains through the walls and roofs are determined based on the TETD values for the wall or roof. The effect of the heat capacitance of the roof or wall material is incorporated into a time lag in the TETD calculation. Different wall and roof materials have different lag hours ($\delta$) and decrement factors ($\gamma$) and these values are tabulated for many roof and wall types and published by ASHRAE. The TETD is calculated from the wall or roof properties and the sol-air temperatures using:

$$TETD = T_{ea} - T_{zone} + \gamma(T_{e\delta} - T_{ea})$$

where $T_{ea}$ is the twenty-four hour average sol-air temperature, $T_{zone}$ is the constant interior zone temperature, and $T_{e\delta}$ is the sol-air temperature at the time lag hours previous to the calculation hour. The sol-air temperatures are different for the eight vertical compass directions and horizontal. The appropriate sol-air temperature is used for each of the nine surfaces.

The area (A) of the wall or roof and the design heat transfer coefficient (U) are used to determine the heat gain (Qwall or Qroof) through the wall or roof:

$$Q_{wall \, or \, roof} = (U)(A)(TETD)$$

2. Windows

In one embodiment, the software determination of the heat load through the windows includes two components: convective gain and solar gain. The convective gain is determined based on the area (A) and the design heat transfer coefficient (U) of the glass and the difference between the outdoor dry bulb temperature ($T_{db}$) and the interior HVAC zone temperature ($T_{zone}$).

$$Q_{window \, convective} = (U)(A)(T_{db} - T_{zone})$$

The solar gains are based on the area and a shading coefficient (SC) of the window and a solar heat gain factor (SHGF) for the window. In one embodiment, the SHGF is taken from the hourly weather data for each surface.

$$Q_{window \, solar} = (A)(SC)(SHGF)$$

In one embodiment, the design heat transfer coefficients and the shading coefficients for different types of windows are tabulated and published by ASHRAE. Other references and/or methods known to those in the art can be used to acquired heat transfer coefficients, heat gain factors, and shading coefficients.

3. Internal Gains

Internal heat gains are generated from people, lights, equipment, and appliances. In one embodiment, the internal heat gain due to the people in the facility 10 is calculated based on the number of people in the facility 10 and the sensible and latent heat per person.

$$Q_{people,sensible} = \text{(Number of People in Store)(Sensible Heat Gain per Person)}$$

$$Q_{people,latens} = \text{(Number of People in Store)(Latent Heat Gain per Person)}$$

Other methods (e.g., based upon average rise in temperature for the facility during peak hours) known to those skilled in the art can be used to determine the internal heat gains due to people in the supermarket.

One embodiment for determining the heat gain due to the lighting system 25 is based upon the installed lighting input wattage (W), any special allowance factor ($F_{sa}$) used for installations where all of the heat load from the lighting does not go to the space, and the lighting use factor ($F_{ul}$) used for scheduling the usage of the lighting.

$$Q_{lights} = K(W)(F_{sa})(F_{ul})$$

The heat gains due to equipment usage are sensible loads and are based on the load from the equipment and the equipment use factor ($F_{ue}$) used for scheduling equipment usage.

$$Q_{equipment} = F_{ue}(\text{Equipment Heat Gain})$$

Appliances have both a latent and a sensible component of heat gain. The gains due to appliance usage are based on the heat load component and the use factor ($F_{ua}$) for the appliances.

$$Q_{appliance,sensible} = F_{ua}(\text{Appliance Sensible Heat Gain})$$

$$Q_{appliance,latent} = F_{ua}(\text{Appliance Latent Heat Gain})$$

4. Infiltration Load

In one embodiment, the load due to the infiltration of outdoor air into the facility 10 is based on the rate of infiltration ($CFM_{inf}$) and the difference between outdoor and indoor temperatures ($T_o$ and $T_{zone}$), for sensible loads, and outdoor and indoor humidity ratios ($W_o$ and $W_{zone}$), for latent loads.

$$Q_{infiltration,sensible} = K(CFM_{inf})(T_o - T_{zone})$$

$$Q_{infiltration,latent} = K(CFM_{inf})(W_o - W_{zone})$$

The infiltration flow rate can be scheduled to vary across the week. The infiltration rate is also effected by air-flows of the HVAC system 20. If the HVAC system air-flows are out of balance, the infiltration rate is assumed to increase to balance the building air flows. Of course, a constant for the infiltration flow rate can also be used.

5. Case Credits

Display cases and walk-in coolers provide sensible and latent cooling to the facility 10 due to the exchange of colder air inside the cases with the warmer zone air. This gain in cooling to the occupied space of the facility is referred to as case credits. The calculation of case credits is described later. The display cases also cool the return air when under-case return ducts are used. This impact is considered in the description below.

6. Cooling Load

In one embodiment, the cooling load is calculated using a time-averaging technique for the instantaneous heat load. This is done to recognize storage of thermal energy in the building mass and furnishings. For this embodiment, the software assumes that the radiant portions of the heat load entering a space at a particular time are absorbed by and released to the space at a later time. The radiant loads in the supermarket model are averaged over a three-hour period. The convective portion of heat load is instantaneously applied to the zone-cooling load.

To calculate the cooling load, it is first preferred to determine the convective and radiant portions of the heat gains. In one embodiment, this is accomplished through the use of radiant fractions (rf) for the different components of heat gains. The instantaneous convective load is determined by summing a plurality of convective heat load components.

$$Q_{convective} + Q_{roof}(1-rf_{w-r}) + \Sigma[Q_{wall}(1-rf_{w-r})] + (Q_{window,convective} + Q_{window,solar}(1-rf_{window}) + Q_{people}(1-rf_{people}) + Q_{lights}(1-rf_{lights}) + (Q_{equipment} + Q_{appliance,sensible})(1-rf_{equipment})$$

The hourly averaged radiative heat gain is determined by summing the radiative portions of the heat gains and dividing by three.

$$Q_{radiative,hour} = \frac{\begin{bmatrix} Q_{roof}rf_{w-r} + \sum[Q_{wall}rf_{w-f}] + \\ Q_{window,solar}rf_{window} + Q_{people}rf_{people} + \\ Q_{lights}rf_{lights} + (Q_{equipment} + \\ Q_{appliance,sensible})rf_{appliance} \end{bmatrix}}{3}$$

The total radiative gain is the sum of the current hourly-averaged radiative gain and the two previous hourly-averaged radiative gains:

$$Q_{radiative} = Q_{radiative,hour} + Q_{radiative,hour-1} + Q_{radiative,hour-2}$$

The total sensible cooling load is the sum of the radiative and convective cooling loads minus the portion of the sensible cooling credit from the display cases that does not go to the return air.

$$Q_{sensible} = Q_{convective} + Q_{radiative} + Q_{infiltration,sensible} - (1-f)Q_{cases,sensible}$$

The total latent cooling load is the sum of the component latent gains minus the portion of display case latent cooling credit that does not go to the return air stream.

$$Q_{latent} = Q_{people,latent} + Q_{appliance,latent} + Q_{infiltration,latent} - (1-f)Q_{cases,latent}$$

The humidity ratio in the facility 10 is determined by calculating the moisture capacitance of the store. In one embodiment, the moisture capacitance ($C_{moisture}$) of the facility 10 is assumed to be 20 times the moisture content of the volume of air in the facility 10 to account for moisture storage in the store, fixtures, and food product. The software assumes that the facility 10 has sufficient moisture capacitance that the zone humidity ratio changes slowly. This assumption eliminates the need to iterate and allows the humidity ratio for the facility 10 in the current hour to be used to find the net moisture loads, which are then used to calculate the facility humidity ratio for the next hour. Other methods (e.g., fixed constant based on experience with other facilities, etc.) can be used to account for the moisture content of the store.

$$W_{zone,hour+1} = W_{zone,hour} + \frac{(Q_{latent,loads} - Q_{latent,capacity})}{C_{moisture}}$$

A similar process is used for the space temperature when it floats between the heating and cooling set points. In one embodiment, the thermal capacitance ($C_{thermal}$) is assumed to be forty times the mass of the air in the facility 10 to account for the thermal mass of the fixtures and product in the facility 10 (e.g., about 54 lb/ft²). Other methods (e.g., fixed constant based on experience at other facilities, etc.) can be used to determine a thermal capacitance for the store. As for the moisture, the facility temperatures for the current hour are used to calculate the sensible loads, which are then used to calculate the zone temperature for the next hour without requiring iterations.

$$T_{zone,hour+1} = T_{zone,hour} + \frac{(Q_{sensible,loads} - Q_{sensible,capacity})}{C_{thermal}}$$

B. Refrigeration System

One embodiment of the software determines the operating state of the refrigeration system 28 using a mass flow method. Of course, the operating state of the refrigeration system 28 can be determined using other methods (e.g., empirical formulas, integration formulas, etc.) known to those in the art. One embodiment of the software determines an hourly energy-usage by the following: calculating the refrigeration load on the system from display cases, coolers, and mechanical sub-coolers; assuming an initial saturated condensing temperature and calculating the available compressor capacity; determining the resulting heat rejection load on the condenser and calculating the saturated condensing temperature required to provide that heat rejection; determining an amount of subcooling (and superheat) provided by subcoolers; using a calculated saturated condensing temperature, the amount of subcooling, and the amount of superheat to find a compressor performance; and repeating the previous acts until achieving convergence of a mass flow rate of the refrigerant to and from the refrigeration system. In one embodiment, the software continues to perform iterations of the above acts until the mass flow rate of the refrigerant converges to within a predetermined percentage (e.g., 0.1%). Of course, the frequency of the iterations can be varied, as well as the predetermined percentage for convergence of the refrigerant mass flow rate.

In modeling the energy-usage, another embodiment of the software can further account for the following factors: impact of defrost on display case and walk-in cooler refrigeration loads, reduction in condenser heat rejection due to heat reclaim for space heating, and interactions between the racks due to mechanical subcooling.

1. Display Cases

One embodiment of the software simulates the energy-usage of the display cases by developing simple models for the cases based upon the manufacturer's data augmented with certain theoretical relationships. Of course, the models can be developed using other sources of data (e.g., reference manuals, experience at other facilities, etc.) and is not limiting on the invention. In using the manufacturer's literature, an analyst can assume certain design conditions (e.g., store at 75° F. and 55% RH). Of course, an analyst can use other methods (e.g., design conditions based upon other stores, use average of actual values, etc.) to ascertain design conditions when using the manufacturer's literature.

Figure 33:
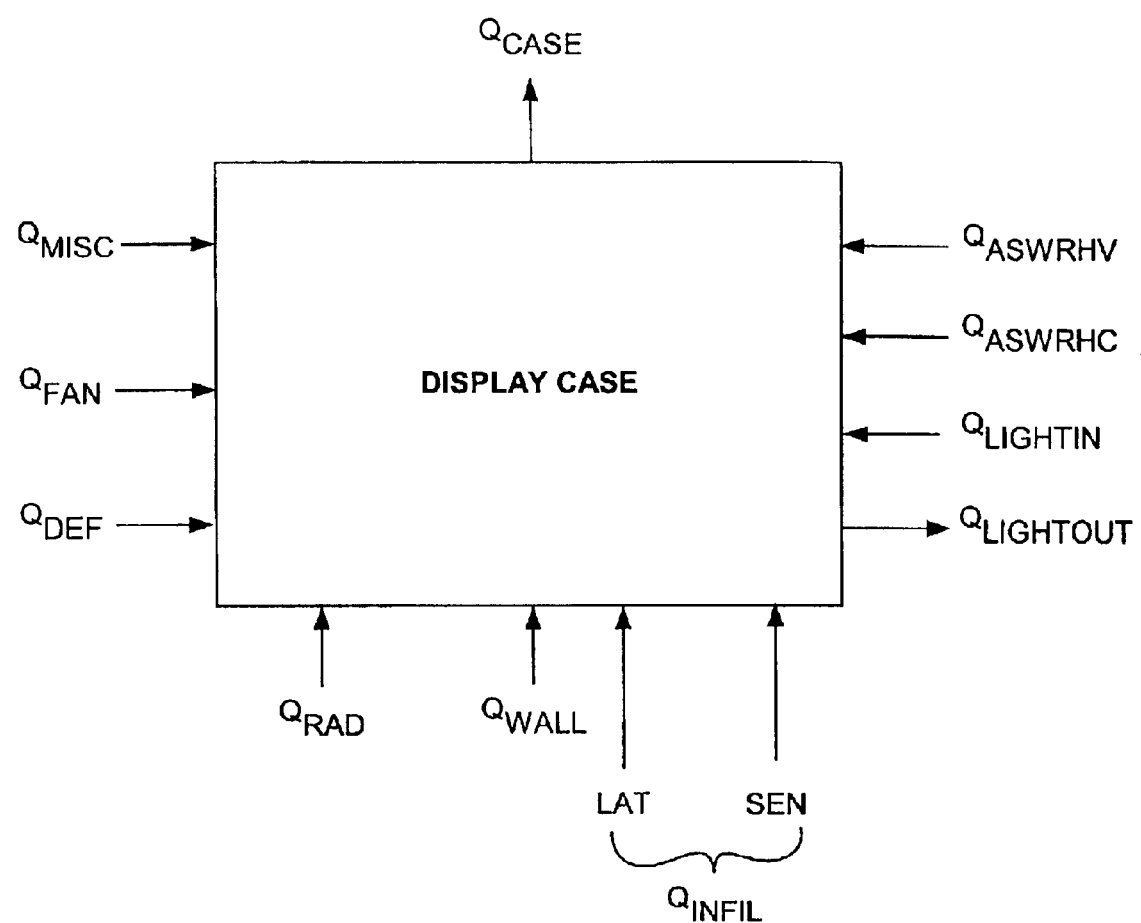
FIG. 33 is a schematic diagram of a mass flow balance of the energy usage of a refrigeration display case used in creating a baseline model of the energy-usage by a facility.

FIG. 33 is a schematic diagram of one embodiment of a mass flow rate analysis of energy (e.g., heat) transferred into and out of a refrigerated display case. The software uses manufacturer data for refrigeration load ($Q_{case}$), fan load ($Q_{fan}$), light load ($Q_{light}$), and anti-sweat heaters ($Q_{ASWRHC}$ and $Q_{ASWRHV}$). These known values are subtracted from the design refrigeration load. The remaining load can be attributed to the other modes of heat transfer (i.e., wall conduction, infiltration, and radiation). Generic factors from other sources (e.g., theory, actual experience) are used to assign the remaining loads to infiltration, conduction, and radiation.

In one embodiment, the correlation between the information published by ASHRAE and other sources can be used to correct for the loading and energy use at the actual zone temperature ($T_{zone}$) and humidity ($W_{zone}$) conditions. The correlation can be used to correct for sensible loads, latent loads, defrost loads, and anti-sweat heater loads. Other embodiments of the software can perform a less accurate analysis by relying on fewer parameters and by using assumed zone temperature and humidity conditions in correcting for the loading and energy use.

Because of the substantial input data requirements, one embodiment of the software includes a library of data files for generic systems of the facility (e.g., display cases). An analyst can access these data files to eliminate the need for extensive data entry. For example, generic data files can be created for the type of case (e.g., multi-shelf, single-shelf, glass door, etc.) and the use of the case (e.g., produce, meat, frozen food, ice cream, dairy, etc.). Of course, the input data requirements can also be manually entered for each respective case.

2. Load Correction Factors

One embodiment of the software includes load correction factors developed by ASHRAE to account for variations in case load and energy-use with space conditions. For example, the software of the invention includes the following correction factors:

LP—correction factor for latent load due to infiltration into the display case.

DP—correction factor for defrost heater load on the display case.

SP—correction for sensible load on display case

The correction factors are determined as a function of the facility zone conditions and the display case temperature (DCT). Of course, the software of the invention can be used without accounting for the correction factors noted above.

One embodiment of the software assumes the display case to be at a saturated condition.

$$LP = 1 - (K-RH)(L_1 + L_2 \cdot DCT + L_3 \cdot DCT^2 + L_4 \cdot DCT^3)$$

$$SP = \frac{T_{zone} - DCT}{75 - DCT}$$

$$DP = 1 - (55-RH) \cdot (D_1 + D_2 \cdot DCT + D_3 \cdot DCT^2 + D_4 \cdot DCT^3)$$

The coefficients for LP and DP are different for cases with vertical and horizontal air curtains. Other embodiments of the software can assume a condition below saturation, uniform coefficients for all types of curtains, etc.

3. Anti-Sweat Heaters

The software includes instructions to account for anti-sweat heaters that are either constant load ($Q_{ASWRHC}$) or anti-sweat heaters that vary with the humidity ratio inside the facility ($Q_{ASWRHV}$) as shown in FIG. 33. One embodiment of the software acquires inputs for the electrical input load (e.g., watts) of the constant and variable anti-sweat heaters used on the case based upon the following equations.

$$Q_{ASWRHC} = K(\text{Constant Load})$$

$$Q_{ASWRHV} = K(\text{Variable Load})(AP)$$

A portion of the anti-sweat heater load can be specified as inside the display case ($f_{door}$), with the remaining load assigned a heat gain directly to the space. Of course, other methods (e.g., use fixed values based on experience) known to those in the art can be used.

In one embodiment, the correction factor AP can be determined from the equation provided below. The equation below allows the analyst to specify a custom function to vary anti-sweat heater power with space relative humidity (RH). For example, setting $A_1=1.0$ and $A_2=0.04$ results in a function that decreases the variable portion of the anti-sweat heater power by 4% for every 1% drop in humidity below 55% RH. A typical AP value ranges from one at 55% RH to zero at 30% RH. In one embodiment, the AP can be limited to stay between 0 and 1.

$$AP = A_1 - A_2(55-RH)$$

One embodiment of an equation for determining the anti-sweat heater correction factor as proposed by ASHRAE is shown below. This equation assumes the difference between the zone dew point ($T_{dp}$) and the case temperature (DCT) can be the driving factor. The equation below is preferably used when both $A_1$ and $A_2$ are set to zero.

$$AP = \frac{T_{dp} - DCT}{55.7 - DCT}$$

Of course, other methods (e.g., known fixed values based upon past experience at similar facilities, etc.) can used to determine an anti-sweat heater correction factor.

One embodiment of an algorithm to predict the variation of anti-sweat heater power with humidity level is described below. The algorithm is preferably used when $A_1$ and $A_2$ are set equal to 99. Of course, other algorithms for varying humidity levels can be used. This method calculates the heat required in maintaining the case glass at the dew point by performing a heat balance on the glass. One embodiment of software uses known values for anti-sweat heater input per linear foot ($q_{s,rated}$) and the case temperature (DCT) from the case specifications. Of course, other methods or values can be used. The heater input is the sum of the constant and variable anti-sweat heater loads.

The resistance of the air film on the outside of the glass ($R_{air}$) is assumed, in one embodiment, to be 1.0 ft$^2$-h/Btu and the case height ($H_{case}$) is assumed to be 5 ft. This allows the resistance of the air film on the inside of the case ($R_{case}$) to be calculated using the following equation.

$$R_{case} = \frac{(T_{dp,rated} - DCT)}{\frac{q_{s,rated}}{H_{case}} - \frac{(T_{dp,rated} - T_{zone})}{R_{air}}}$$

Of course, other values for the resistance of the air film can be used.

With $R_{case}$ known, the relationship below predicts the energy input required for the surface temperature to stay above the dew point temperature.

$$Q_s = H_{case}\left[\frac{(T_{dp} - T_{zone})}{R_{air}} + \frac{(T_{dp} - DCT)}{R_{case}}\right]$$

One embodiment of the software uses $Q_s$ as the anti-sweat heater load, as long as the anti-sweat heater load is greater than the constant anti-sweat heater load ($Q_{ASWRHC}$) and less than or equal to the total anti-sweat heater load ($Q_{ASWRHC} + Q_{ASWRHV}$).

4. Case Lights

The lighting for the refrigerated case produces a load on both the refrigeration system ($Q_{LIGHTIN}$) and the building air system ($Q_{LIGHTOUT}$) as shown in FIG. 33. In one embodiment, the fraction of the lighting load which acts on a particular HVAC zone (FRLITRM) is determined based upon the position of the lights and ballast. If the lights and ballast are inside the case, then none of the load acts on the facility zone (FRLITRM=0). If the lights are inside and the ballast is outside, then 10% of the load acts on the facility zone (FRLITRM=0.1). If both the lights and the ballast are outside the case, then 50% of the load acts on the facility zone (FRLITRM=0.5). The analyst can specify both the design wattage of the lights and the actual wattage of the lights operating in the case. The design lighting values are used to correctly allocate the design loads of the case to the various heat transfer modes (conduction, radiation, and infiltration). The operating lighting levels are used to find the actual loads refrigeration loads and energy use. Another embodiment of the software also includes the option to account for the scheduled lighting operation in the cases. This option allows the software to simulate the impact of scheduled lighting operation (such as turning off the case lights at night when the facility is closed).

$Q_{LIGHTIN}$=3.413(1−*FLITRM*)(Electrical Consumption of Lights)

$Q_{LIGHTOUT}$=3.413(*FLITRM*)(Electrical Consumption of Lights)

5. Case Fans

For the loading from the display case fans ($Q_{FAN}$), the software uses a design fan electric load value and an operating load value. The software uses design values to allocate for the design loads in the case while the operating values correspond to the actual energy use. In one embodiment, the fans are assumed to operate continuously except while defrost is occurring. If the refrigerated display case is in a defrost cycle, then the fans are turned off and the electrical consumption and refrigeration load are reduced based on the duration of the cycle.

6. Miscellaneous Loads

The analyst can include other miscellaneous loads ($Q_{MISC}$) to the refrigerated case as shown in FIG. 33. These loads are entered as the maximum load (in Btu/h) acting on the case along with a schedule defining when the loads occur. In one embodiment of the software, the loads are assumed to be half-sensible and half-latent (i.e., SHR=0.5). Case stocking loads can be handled via this load input.

$Q_{MISC}$=(User Specified Load)(User Specified Schedule)

7. Defrost

A defrost operation is a complicated load acting on the refrigerated display case. One embodiment of the software includes four types of defrost operations included in the simulation program: no defrost, hot gas defrost, off cycle defrost, and electric defrost.

The off-cycle defrost operation does not add any heat to the case, but turns off the refrigeration coil in the case to let ice and frost melt naturally. Both the electric and hot-gas defrost operations melt frost by adding heat to the display case. For electric defrost, the load added to the display case ($Q_{DEF}$) as shown in FIG. 33 is the electric input to the heating elements. For hot gas defrost, the load added is:

$Q_{DEF}$=144(Amount of Ice)(*FRDEFHT*)

For defrost methods in general, the refrigeration load can be set to zero for the fraction of the hour corresponding to the duration of the defrost cycle. If the defrost cycle duration is more than one hour, then the software program carries over the impact to the next hour as well. In the hour following a defrost cycle, the deferred refrigeration loads from the previous hour (or hours) that would have normally occurred during the defrost cycle are added to the loads for the current hour. In addition, the heat added to the case by defrost ($Q_{DEF}$) is added to the current hour's loads as well. As a result, the refrigeration load imposed on the compressors by the display case drops during a defrost cycle and "spikes" in the following hour. This behavior is representative of the high loads expected as the case temperature is pulled-down following a defrost cycle.

In one embodiment, the software assumes that the case fans are off during a defrost cycle in regard to medium temperature cases (above 0° F.) with electric defrost and reach-in cases with glass doors. For other types of cases, the software assumes that the fans remain on during a defrost cycle.

8. Defrost Control

One embodiment of the software allows for three methods of controlling the defrost cycle: time-initiated/time-terminated defrost, time-terminated/temperature-terminated defrost, and on-demand defrost. The time-initiated/time-terminated defrost control is generally implemented by a "rack timer" that starts a defrost cycle at preset times each day for a fixed duration. When an hour with a scheduled defrost is reached, the defrost load is calculated and the case refrigeration load is set to zero for the portion of the hour (or hours) corresponding to the cycle duration. The temperature-terminated defrost control method is implemented by starting a defrost cycle as scheduled, but the cycle is terminated when a "termination sensor" reaches a selected level or set point. In one embodiment, a temperature sensor is used to sense termination of a defrost cycle. Alternatively, optical techniques or sensors can also be used to sense the completion of a defrost cycle. These control techniques to sense the completion of defrost cycles allows for shorter cycle lengths during less humid periods when less frost is formed. This control method is simulated using the defrost correction factor (DP) discussed above. The factor DP is used to predict the variation of cycle length with facility conditions. This control method generally applies to hot gas-defrost and electric-defrost where heat is being added to the display case. Although, with optical methods, this control technique can also be used by the program to provide termination with off-cycle defrost as well.

On-demand defrost initiates a defrost cycle when the maximum amount of ice accumulates on the refrigeration coil. The maximum amount of ice is calculated from the total daily latent load on the display case at design conditions, the design number of defrost cycles, and design length of each defrost cycle. This defines the mass of frost and ice to be removed from the coil per cycle at design conditions (lb/cycle). One embodiment of the software keeps track of the amount of ice/frost accumulating on the coil based on case's latent load for the current hour and the time since the last defrost cycle. When the nominal or design amount of ice has accumulated on the coil, a defrost cycle is initiated. The amount of ice equals a nominal value, so the defrost cycle lasts for the design duration.

9. Breakdown of Display Case Loads

The breakdown of case loads between conduction, radiation, and infiltration loads can be calculated based on the design load of the case and estimated percentages in each category. The latent and sensible loads imposed on the case from the space are determined, in one embodiment, by subtracting the known design values, such as light, fan and anti-sweat heater power, from the design refrigeration load of the case.

$$Q_{LAT\&SEN} = Q_{DESIGN} - [Q_{LIGHTIN} + (Q_{ASWRHV} + Q_{ASWRHC}) f_{ASW,in} + Q_{FAN} + Q_{DEF}]_{design}$$

A user-specified fraction of the latent and sensible load from infiltration (FRINFIL) is used to separate the infiltration load ($Q_{INFIL}$) from the wall conduction ($Q_{WALL}$) and radiation loads ($Q_{RAD}$) as shown in FIG. 33.

$$Q_{INFIL} = (Q_{LAT\&SEN})(FRINFIL)$$

The latent and sensible components of the infiltration load are determined from the latent heat ratio (LHR) of the infiltrated air. The analyst can specify the LHR of the infiltration air.

$$Q_{INFIL,LAT} = (LHR)(Q_{INFIL})$$

$$Q_{INFIL,SEN} = Q_{INFIL}(1 - LHR)$$

The loses due to conduction through the walls and radiation are the remaining loads, and the portion of these loads to radiation is specified by the fraction (FRRAD)

$$Q_{WALL\&RAD} = Q_{LAT\&SEN} - Q_{INFIL}$$

$$Q_{RAD} = (FRRAD)(Q_{WALL\&RAD})$$

$$Q_{WALL} = Q_{WALL\&RAD} - Q_{RAD}$$

To calculate the total load on the refrigerated case, the infiltration loads can be corrected if the refrigerated display case has doors. The analyst specifies a fraction of the hour that the doors to the refrigerated case are open (DRRAT). This value can be specified in a weekly schedule. In one embodiment, the nominal capacity of reach-in glass door cases generally assumes the doors are open 1% of the time. Therefore, the infiltration loads are adjusted by the following factor:

$$f_{door} = \frac{DRRAT}{0.01}$$

If the doors are open 100% of the time, then the infiltration load is 100 times the nominal value. For a typical reach-in case, the nominal load due to infiltration can be about 3–4% of the total case load. If the doors are open 100% of the time, the total refrigeration load can increase by a factor of 4–5 compared to the nominal load. The large impact of door openings can be consistent with industry lab test results and experience.

In one embodiment as shown in FIG. 33, the total load on the refrigerated case can be determined by summing all of the calculated loads and correcting them for the facility conditions.

$$Q_{CASE} = [Q_{INFIL,SEN}(SP) + Q_{INF,LAT}(LP)](f_{door}) + Q_{RAD,corrected} + Q_{WALL}(SP) + [(Q_{ASWRHV} + Q_{ASWRHC}) f_{ASW,in} + Q_{LIGTIN} + Q_{FAN}]_{operating} + Q_{MISC}$$

10. Case Credits

The case credits represent the cooling provided to the space by the cases. The case credits are a portion of the case loads. The sensible case credit can be calculated from the corrected infiltration and conduction loads plus the radiation loads and the sensible portion of the miscellaneous loads and minus the case lighting load to the store.

Sensible Credit=$[Q_{INFIL,SEN}(f_{door}) + Q_{WALL}](SP) + Q_{RAD,corrected} - (Q_{ASWRHC} + Q_{ASWRHV})(1 - f_{ASW,in}) - Q_{LIGHTOUT}$ The latent case credit can be calculated, in one embodiment, from the corrected latent infiltration.

Latent Credit=$Q_{INFIL,LAT}(DP)(f_{door}) + Q_{MISC,LAT}$

11. Coolers

The calculations for the cooler loads, particularly walk-in cooler loads, can be performed similar to the calculations for the display cases. A difference can be in the calculation of the conduction and infiltration loads.

The loads from the electrical inputs are calculated as in the display cases with some simplifying assumptions. The fan load can be calculated, in one embodiment, from the electric input to the fan, where the anti-sweat heaters are assumed to be constant electric input regardless of facility conditions, the lights and ballasts are assumed to be inside the cooler, and the miscellaneous loads are scheduled.

The defrost cycles can be calculated exactly as for the display case and the same equations can be used.

The infiltration load through the door of the walk in cooler can be from the air exchange between the warm facility zone and the cold cooler. The load can be determined from the average infiltration rate though the door and the difference in enthalpy between the cooler and the facility air. An infiltration rate can be specified for the door both open and closed. Then the door can be scheduled as a percentage open ($f_{open}$) for each hour of the week.

$$Q_{INF} = ACH(\text{Volume}) \rho_{air}(h_{space} - h_{cooler})$$

$$ACH = ACH_{open} \cdot f_{open} + ACH_{closed} \cdot (1 - f_{open})$$

The infiltration load can be separated into sensible and latent components by assuming the cooler is at 90% relative humidity (RH) and using standard psychrometric relations.

In one embodiment, the conduction load can be determined based on the dimensions of the cooler, the thermal conductivity of the materials, and the difference in the walk-in-cooler temperature (DCT) and the zone temperature. The analyst enters the height, length, and width of the cooler and the overall U-Value (e.g., insulation rating) for the cooler walls $$Q_{COND} = [(\text{length})(\text{width}) + 2(\text{length})(\text{height}) + 2(\text{width})(\text{height})](U\_value)(T_{zone} - DCT)$$

The total refrigeration load for the walk-in-cooler can be the sum of the component loads.

$$Q_{COOLER} = Q_{INFIL} + Q_{COND} + Q_{FAN} + Q_{LIGHT} + Q_{ASWR} + Q_{DEFROST} + Q_{MISC}$$

The walk-in-cooler has a credit, or provides cooling, to the space. Preferably, the sensible credit is the sum of the sensible infiltration load and the conduction load. Preferably, the latent credit is equal to the latent component of the infiltration load.

Sensible Credit=$Q_{INFIL,SEN}+Q_{COND}$

Latent Credit=$Q_{INFIL,LAT}$

12. Compressors

In one embodiment, the software simulates compressors in both stand-alone (i.e., conventional) and multiplexed (e.g., multiple compressors/condensers connected by a circuit to multiple display cases) arrangements. In each case, the performance of a single compressor can be determined in the same manner. The compressor data supplied by the manufacturer gives a compressor capacity and a power as a function of the saturated suction temperature (SST) and the saturated discharge temperature (SDT). In one embodiment, the capacity and power are calculated as a third order polynomial function as a function of the SST and SDT.

Capacity=$A_0+A_1SST+A_2SDT+A_3SST^2+A_4(SST)(SDT)+A_5SDT^2+A_6SST^3+A_7(SDT)(SST)^2+A_8(SST)(SDT)^2+A_9SDT^3$ Power=$B_0+B_1SST+B_2SDT+B_3SST^2+B_4(SST)(SDT)+B_5(SDT)^2+B_6(SST)^3+B_7(SDT)(SST)^2+B_8(SST)(SDT)^2+B_9(SDT)^3$ The coefficients $A_{0-9}$ and $B_{0-9}$ are determined from a linear regression analysis of the compressor performance data and are unique for each compressor and for each compressor unloading state. These coefficients can be either selected from the compressor library or entered by the analyst. A compressor with multiple cylinders providing the compression can have the possibility of operating with less than all of the cylinders active, thereby reducing the capacity and power of the compressor. However, there is not a direct relationship between the number of cylinders operating and the capacity and power. For example, if a compressor with four cylinders is operated with only two cylinders active, the capacity and power will not be exactly one half the capacity and power of the compressor operated with all four cylinders active. Because of this, it is preferable to perform a regression analysis and calculate the coefficients $A_{0-9}$ and $B_{0-9}$ for each possible unloaded state of operation. The number of possible unloaded operation states depends on the number of cylinders in the compressor and the control provided by the manufacturer.

The capacity of the compressor also depends on the subcooling and superheating of the refrigeration system. In one embodiment, compressor performance curves from the manufacturer are given for a specific amount of superheating and subcooling. A correction may be needed if the system is operating with different levels of subcooling and superheating. The correction can be based on the difference in enthalpy and vapor specific volume of the refrigerant between the design conditions of the data table and the actual operating conditions.

$$Capacity_{actual} = Capacity_{data}\left(\frac{\Delta h_{actual}}{\Delta h_{data}}\right)\left(\frac{v_{g,data}}{v_{g,actual}}\right)$$

To simulate the performance of a refrigeration system with multiple compressors, the capacity and the power of each compressor at loading level can be calculated. The capacities are then compared to the refrigeration load that the system can meet during that hour. In one embodiment, the compressors are assumed to load up in the order they are entered for each rack system. So if compressor 1 is unable to meet the refrigeration load, then compressor 2 can be activated. Therefore, a compressor with multiple loading states (i.e., unloaders) should be entered last if those smaller capacity steps are to be used.

If the refrigeration load is higher than the system capacity with all compressors on, then the unmet load can be deferred to the next hour and a warning message can be issued. Otherwise, the refrigeration load will lie between two possible compressor unloading states. The compressor will cycle between the unloaded state above and below the required refrigeration load to meet, on average, the refrigeration load for the hour. This cycling can be calculated, in one embodiment, by first determining between which two unloading states the refrigeration load lies. The fraction of the hour that each unloading state operates can be calculated to determine the compressor power for the hour.

$$\text{Fraction of hour higher loading state is on} = \frac{\text{Refrigeration Load} - \text{Capacity at lower state}}{\text{Capacity at higher state} - \text{Capacity at lower state}}$$

From this fraction, the total compressor power for the hour can be determined.

Power=(1−fraction of hour higher state is on)·Power at lower state+(fraction of hour higher state is on)·Power at higher state The software determines a mass flow rate of the refrigerant in the system based upon the refrigeration load and the change in enthalpy across the evaporator.

The enthalpy across the evaporator includes the actual amount of subcooling and superheating achieved in the condenser and evaporator, respectively.

$$\text{Mass flow rate} = \frac{\text{Refrigeration Load}}{\Delta h_{evaporator}}$$

13. Refrigeration Condensers

One embodiment of the software includes instructions for modeling the energy-usage of two types of condensers: air-cooled condensers and evaporative-cooled condensers.

For an air-cooled condenser, the refrigerant phase can be condensed to a liquid using ambient air blown over a coil. The total heat rejected through the condenser can be equal to the sum of the refrigeration load and the compressor power input to the refrigerant stream. The compressor power input to the refrigerant stream depends on the compressor type. A hermetic (or semi-hermetic) compressor transfers all of the electrical input to the refrigerant while an open compressor transfers only a portion of the electrical input times to the refrigerant. In one embodiment of the software, the total heat rejection can be calculated using the equation below.

Total Heat Rejected=Refrigeration on Load+$K$(Compressor Motor Power)$\eta_{hermetic}$ The hermetic efficiency can be 1.0 for hermetic compressors and less than one for open compressors.

The nominal capacity rating of the condenser can be given by the heat rejected per degree of temperature difference between the condensing refrigerant and the ambient dry bulb temperature. There can be an altitude correction (AC) to the nominal capacity based on the location of the facility 10.

$$AC = \frac{1}{\left[1 + 0.025\left(\frac{\text{Altitude}}{1000}\right)\right]}$$

Using the nominal capacity rating and the calculated total heat rejected by the condenser, the condensing temperature can be determined using the following equation.

$$T_{cond} = T_{db} + \frac{\text{Total Heat Rejected}}{(\text{Nominal Capacity})(AC)}$$

For correct expansion valve and compressor operation, a minimum condensing pressure (and temperature) can set. If the condenser temperature produced by the condenser with all of the fans operating is lower than the minimum condensing temperature, the condenser fans can cycle to maintain this minimum temperature. In one embodiment, the software determines the number of fans required by setting the condensing temperature equal to the minimum condensing temperature and calculating the condensing capacity needed to maintain this temperature.

$$\text{Operating Capacity} = \frac{\text{Total Heat Rejected}}{T_{cond,\min} - T_{db}}$$

The capacity of the condenser can be assumed to decrease proportionally with to the number of fans being operated. For example if three of four fans are on, then the capacity of the condenser is three-fourths of the nominal capacity. This can be used to calculate the percent of the fans needed to maintain the minimum condensing temperature.

$$\% \text{ fans on} = \frac{\text{Operating Capacity}}{(\text{Nominal Capacity})(AC)}$$

The electrical power consumption of the condenser can then be calculated, in one embodiment, from the total number of fans, the fan motor horsepower, and the fraction of the fans operating.

Electrical consumption=(% fans on)(total # of fans)(horsepower)($K$)

One embodiment of the software also includes the option for two-speed (icpcor=3) and variable-speed (icpcor=2) condenser fans. With the two-speed control, the analyst enters a nominal condenser capacity and fan horsepower corresponding to low speed operation. Then the program determines the amount of time required at each speed.

$$Fraction_1 = \frac{(OperatingCapacity/AC - NominalCapacity_2)}{(NominalCapacity_1 - NominalCapacity_2)}$$

$$Fraction_2 = 1 - Fraction_1$$

The software determines the power consumption of the condenser at each fan speed using the equation for electrical consumption noted above and multiplying by the appropriate fractions.

In one embodiment, variable speed fan operation can be modeled by assuming that all condenser fans are controlled together (say by using a single variable frequency drive on multiple motors). Under this scenario, the volume of air flow required to meet the operating capacity can be determined using the relation shown in the equation below:

$$\frac{V_{operating}}{V_{design}} = C_0 + C_1\left(\frac{Q_{operating}}{Q_{design}}\right) + C_2\left(\frac{Q_{operating}}{Q_{design}}\right)^2 + C_3\left(\frac{Q_{operating}}{Q_{design}}\right)^3$$

This relationship (taken from evaporative condenser performance data) can be used to calculate the fan volume reduction that provides the desired capacity reduction. Then the fan power can be calculated using the following fan laws:

$$\text{Operating Power} = \text{Design Power}\left(\frac{V_{operating}}{V_{design}}\right)^3$$

14. Evaporative Condenser

An evaporative condenser uses water in addition to the air stream to condense the refrigerant. This allows the condensing temperature to approach the wet bulb temperature. The total heat rejection load on the condenser can be calculated as described for the air-cooled condenser above.

The condensing temperature can be correlated with the ambient wet bulb temperature and a factor called the heat rejection capacity factor (HRCF) based on the nominal capacity of the condenser and the total heat rejected.

$$HRCF = \frac{\text{Nominal Capacity}}{\text{Total Heat Rejected}}$$

Then HRCF can be used with the wet bulb temperature ($T_{wb}$) to determine the condensing temperature using a table of values typically found in the manufacturer specifications. These relationships can typically be fit to a curve of the following form:

Approach=$A_0+A_1(HRCF)+A_2/^{(HRCF)}+A_3 T_{wb}$ where $T_{cond}=T_{wb}+\text{Approach}$ A minimum condensing temperature can be required for correct expansion valve and compressor operation. The types of methods for controlling the capacity of evaporative condensers include air dampers, two-speed/pony motors, and variable-speed motors. These methods reduce the airflow through the condenser and can reduce the capacity of the condenser to as low as ten percent of the nominal capacity.

When the condensing temperature drops to the minimum condensing temperature, the HRCF can be calculated, in one embodiment, from the ambient wet bulb and the minimum condensing temperature. The equation can be "inverted" to a quadratic equation in terms of HRCF. The HRCF can be determined by finding the roots.

$$HRCF = \frac{-(A_0 - \text{Approach} - A_3 T_{wb}) - \sqrt{(A_0 - \text{Approach} - A_3 T_{wb})^2 - 4A_1 A_2}}{2A_1}$$

The operating nominal capacity can be calculated from HRCF and the total heat rejection load on the condenser.

Operating Nominal Capacity=($HRCF$)(Total Heat Rejected)

The ratio of the air volume flow rate through the condenser to the design air volume flow rate can be correlated to the ratio of the operating nominal capacity ($NC_{operating}$) to the design nominal capacity ($NC_{design}$).

$$\frac{V_{operating}}{V_{design}} = C_0 + C_1\left(\frac{NC_{operating}}{NC_{design}}\right) + C_2\left(\frac{NC_{operating}}{NC_{design}}\right)^2 + C_3\left(\frac{NC_{operating}}{NC_{design}}\right)^3$$

This relationship (the same as for air-cooled condenser above) can be used to calculate the fan volume reduction that provides the desired capacity reduction.

The required fan power can be calculated using the fan laws and the airflow control method noted above. With air dampers, the fan power can be considered essentially proportional to the airflow down to a volume ratio of 10%.

$$\text{Operating Power} = \text{Design Power}\left(\frac{V_{operating}}{V_{design}}\right)$$

For variable-speed control, the fan power can be reduced by a cubed law down to a volume ratio of 20%.

$$\text{Operating Power} = \text{Design Power}\left(\frac{V_{operating}}{V_{design}}\right)^3$$

For two-speed control of an evaporative condenser, a similar approach can be used as for the air-cooled condenser.

The equation below can be used to find the fraction of the capacity over low speed. The low speed nominal capacity, if not specified, can be calculated from the low speed fan power using the fan laws to find the resulting air flow rate, and a volume-capacity relationship to calculate the nominal capacity associated with low speed. The volume-capacity correlation can be used to find the volume ratio at high speed. The volume ratio (VR) at low speed can be taken to be the difference from one. The power use can be weighted between low- and high-speed fan operation using the VRs for high and low-speed.

$$Fraction_{high} = \frac{(NC_{operating} - NC_{design-low})}{(NC_{design-high} - NC_{design-low})}$$

$VR_{high} = C_0 + C_1(Fraction_{high}) + C_2(Fraction_{high})^2 + C_3(Fraction_{high})^3$ $VR_{low} = 1 - VR_{high}$ If the operating capacity is less than the low-speed capacity, the fan power can be modulated assuming the method described above for air damper capacity control.

The power associated with the spray pump can also be added to the condenser energy use, as can power associated with the sump heater, whenever the ambient wet bulb temperature falls below the analyst defined set point.

As noted, the above-described mathematical equations are provided in software instructions executable by a processor. One embodiment of the software is a windows-based system with interfaces for receiving input information from the audit and providing output information for submission to a customer. In one embodiment, the software interfaces include the survey form and the audit form described above. The analyst can access the information from the survey and audit from the electronic database used to store the audit and survey forms. The interfaces can also allow the analyst to enter the actual values of the data acquired from the audit for the mathematical equations described above, as well as use or change previously used coefficients from modeling similar systems and or facilities, in determining the mass balance of the energy-usage of the facility. The analyst can change the coefficients based upon experience or references (e.g. ASHRAE) known to those skilled in the art in the mathematical expressions to converge the predicted output of the model with the actual data for the energy-using systems. In one embodiment, creating a model of the energy-usage includes determining the energy usage by the systems of the facility 10 described above. In another embodiment, the analyst can add or subtract components and/or systems for determining the energy-usage of a facility to reflect a significance of the loads and the desired degree of accuracy for the model of the energy-usage of the facility 10.

Referring again to FIG. 2 and at act 1165, the analyst archives a recommended baseline energy model. In one embodiment, the baseline energy model includes a prediction of an energy-usage by an energy-using system of a facility for values for an operating parameter and a weather parameter. At act 1170, the analyst confirms the accuracy of the energy-usage model by comparing a predicted output for the energy-usage using the model with the archived audit data for the facility 10. If the predicted output of the energy-usage model is within a threshold percentage error of the actual data for the energy-using systems acquired from the audit, the analyst can indicate that the model is suitable for recommendation to the customer. If necessary, the analyst can adjust the mathematical relationships described above until the predicted output is within a threshold percentage difference with the actual data acquired for the energy-using systems.

At act 1175 (FIG. 2), the analyst reviews the energy model to determine what actions can be performed to improve the energy efficiency, or reduce the energy-usage, of the facility 10. Act 1180 includes generating and recording what actions to recommend to the customer. If actions are recommended, act 1185 includes sales personnel getting pricing information to perform the actions. Act 1190 includes preparing information on the return of investment (ROI) and savings from performing any recommended actions.

At act 1195, the analyst presents the results of the audit, including the recommended model and any actions to be undertaken, in a report to the customer. In general, the report includes a detailed description of the facility 10, a description of the adjustments made, a maintenance report, a report on the actions that improve energy efficiency and performance, conclusions and recommendations, and an appendix with the audit report and the modeling data.

One embodiment of the detailed description of the facility 10 includes a detailed evaluation of the energy-using systems at the facility 10, the initial settings and set points of the systems, a description of the process used in creating the baseline model for energy usage of the facility 10, and an electric rate(s) used in determining the cost of the energy-usage or consumption by the facility 10. One embodiment of the description of the adjustments made to the initial settings includes a determination of the energy-usage and costs after the adjustments, a model for the energy usage of the systems at the facility 10 after the adjustments (i.e., tune-up), and a comparison of the baseline and after tune-up energy usage by the facility 10. One embodiment of the report on the actions that improve energy efficiency and performance includes a list of the recommended actions to be performed and an estimate of the return on investment (ROI) by taking the actions. One embodiment of the conclusions and recommendations includes an analysis of the realized amount of savings from the adjustments made during the audit, and the potential savings within the facility's current capabilities (e.g., adjust scheduling, maintenance to be addressed, etc.).

One embodiment of the appendix includes a series of spreadsheets that provides a detailed description of the data used in creating the baseline model of the facility, as well as the predicted energy consumption at the facility for the year. One embodiment of the spreadsheets is in Microsoft Excel format, but other formats of spreadsheets known to those in the art can be used.

FIG. 34 illustrates one embodiment of a first spreadsheet 2005, which relates to the weather parameters and the indoor environmental parameters (e.g., temperature, humidity) used by the software in creating the model for the energy-usage by the facility 10. FIG. 35 illustrates one embodiment of a second spreadsheet 2010, which relates to operating costs and power-usage at different hours of the day (i.e., off-peak, shoulder, and on-peak hours). FIG. 36 illustrates one embodiment of a third spreadsheet 2015, which relates to a break-down of the power usage by type of system (e.g., refrigeration, HVAC, fans, heater & blowers, etc.). FIG. 37 illustrates one embodiment of a fourth spreadsheet 2020, which relates to rate of natural gas consumption by systems (other than HVAC systems) in the facility 10.

Figure 38:
FIG. 38 is an illustration of one embodiment of a fifth report spreadsheet relating to natural gas use by HVAC zone and energy-usage by a refrigeration system.
Figure 42:
FIG. 42 is an illustration of one embodiment of a ninth report spreadsheet relating to energy-usage by a refrigeration rack.

FIG. 38 illustrates one embodiment of a fifth spreadsheet 2025, which relates to a rate of natural gas consumption by the HVAC system in the store. In addition, the fifth spreadsheet 2025 includes a breakdown of the energy-usage by component (e.g., case, compressor, condenser, etc.) of a refrigeration system. FIG. 39 illustrates one embodiment of a sixth spreadsheet 2030, which relates to energy-usage or consumption by component (e.g., defrost, fans, lights, etc.) of the display cases. FIG. 40 illustrates one embodiment of a seventh spreadsheet 2040, which relates to energy-usage by component (e.g., defrost, fans, lights, etc.) of the walk-in coolers where food is stored. In addition, the seventh spreadsheet 2040 includes an annual summary of the energy consumption by rack. FIG. 41 illustrates one embodiment of an eighth spreadsheet 2045, which relates to energy loads (e.g., the refrigeration load, the unmet load, rejected heat through the condenser) for each rack. The eighth spreadsheet 2045 further includes a list of the operating conditions (e.g., saturated suction temperature (SST), saturated discharge temperature (SDT), subcooling level (SC), and superheating level (SH)) by rack. FIG. 42 illustrates one embodiment of a ninth spreadsheet 2050, which relates to a breakdown of the energy consumption by components (e.g., cases, compressors, condensers, subcoolers, etc.) for each rack.

FIG. 43 illustrates one embodiment of a tenth spreadsheet 2055, which relates to defrost run times by rack and energy use by HVAC zone and component (e.g., compressor, fan, etc.). FIG. 44 illustrates one embodiment of an eleventh spreadsheet 2060, which relates to a breakdown of HVAC operating hours by HVAC zone. FIG. 45 illustrates one embodiment of a twelfth spreadsheet 2065, which relates to a breakdown of the interior space loads by HVAC zones and components (e.g., the building envelope, the sensible and latent part of the infiltration loads, the sensible and latent part of the heat gain, and the sensible and latent part of the case credits). FIG. 46 illustrates one embodiment of a thirteenth spreadsheet 2070, which relates to a breakdown of ventilation loads by HVAC zone and components (e.g., sensible and latent parts of ventilation load). FIG. 47 illustrates one embodiment of a fourteenth spreadsheet 2075, which relates to a breakdown of air system loads by HVAC zone and component (e.g., sensible and latent parts of the water (Ecn) and gas (DX) cooling unit loads, etc.). In addition, the fourteenth spreadsheet 2075 includes a breakdown of ventilation rates by HVAC zone. FIG. 48 illustrates one embodiment of a fifteenth spreadsheet 2080, which relates to a breakdown of the degradation of the refrigeration hot gas bypass by percentage (e.g., minimum, average, maximum). In addition, the fifteenth spreadsheet provides a breakdown of the energy loads of the heating system by component (e.g., heat reclaim, heat pumps, boilers, etc.). FIG. 49 illustrates one embodiment of a sixteenth spreadsheet 2085, which relates to a breakdown of the water loop performance of the refrigeration and HVAC systems by component (e.g., the loop temperature, the change in loop temperature, loop flow, loop heat load, loop refrigeration heat load, and loop HVAC heat load).

Referring again to FIG. 2, if the customer does not approve the proposed actions at act 2100, then at act 2105, the technicians and/or monitoring team perform further monitoring at the facility 10 without the proposed actions in-place. If the actions are approved by the customer at act 2100, then at act 2110, the technicians and/or monitoring team perform further monitoring at the facility 10 with the proposed actions in-place.

Thus, the invention provides, among other things, an exemplary method and software for auditing the energy-usage of a facility 10. Various features and advantages of the invention are set forth in the following claims.

What is claimed is:

1. A method of auditing the energy-usage by a facility including an energy-using system, the energy-using system including an operating parameter having a value, the method comprising:

acquiring an initial value of the operating parameter;

acquiring initial data of the energy-using system with the operating parameter set at the initial value;

creating a baseline model of the energy-usage by the facility with the initial energy-using system data;

determining an initial rate of energy-usage by the facility based upon the initial energy-using system data and the baseline energy-usage model;

changing the initial value of the operating parameter to a changed value;

acquiring subsequent data relating to the energy-using system with the operating parameter set at the changed value; and determining a modified rate of energy-usage by the facility based upon the subsequent energy-using system data and the baseline energy module.

2. The method as set forth in claim 1 and further comprising:

calculating a difference between the initial rate of energy-usage and the modified rate of energy-usage, wherein the difference represents a potential savings in energy-usage by changing the value of the operating parameter.

3. The method as set forth in claim 1 and further comprising:

connecting a communication line between the facility and a remote monitoring center.

4. The method as set forth in claim 1 wherein the energy-using system includes a heating, ventilation, and air-conditioning (HVAC) system.

5. The method as set forth in claim 1 wherein the energy-using system includes a lighting system.

6. The method as set forth in claim 1 wherein the data of the energy-using system includes:

a plurality of characteristics of a roof, a wall, a floor and a ceiling construction of the facility; and an occupancy of the facility.

7. The method as set forth in claim 6 wherein the facility is a supermarket.

8. The method as set forth in claim 6 wherein the facility is a distribution warehouse.

9. The method as set forth in claim 1 wherein the weather parameters include typical meteorological year data.

10. The method as set forth in claim 1 wherein the baseline model of the energy-usage of the facility is based upon an hourly-basis.

11. The method as set forth in claim 1 wherein acquiring the initial value of the operating parameter includes performing an initial survey of the facility and recording a plurality of survey information in a survey form, the plurality of survey information including an identification, a location, and a characteristic for each energy-using system.

12. The method as set forth in claim 11 wherein acquiring the initial value of the operating parameter includes pre-filling a plurality of entries of an audit form with the plurality of survey information.

13. The method as set forth in claim 1 wherein acquiring initial data of the energy-using system includes testing the performance of each energy-using system and acquiring the initial energy-using system data while performing the testing.

14. The method as set forth in claim 1 wherein creating a baseline model includes archiving the values of the operating parameters and the energy-using system data in an electronic database at a remote monitoring center.

15. The method as set forth in claim 1 wherein creating a baseline model is based upon a plurality of interactions between an HVAC system, a lighting system, a refrigeration system, a building envelope, and a plurality of weather parameters.

16. The method as set forth in claim 1 and further comprising:
  generating actions that will reduce the energy-usage of the facility;
  determining a return on savings for performing the actions; and
  providing to a customer a report that includes the actions and the return on savings.

17. The method as set forth in claim 16 wherein the customer report includes the energy-usage by the facility on a monthly-basis for a year.

18. The method as set forth in claim 1 wherein the method further comprises acquiring a plurality of values relating to a weather parameter for the facility, and wherein creating a baseline model of the energy-usage by the facility includes creating the baseline model with the weather data.

19. A method of auditing the energy-usage by a facility including an energy-using system, the energy-using system including an operating parameter having a value, the method comprising:
  acquiring an initial value of the operating parameter;
  acquiring initial data of the energy-using system with the operating parameter set at the initial value;
  acquiring a plurality of values relating to a weather parameter for the facility;
  creating a baseline model of the energy-usage by the facility with the initial energy-using system data and the weather data; and
  wherein creating a baseline model includes determining a balance of a mass flow rate of energy gains and losses to and from the energy-using system.

20. The method as set forth in claim 19 wherein the energy-using system includes a refrigeration system.

21. The method as set forth in claim 20 wherein creating a baseline model for the refrigeration system includes:
  calculating the energy gains and losses to and from one of a display case, a walk-in cooler, and a subcooler of the refrigeration system;
  assuming an initial saturated condensing temperature;
  calculating an available compressor capacity;
  determining a resulting heat rejection load on a condenser;
  calculating a saturated condensing temperature to provide the resulting heat rejection load;
  determining an amount of subcooling and an amount of superheating by a compressor;
  determining a compressor performance using the calculated saturated condensing temperature, the amount of subcooling, and the amount of superheating;
  determining a refrigerant mass flow rate; and
  repeating the above acts until achieving a convergence of the refrigerant mass flow rate to within a threshold percentage error.

22. The method as set forth in claim 19 wherein the method further comprises acquiring a plurality of values relating to a weather parameter for the facility, and wherein creating a baseline model of the energy-usage by the facility includes creating the baseline model with the weather data.

23. The method as set forth in claim 19 wherein the energy-using system includes a heating, ventilation, and air-conditioning (HVAC) system.

24. The method as set forth in claim 19 wherein the energy-using system includes a lighting system.

25. The method as set forth in claim 19 wherein creating a baseline model is based upon a plurality of interactions between an HVAC system, a lighting system, a refrigeration system, a building envelope, and a plurality of weather parameters.

26. The method as set forth in claim 19 and further comprising:
  generating actions that will reduce the energy-usage of the facility;
  determining a return on savings for performing the actions; and
  providing to a customer a report that includes the actions and the return on savings.

27. The method as set forth in claim 19 and further comprising:
  changing the initial value of the operating parameter to a changed value;
  acquiring subsequent data relating to the energy-using system with the operating parameter set at the changed value; and
  determining a modified rate of energy-usage by the facility based upon the subsequent energy-using system data and the baseline energy module.

28. A method of auditing the energy-usage by a facility including an energy-using system, the energy-using system including an operating parameter having a value, the method comprising:
  acquiring an initial value of the operating parameter;
  acquiring initial data of the energy-using system with the operating parameter set at the initial value;
  acquiring a plurality of values relating to a weather parameter for the facility;
  creating a baseline model of the energy-usage by the facility with the initial energy-using system data;

wherein creating a baseline model includes:
  predicting a mathematical relationship for a mass flow rate of energy gains and losses to and from the energy-using system;
  generating a predicted output relating to the energy-usage of the energy-using system based upon the values of the weather parameters and the predicted mathematical relationship;
  comparing the predicted output with the initial energy-using system data; and
  adjusting the mathematical relationship until the predicted output is within a predetermined percentage of the initial energy-using system data.

29. A software for auditing the energy-usage by a facility including an energy-using system the energy-using system including an operating parameter having a value, the software executed by a processor to:
  acquire an initial value of the operating parameter;
  acquire initial data of the energy-using system with the operating parameter set at the initial value;
  acquire values relating to a weather parameter for the facility; and
  create a baseline model of the energy-usage by the facility with the initial energy-using system data and the weather data;
  change the initial value of the operating parameter to a changed value; and
  determine a modified rate of energy-usage by the facility based upon the changed value of the operating parameter and the baseline energy-usage model.

30. The software as set forth in claim 29 and further executed by a processor to:
  determine an initial rate of energy-usage by the facility based upon the initial energy-using system data and the baseline energy-usage model.

31. The software as set forth in claim 29 and further executed by a processor to:
  calculate a difference between the initial rate of energy-usage and the modified rate of energy-usage, wherein the difference represents a potential savings in energy-usage from changing the value of the operating parameter.

32. The software as set forth in claim 29 and further executed by a processor to:
  connect a communication line between the facility and a remote monitoring center.

33. The software as set forth in claim 29 wherein the energy-using system includes a heating, ventilation, and air conditioning (HVAC) system.

34. The software as set forth in claim 29 wherein the data of the energy-using system includes:
  a plurality of characteristics of a roof, a wall, a floor and a ceiling construction of the facility; and
  an occupancy of the facility.

35. The software as set forth in claim 29 wherein the energy-using system includes a lighting system.

36. The software as set forth in claim 29 wherein the energy-using system includes at least one refrigeration system.

37. The software as set forth in claim 29 wherein the facility is a supermarket.

38. The software as set forth in claim 29 wherein the weather parameters include typical meteorological year data.

39. The software as set forth in claim 29 wherein the baseline model of the energy-usage of the facility is based upon an hourly basis.

40. The software as set forth in claim 29 wherein acquiring the initial value of the operating parameter includes performing an initial survey of the facility and recording a plurality of survey information in a survey form, the plurality of survey information including an identification, a location, and a characteristic for each energy-using system.

41. The software as set forth in claim 29 wherein acquiring the initial value of an operating parameter includes pre-filling a plurality of entries of an audit form with the plurality of survey information.

42. The software as set forth in claim 29 wherein acquiring the initial data of the energy-using system includes testing the performance of each energy-using system and acquiring the initial energy-using system data while performing the testing.

43. The software as set forth in claim 29 and further executed by the processor to:
  generate actions that will reduce the energy-usage of the facility;
  determine a return on savings for performing the actions; and
  provide to a customer a report that includes the actions and the return on savings.

44. The software as set forth in claim 29 wherein creating a baseline model includes archiving the values of the operating parameters and the energy-using system data in an electronic storage database.

45. The software as set forth in claim 29 wherein creating a baseline model is based upon a plurality of interactions between an HVAC system, a lighting system, a refrigeration system, a building envelope, and a plurality of weather parameters.

46. The software as set forth in claim 29 wherein the facility is a supermarket.

47. The software as set forth in claim 29 wherein the facility is a food distribution warehouse.

48. A software for auditing the energy-usage by a facility including an energy-using system, the energy-using system including an operating parameter having a value, the software executed by a processor to:
  acquire an initial value of the operating parameter;
  acquire initial data of the energy-using system with the operating parameter set at the initial value;
  acquire values relating to a weather parameter for the facility; and
  create a baseline model of the energy-usage by the facility with the initial energy-using system data and the weather data; and
  wherein creating a baseline model includes determining a mass-balance of the energy flowing to and from the energy-using system.

49. The software as set forth in claim 48 and further executed by the processor to:
  change the initial value of the operating parameter to a changed value; and
  determine a modified rate of energy-usage by the facility based upon the changed value of the operating parameter and the baseline energy-usage model.

50. The software as set forth in claim 48 wherein the energy-using system includes a heating, ventilation, and air conditioning (HVAC) system.

51. The software as set forth in claim 48 wherein the data of the energy-using system includes:

a plurality of characteristics of a roof, a wall, a floor and a ceiling construction of the facility; and an occupancy of the facility.

52. The software as set forth in claim 48 wherein the energy-using system includes a lighting system.

53. The software as set forth in claim 48 wherein the energy-using system includes at least one refrigeration system.

54. The software as set forth in claim 48 wherein acquiring the initial data of the energy-using system includes testing the performance of each energy-using system and acquiring the initial energy-using system data while performing the testing.

55. The software as set forth in claim 48 and further executed by the processor to:

generate actions that will reduce the energy-usage of the facility;

determine a return on savings for performing the actions; and provide to a customer a report that includes the actions and the return on savings.

56. The software as set forth in claim 48 wherein creating a baseline model is based upon a plurality of interactions between an HVAC system, a lighting system, a refrigeration system, a building envelope, and a plurality of weather parameters.

57. A software for auditing the energy-usage by a facility including an energy-using system, the energy-using system including an operating parameter having a value, the software executed by a processor to:

acquire an initial value of the operating parameter;

acquire initial data of the energy-using system with the operating parameter set at the initial value;

acquire values relating to a weather parameter for the facility; and create a baseline model of the energy-usage by the facility with the initial energy-using system data and the weather data;

wherein creating a baseline model includes:

predicting a mathematical relationship for a mass flow rate of energy gains and losses to and from the energy-using system;

generating a predicted output relating to the energy-usage of the energy-using system based upon the values of the weather parameters and the predicted mathematical relationship;

comparing the predicted output with the initial energy-using system data; and adjusting the mathematical relationship until the predicted output is within a threshold difference from the initial initial energy-using system data.

58. A method of auditing the energy-usage of an energy-using system of a facility, comprising:

surveying a plurality of energy-using systems at the facility, each energy-using system including a plurality of operating parameters;

acquiring an initial value for each operating parameter;

acquiring initial data for each energy-using system with the respective operating parameters set at the initial value;

acquiring a plurality of values relating to a plurality of building parameters, respectively, of the facility;

acquiring a plurality of values relating to a plurality of weather parameters, respectively, for the facility;

creating a baseline model of the energy-usage by the facility using the initial value for each operating parameter, the initial data of the energy-using system, the plurality of values relating to the plurality of building parameters, and the plurality of values relating to the plurality of weather parameters;

wherein the energy-using system includes a refrigeration system; and wherein creating a baseline model includes determining a mass flow rate of a refrigerant flowing to and from a refrigerated display case of the refrigeration system.

59. The method as set forth in claim 58 wherein the determining the mass flow rate of refrigerant includes:

calculating a refrigeration load from a plurality of energy losses and gains to and from one of a display case, a walk-in cooler, and a mechanical sub-cooler of the refrigeration system;

assuming an initial saturated condensing temperature;

calculating an available compressor capacity;

determining a resulting heat rejection load on a condenser;

calculating a saturated condensing temperature to provide the resulting heat rejection load;

determining an amount of subcooling and an amount of superheating;

finding a compressor performance using the calculated saturated condensing temperature, the amount of subcooling, and the amount of superheating;

determining a refrigerant mass flow rate; and repeating the above acts until achieving a convergence of the refrigerant mass flow rate to a predetermined percentage error.

60. The method of claim 59 wherein creating the baseline model of the energy-usage of the refrigeration system further includes:

determining an impact of a defrost operation on the display case refrigeration load and a walk-in cooler refrigeration load, determining a reduction in a condenser heat rejection due to a heat reclaim; and determining interactions between a first and a second rack of compressors due to an amount of subcooling.

61. The method as set forth in claim 58 and further comprising:

determining an initial rate of energy-usage by the facility based upon the initial energy-using system data and the baseline energy-usage model;

changing the value of the initial operating parameter;

determining a modified rate of energy-usage by the facility based upon the changed value of the operating parameter and the baseline energy module.

62. The method as set forth in claim 58 and further comprising:

calculating a difference between the initial rate of energy-usage and the modified rate of energy-usage, wherein the difference represents a potential savings in energy-usage by changing the value of the operating parameter.

63. A method of auditing the energy-usage of an energy-using system of a facility, comprising:

surveying a plurality of energy-using systems at the facility, each energy-using system including a plurality of operating parameters;

acquiring an initial value for each operating parameter;

acquiring initial data for each energy-using system with the respective operating parameters set at the initial value;

acquiring a plurality of values relating to a plurality of building parameters, respectively, of the facility;

acquiring a plurality of values relating to a plurality of weather parameters, respectively, for the facility;

creating a baseline model of the energy-usage by the facility using the initial value for each operating parameter, the initial data of the energy-using system, the plurality of values relating to the plurality of building parameters, and the plurality of values relating to the plurality of weather parameters;

determining an initial rate of energy-usage by the facility based upon the initial energy-using system data and the baseline energy-usage model;

changing the value of the initial operating parameter; and determining a modified rate of energy-usage by the facility based upon the changed value of the operating parameter and the baseline energy module.

64. The method as set forth in claim 63 wherein the baseline model for the energy-usage is on an hourly-basis.

65. The method as set forth in claim 63 wherein creating the baseline model for the energy-usage by the facility includes performing a balance of an energy flow to and from the energy-using system based upon the initial value for each operating parameter, the initial data of the energy-using system, the plurality of values relating to the plurality of building parameters, and the plurality of values relating to the plurality of weather parameters.

66. The method as set forth in claim 63 and further comprising:

calculating a difference between the initial rate of energy-usage and the modified rate of energy-usage, wherein the difference represents a potential savings in energy-usage by changing the value of the operating parameter.

67. The method as set forth in claim 63 and further comprising:

connecting a communication line between the facility and a remote monitoring center.

68. The method as set forth in claim 63 wherein the energy-using system includes a heating, ventilation, and air-conditioning (HVAC) system.

69. The method as set forth in claim 63 wherein the data of the energy-using system includes:

a plurality of characteristics of a roof, a wall, a floor and a ceiling construction of the facility; and an occupancy of the facility.

70. The method as set forth in claim 63 wherein the energy-using system includes a lighting system.

71. The method as set forth in claim 63 wherein the facility is a supermarket.

72. The method as set forth in claim 63 wherein the facility is a food distribution warehouse.

73. The method as set forth in claim 63 wherein the weather parameters include typical meteorological year data.

74. The method as set forth in claim 63 wherein surveying the facility includes recording a plurality of survey information in a survey form, the plurality of survey information including an identification, a location, and a characteristic for each energy-using system.

75. The method as set forth in claim 63 wherein acquiring the initial value of the operating parameter includes pre-filling a plurality of entries of an audit form with the plurality of survey information.

76. The method as set forth in claim 63 wherein acquiring the initial value of the operating parameter includes testing the performance of each energy-using system and acquiring the initial energy-using system data while performing the testing.

77. The method as set forth in claim 63 and further comprising:

generating actions that will reduce the energy-usage of the facility;

determining a return on savings for performing the actions; and providing to a customer a report that includes the actions and the return on savings.

78. The method as set forth in claim 63 wherein creating a baseline model includes archiving the values of the operating parameters and the energy-using system data in an electronic database at a remote monitoring center.

79. The method as set forth in claim 63 wherein creating a baseline model is based upon a plurality of interactions between an HVAC system; a lighting system; a refrigeration system; a building envelope of walls, ceilings, floors, and a roof; and a plurality of weather parameters.

80. A method of auditing the energy-usage of an energy-using system of a facility, comprising:

surveying a plurality of energy-using systems at the facility, each energy-using system including a plurality of operating parameters;

acquiring an initial value for each operating parameter;

acquiring initial data for each energy-using system with the respective operating parameters set at the initial value;

acquiring a plurality of values relating to a plurality of building parameters, respectively, of the facility;

acquiring a plurality of values relating to a plurality of weather parameters, respectively for the facility;

creating a baseline model of the energy-usage by the facility using the initial value for each operating parameter, the initial data of the energy-using system, the plurality of values relating to the plurality of building parameters, and the plurality of values relating to the plurality of weather parameters;

wherein creating a baseline model includes:

predicting a mathematical relationship for a mass flow rate of energy gains and losses to and from the energy-using system;

generating a predicted output relating to the energy-usage of the energy-using system based upon the values of the weather parameters and the predicted mathematical relationship;

comparing the predicted output with the initial energy-using system data; and adjusting the mathematical relationship until the predicted output is within a threshold of the initial energy-using system data.

81. A method of auditing the energy-usage by a supermarket having a plurality of energy-using systems, the energy-using systems including an operating parameter having a value, the plurality of energy-using systems including a heating, ventilation, and air-conditioning system, a lighting system, and a refrigeration system, the method comprising:

surveying the plurality of energy-using systems at the supermarket;

acquiring an initial value for each operating parameter;

acquiring initial data for each energy-using system with the respective operating parameters set at the initial value;

acquiring a plurality of values relating to a plurality of building parameters of the supermarket;

acquiring a plurality of values relating to a plurality of weather parameters, respectively, for the supermarket; and creating a baseline model of the energy-usage by the supermarket using the initial value for each operating parameter, the initial data, the plurality of values relating to a plurality of building parameters, and the plurality of values relating to the plurality of weather parameters;

generating an output that indicates a baseline energy-usage for each energy-using system of the supermarket;

changing the value of the initial operating parameter; and determining a modified rate of energy-usage by the supermarket based upon the subsequent energy-using system data and the baseline energy model.

82. The method as set forth in claim 81 wherein the baseline model for the energy-usage is on an hourly basis.

83. The method as set forth in claim 81 wherein creating a baseline model includes determining a load from the energy flowing to and from each energy-using system.

84. The method as set forth in claim 83 wherein determining the load is based upon the initial value for each operating parameter, the initial data, the plurality of values relating to the plurality of building parameters, and the plurality of values relating to the plurality of weather parameters.

85. The method as set forth in claim 81 wherein creating the baseline model of the energy-usage of the refrigeration system includes:

calculating an energy load on a display case, a walk-in cooler, and a mechanical sub-cooler of the refrigeration system;

assuming an initial saturated condensing temperature;

calculating an available compressor capacity;

determining a resulting heat rejection load on a condenser;

calculating a saturated condensing temperature to provide the resulting heat rejection load;

determining an amount of subcooling and an amount of superheating by a compressor;

finding a compressor performance using the calculated saturated condensing temperature, the amount of subcooling, and the amount of superheating;

determining a refrigerant mass flow rate; and repeating the above acts until achieving a convergence of the refrigerant mass flow rate to a predetermined percentage error.

86. The method of claim 85 wherein creating the baseline model of the energy-usage of the refrigeration system further includes:

determining an impact of a defrost operation on the display case refrigeration load and the walk-in cooler refrigeration load, determining a reduction in the condenser heat rejection due to a heat reclaim; and determining interactions between a first and a second rack of compressors due to, the amount of subcooling.

87. The method as set forth in claim 81 and further comprising:

determining an initial rate of energy-usage by the supermarket based upon the initial energy-using system data and the baseline energy-usage model.

88. The method as set forth in claim 87 and further comprising:

calculating a difference between the initial rate of energy-usage and the modified rate of energy-usage, wherein the difference represents a potential savings in energy-usage from changing the value of the operating parameter.

89. The method as set forth in claim 81 and further comprising:

connecting a communication link between an electronic monitoring system at the supermarket and a remote monitoring center.

90. The method as set forth in claim 81 wherein the plurality of building parameters include characteristics of a roof, a wall, a floor and a ceiling construction of the supermarket.

91. The method as set forth in claim 81 wherein the initial energy-using system data includes an occupancy of the supermarket.

92. The method as set forth in claim 81 wherein the weather parameters include typical meteorological year data.

93. The method as set forth in claim 81 wherein surveying includes acquiring a plurality of the survey information, including an identification, a location, and a characteristic for each energy-using system.

94. The method as set forth in claim 93 wherein acquiring the initial value of the operating parameter includes pre-filling a plurality of entries of an audit form with the plurality of survey information.

95. The method as set forth in claim 81 wherein acquiring the initial value of the operating parameter includes testing the performance of each energy-using system and acquiring the initial energy-using system data while performing the testing.

96. The method as set forth in claim 81 and further comprising:

generating actions that will reduce the energy-usage of the supermarket;

determining a return on savings for performing the actions; and providing to a customer a report that includes the actions and the return on savings.

97. The method as set forth in claim 81 wherein creating a baseline model includes archiving the values of the operating parameters and the energy-using system data in an electronic database at a remote monitoring center.

98. A method of auditing the energy-usage by a supermarket having a plurality of energy-using systems, the energy-using systems including an operating parameter having a value, the plurality of energy-using systems including a heating, ventilation, and air-conditioning system, a lighting system, and a refrigeration system, the method comprising:

surveying the plurality of energy-using systems at the supermarket;

acquiring an initial value for each operating parameter;

acquiring initial data for each energy-using system with the respective operating parameters set at the initial value;

acquiring a plurality of values relating to a plurality of building parameters of the supermarket;

acquiring a plurality of values relating to a plurality of weather parameters, respectively, for the supermarket; and creating a baseline model of the energy-usage by the supermarket using the initial value for each operating parameter, the initial data, the plurality of values relating to a plurality of building parameters, and the plurality of values relating to the plurality of weather parameters;

generating an output that indicates a baseline energy-usage for each energy-using system of the supermarket;

wherein creating a baseline model includes:
  predicting a mathematical relationship for a flow rate of energy gains and losses to and from the energy-using system;
  generating a predicted output based upon the values of the weather parameters and the predicted mathematical relationship;
  comparing the predicted output with the initial energy-using system data; and
  adjusting the mathematical relationship until the predicted output is within a predetermined percentage of the initial energy-using system data.

99. The method as set forth in claim 98 wherein the plurality of building parameters include characteristics of a roof, a wall, a floor and a ceiling construction of the supermarket.

100. The method as set forth in claim 98 wherein surveying includes acquiring a plurality of the survey information, including an identification, a location, and a characteristic for each energy-using system.

101. The method as set forth in claim 98 wherein acquiring the initial value of the operating parameter includes testing the performance of each energy-using system and acquiring the initial energy-using system data while performing the testing.

102. The method as set forth in claim 98 and further comprising:

generating actions that will reduce the energy-usage of the supermarket;

determining a return on savings for performing the actions; and providing to a customer a report that includes the actions and the return on savings.

\* \* \* \* \*